(12) United States Patent
Murray et al.

(10) Patent No.: US 9,059,605 B2
(45) Date of Patent: Jun. 16, 2015

(54) ENERGY STORAGE DEVICES AND METHODS OF USING SAME

(76) Inventors: Saben Murray, San Francisco, CA (US); William Turnbull, III, Sausalito, CA (US); William Breingan, Media, PA (US)

( * ) Notice: Subject to any disclaimer, the term of this patent is extended or adjusted under 35 U.S.C. 154(b) by 354 days.

(21) Appl. No.: 13/229,639

(22) Filed: Sep. 9, 2011

(65) Prior Publication Data

US 2012/0112472 A1    May 10, 2012

Related U.S. Application Data

(60) Provisional application No. 61/381,727, filed on Sep. 10, 2010, provisional application No. 61/413,817, filed on Nov. 15, 2010.

(51) Int. Cl.
| | | |
|---|---|---|
| *F03B 13/10* | (2006.01) | |
| *H02J 15/00* | (2006.01) | |
| *F03B 13/18* | (2006.01) | |

(52) U.S. Cl.
CPC ........... *H02J 15/003* (2013.01); *F03B 13/1845* (2013.01); *F03B 13/1865* (2013.01); *F03B 13/1815* (2013.01); *F03B 13/1885* (2013.01); *Y02E 60/17* (2013.01)

(58) Field of Classification Search
CPC ............. F03B 13/1815; F03B 13/1845; F03B 13/1865; F03B 13/1885
See application file for complete search history.

(56) References Cited

U.S. PATENT DOCUMENTS

| | | | |
|---|---|---|---|
| 2,757,884 A | 8/1956 | Bryant et al. | |
| 4,370,559 A | 1/1983 | Langley, Jr. | |
| 7,045,912 B2 * | 5/2006 | Leijon et al. | 290/42 |
| 7,319,278 B2 * | 1/2008 | Gehring | 290/53 |
| 8,093,736 B2 * | 1/2012 | Raftery | 290/42 |
| 8,146,361 B2 * | 4/2012 | Jin | 60/639 |
| 8,319,359 B2 * | 11/2012 | Akervoll | 290/42 |
| 8,581,433 B2 * | 11/2013 | Sidenmark | 290/53 |
| 2009/0193808 A1 | 8/2009 | Fiske | |
| 2009/0200806 A1 * | 8/2009 | Al-Huwaider | 290/53 |
| 2009/0212562 A1 * | 8/2009 | Jaugilas | 290/42 |
| 2010/0107627 A1 | 5/2010 | Morgan | |
| 2011/0089696 A1 * | 4/2011 | Davis et al. | 290/53 |
| 2011/0266809 A1 * | 11/2011 | Calverley | 290/55 |

FOREIGN PATENT DOCUMENTS

WO    2010049492 A2    5/2010

* cited by examiner

*Primary Examiner* — Michael Zarroli

(57) ABSTRACT

The invention is directed to various energy storage devices and methods of using the same. The energy storage device takes advantage of the height difference between the bottom and the surface of a body of water. The energy storage device utilizes the movement of a mass, such as weights or floats, to store energy as potential energy and to generate energy by releasing the potential energy. Weights attached to tethers are pulled toward the surface of the water by a motor/generator powered by energy to be stored, thereby storing potential energy. Allowing the weights to fall downward releases the potential energy and reverses the motor/generator to generate electricity. Floats attached to tethers are pulled toward the bottom of the water by a motor/generator powered by energy to be stored, thereby storing potential energy. Allowing the floats to rise releases the potential energy and reverses the motor/generator to generate electricity.

19 Claims, 28 Drawing Sheets

ENERGY STORAGE DEVICES AND METHODS OF USING SAME

CROSS-REFERENCE TO RELATED APPLICATIONS

This application claims the benefit of provisional Application No. 61/381,727, filed Sep. 10, 2010 and of provisional Application No. 61/413,817, filed Nov. 15, 2010. The entirety of each of the foregoing applications is incorporated by reference herein.

BACKGROUND OF THE INVENTION

1. Field of the Invention

The present invention is in the field of energy storage. More specifically, the present invention is directed various embodiments of an energy storage device and methods of using the device to store energy mechanically using gravitational potential by utilizing the height difference between the bottom and the surface of a deep body of water.

2. Description of Related Art

As more and more sources of intermittent generation from renewable sources like the wind and sun are integrated into the electric grid, the critical task of matching generation output to electrical demand for which grid operators are responsible becomes more and more difficult. Electricity must be used exactly when it is delivered, so grid operators must continuously adjust how much energy is being produced at each moment to exactly match the amount of energy its end-users require. Grid operators must make use of generators that can be throttled, such as natural gas combustion turbines, to adjust total generation output up and down. Running combustion turbines at varying speeds, however, is inefficient and causes excess wear and tear on the machinery.

As a larger and larger fraction of the world's energy is derived from intermittent sources, more and more combustion turbines running under these non-optimal conditions will be required, presenting an ever-larger and more costly problem to utilities. One solution to this problem is to store energy from intermittent sources from when it is generated until it is needed by the end users. Storage has the potential to turn intermittent renewable energy sources into a source of energy that can be dispatched on demand. To turn renewables into a dispatchable resource, however, requires a huge amount of storage.

Existing energy storage technologies fall short of being able to perform this function economically. The ubiquitous lead-acid battery has a low sticker price but is inefficient and limited in its usable depth of discharge. It also has short cycle life, which requires it to be replaced often. Advanced flow and lithium-ion batteries improve upon the cycle-life and usable depth of discharge but are very expensive and still face the issue of degrading performance over time. Flywheels are effective at storing energy for short-duration, high-power applications and are used on the grid today to perform this task, but their reliance on power-sapping electromagnetic bearings, actively pumped down vacuum enclosures, and expensive composite materials make them unsuitable for storing large amounts of energy for many hours. Ultracapacitors also rely on advanced materials and are only suitable for use in short-duration, high-power applications. Existing compressed air energy storage (CAES) systems store large amounts of energy but require combustion of substantial amounts of natural gas to recover this stored energy. Further, they suffer from low round-trip efficiencies (50-70%). They also rely on the existence of special underground salt caverns to provide a container for the compressed air, thereby limiting available sites.

One technology that may provide economical energy storage on a massive scale is pumped hydro. Pumped hydro stores energy using gravitational potential. It takes excess energy when it is generated and uses it to pump water from a lower reservoir hundreds of feet up to a higher reservoir. When the energy is needed again, the water is allowed to flow back down to the lower reservoir and in the process spins a turbine that in turn spins a generator, which converts the energy back into electrical form. Although pumped hydro is expensive to install, it is a relatively low-cost way to store energy in the long run since its efficiency is 70-85%. Unfortunately, pumped hydro relies on the existence of a mountain with a suitable site for both an upper and lower reservoir to be economical. The majority of desirable sites for pumped hydro have already been developed, and developing new sites has serious environmental consequences. For these reasons, it is likely that there will be few, if any, new pumped hydro storage facilities installed in the future.

Based on the foregoing, it would be desirable to have an energy storage device that can store energy and release the stored energy reliably and economically. In addition, it would be desirable to provide an energy storage system that can store energy from various energy generation sources, such as offshore generation from wind turbines, and provide that stored energy to an electrical load, such as an electric grid.

BRIEF SUMMARY OF THE INVENTION

The invention is directed to various energy storage devices and systems and methods of using the same. The energy storage device takes advantage of the height difference between the bottom and the surface of a body of water. The energy storage device utilizes the movement of a mass or multiple masses, such as weights or floats, to store energy as potential energy and to generate energy by releasing the potential energy. Weights attached to tethers are pulled toward the surface of the water by a motor/generator powered by energy to be stored, thereby storing potential energy. Allowing the weights to fall downward releases the potential energy and reverses the motor/generator to generate electricity. Floats attached to tethers are pulled toward the bottom of the water by a motor/generator powered by energy to be stored, thereby storing potential energy. Allowing the floats to rise releases the potential energy and reverses the motor/generator to generate electricity.

In one embodiment, the energy storage device comprises a mass; a motor/generator having a rotatable shaft configured to rotate in a first direction when electricity is received by the motor/generator and to rotate in a second direction opposite the first direction to cause the motor/generator to produce electricity; a spool coupled to the rotatable shaft, whereby the spool and the rotatable shaft rotate in a same direction; and a tether attached at a first end to the spool and at an opposite second end to the mass, whereby rotation of the spool by the rotatable shaft in the first direction causes the tether to wind around the spool thereby pulling the mass toward the spool and whereby a movement of the mass away from the spool causes the tether to un-wind from the spool thereby rotating the rotatable shaft in the second direction.

In another embodiment, the energy storage device comprises a cylinder having one closed end and an open end opposite said closed end; a buoyant piston configured to fit inside of the cylinder; a seal disposed around an outside perimeter at a point along a length of the buoyant piston, wherein the seal contacts an inner wall of the cylinder; a hydraulic pump fluidly connected to a bottom of the cylinder; an electric motor connected to the hydraulic pump to drive the hydraulic pump; a hydraulic turbine fluidly connected to the bottom of the cylinder; and an electric generator connected to the hydraulic turbine to generate electricity from rotation of the hydraulic turbine.

In another embodiment, a system for energy storage comprises an energy storage device comprising a mass; a motor/generator having a rotatable shaft configured to rotate in a first direction when electricity is received by the motor/generator and to rotate in a second direction opposite the first direction to cause the motor/generator to produce electricity; a spool coupled to the rotatable shaft, whereby the spool and the rotatable shaft rotate in a same direction; and a tether attached at a first end to the spool and at an opposite second end to the mass, whereby rotation of the spool by the rotatable shaft in the first direction causes the tether to wind around the spool thereby pulling the mass toward the spool, and whereby a movement of the mass away from the spool causes the tether to un-wind from the spool thereby rotating the rotatable shaft in the second direction; and an electric cable electrically connected at a first end to an electrical load and electrically connected to the motor/generator at a second end opposite the first end; wherein the energy storage device is disposed in a body of water.

In another embodiment, a method for storing energy comprises transmitting energy to be stored to an energy storage device comprising a mass; a motor/generator having a rotatable shaft configured to rotate in a first direction when electricity is received by the motor/generator and to rotate in a second direction opposite the first direction to cause the motor/generator to produce electricity; a spool coupled to the rotatable shaft, whereby the spool and the rotatable shaft rotate in a same direction; and a tether attached at a first end to the spool and at an opposite second end to the mass, whereby rotation of the spool by the rotatable shaft in the first direction causes the tether to wind around the spool thereby pulling the mass toward the spool, and whereby a movement of the mass away from the spool causes the tether to un-wind from the spool thereby rotating the rotatable shaft in the second direction; and an electric cable electrically connected at a first end to an electrical load and electrically connected to the motor/generator at a second end opposite the first end; wherein the energy storage device is disposed in a body of water; operating the energy storage device to store the energy; and release the stored energy upon demand.

The energy storage devices described herein store energy economically and in a relatively reliable manner. The energy storage devices can be used in conjunction with various energy generation sources, such as offshore energy generation from wind turbines. The energy storage devices can easily provide the stored energy for use upon demand to an electric load, such as an electric grid. The energy storage devices also include mechanisms and devices for protecting the motor/generator and drivetrain to enhance its reliability.

DETAILED DESCRIPTION OF THE INVENTION

Figure 1:
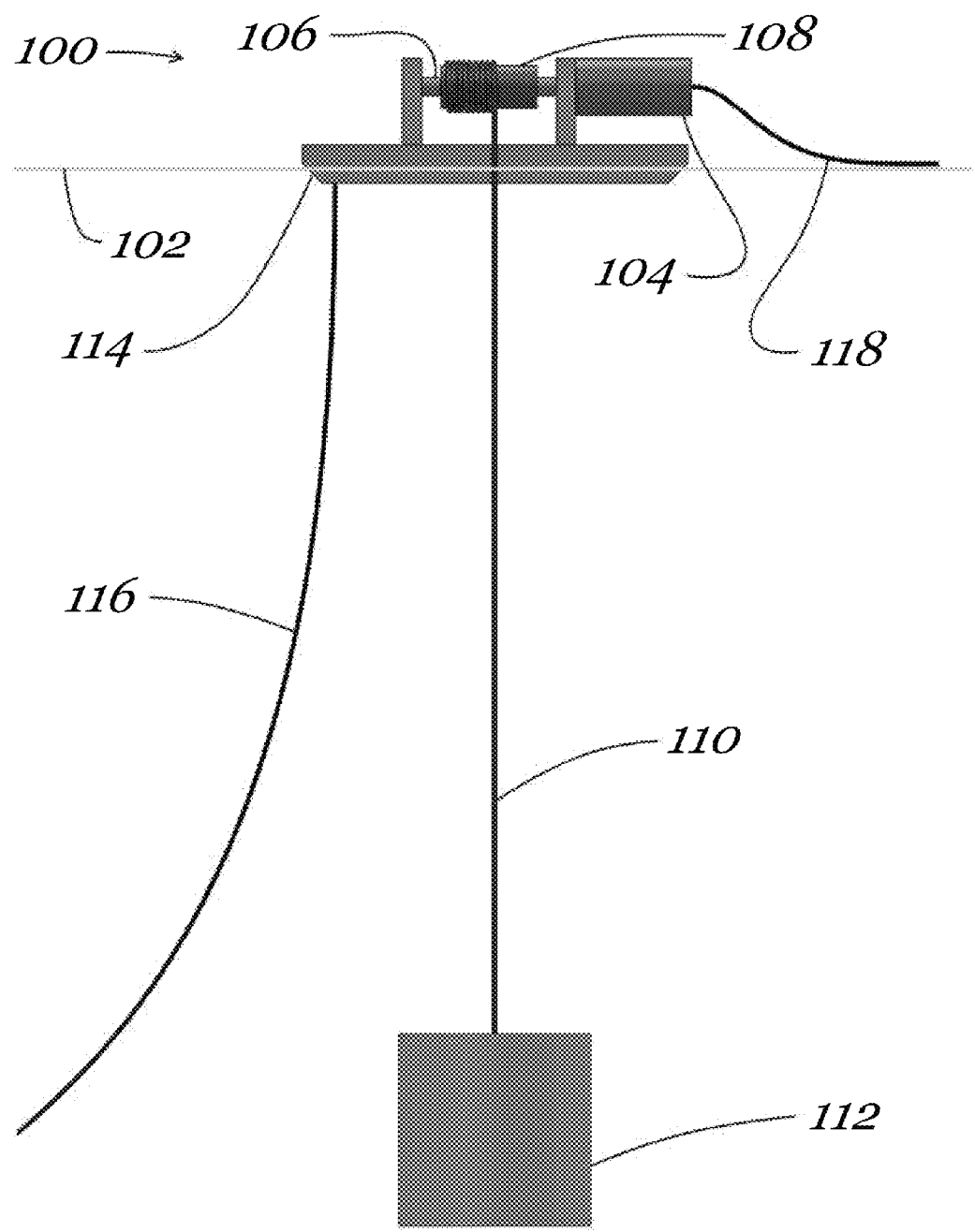
FIG. 1 illustrates an energy storage device that uses the movement of weights to store and release energy according to one embodiment of the invention.

Various embodiments of the invention are described below in conjunction with the Figures. However, this description should not be viewed as limiting the scope of the present invention. Rather, it should be considered as exemplary of various embodiments that fall within the scope of the present invention as defined by the claims. Further, it should also be appreciated that references to "the invention" or "the present invention" should not be construed as meaning that the description is directed to only one embodiment or that every embodiment must contain a given feature described in connection with another embodiment or described in connection with the use of such phrases. In fact, various embodiments with common and differing features are described herein.

The present invention is generally directed to various embodiments of an energy storage device and methods of using the device to store energy mechanically using gravitational potential. Basically, energy to be stored is directed to the energy storage device, which stores that energy for later use, at which point, the energy storage device releases the stored energy. The energy to be stored can be supplied to the energy storage device from any source. For example, electrical energy can be supplied to the energy storage device from any suitable source including the electric grid, co-located renewable or conventional generation, or remote renewable or conventional generation. Accordingly, while the energy is basically transferred to and from the energy storage device electrically, as noted, the energy storage device itself stores the energy mechanically in the form of potential energy. To accomplish the storage of energy, the energy storage device basically takes advantage of the height difference between the bottom and the surface of a deep body of water, which may be any suitable body, still or running, or natural or man-made.

The energy storage device itself makes use of the movement of a mass or multiple masses, including weights or floats, from a position of little to no potential energy to one of greater potential energy to store energy and back to its starting position to release the stored energy. These masses can be arranged in two basic different configurations. In a first configuration, floats are made with sufficient buoyancy to suspend weights attached to the floats using cables. In this case, the floats would reside at or near the surface of the body of water and the weights would be suspended downward in the water towards the bottom of the body of water. When energy is transferred to the device, that energy is converted to mechanical energy that is used to pull the weights upward toward the floats, thereby creating potential energy (a specific form of mechanical energy). In other words, the energy transferred to the device for storage may be used, for example, to rotate a winch that pulls the cables connected to the weights to retract the cables and pull the weights upward toward the floats. Thereafter, upon demand for use of the stored potential energy, the weights can be released and allowed to sink toward the bottom of the body of water, thereby releasing their potential energy, which can be converted, for example, to electrical energy through the use of an attached turbine and generator.

In a second configuration, the orientation of the weights and floats is reversed. Weights are used to hold the energy storage device on the bottom of the body of water, and floats are attached to the weights using cables. When energy is transferred to the device, that energy is converted to mechanical energy that is used to pull the floats down toward the weights, thereby creating potential energy. In other words, the energy transferred to the device for storage may be used to rotate a winch that pulls the cables connected to the floats to retract the cables and pull the floats down toward the weights. Thereafter, upon demand for use of the stored potential energy, the floats can be released and allowed to rise toward the surface of the body of water, thereby releasing their potential energy, which similarly can be converted, for example, to electrical energy through the use of an attached turbine and generator.

In both configurations, the depth of the body of water provides a substantial height difference, which is used to change the gravitational potential energy of an amount of mass, which is either the weights or the floats. In the configuration where the weights move, the body of water provides a means of supporting large amounts of weight (through floatation) at a great height, notably with only a relatively minimal investment in support structure. In the configuration where the floats move, the body of water provides the mass (the water displaced by the movement of the floats) whose gravitational potential is increased to store energy.

In both configurations, the energy to be stored is converted to mechanical energy that is used to wind the cable, thereby raising the weights toward the surface of the water or pulling the floats down toward the bottom surface of the body of water and thereby converting that mechanical energy to stored potential energy. It should be appreciated that the energy to be stored can be converted to mechanical energy by any device known in the art. For example, electrical energy sent to the energy storage device can be delivered to an electric motor having a rotating shaft that is used to rotate a winch shaft about which the cable is wound.

Similarly, the stored or potential energy is converted to mechanical energy through the un-winding of the cable when the weights are released and sink toward the bottom of the body of water or when the floats rise toward the surface of the water. Similarly, it should be appreciated that the stored or potential energy can be converted to mechanical energy by any device known in the art. For example, the shaft of a winch about which the cable is wound, may be connected to a rotating shaft of an electric generator such that as the cable is un-wound, the winch shaft and the rotating shaft of the electric generator will turn. As the shaft of the electric generator turns, the mechanical energy is converted into electrical energy that can be sent to an electric grid or an off-grid facility or piece of electrical equipment.

Following, various embodiments of these two basic configurations are described in connection with the Figures. In addition, various specific aspects of the invention are described, including various mechanical designs of the energy storage device and various implementations of its use. Further, other variations of these embodiments are also described.

FIG. 1 illustrates an energy storage device that uses the movement of weights to store and release energy according to one embodiment of the invention. In this embodiment, the energy storage device 100 is illustrated as being disposed in a body of water 102. The energy storage device 100 has several components, including a motor/generator 104, a rotatable shaft 106, a spool 108, a tether 110, and a weight 112, which is the mass that is moved to store and release energy. The energy storage device 100 receives energy for storage and delivers stored energy for use through an electrical cable 118 that is electrically connected to the motor/generator 104.

The motor/generator 104 includes both a motor and a generator and is coupled to the rotatable shaft 106, which is coupled to the spool 108. Accordingly, the motor generator 104 is configured to operate as both a motor and as a generator; however, in the alternative a separate motor and generator could be used. When the motor/generator 104 receives electricity or acts as an electrical load, the motor/generator acts as a motor and rotates the rotatable shaft 106 in one direction. When the rotatable shaft is rotated in the opposite direction or is backdriven (by the spool 108 as described further below), the motor/generator 104 acts as a generator producing electricity. The rotatable shaft 106 is coupled to the spool 108 such that rotation of either the rotatable shaft 106 or the spool 108 will cause rotation of the other. It should be appreciated that the spool 108 is mounted concentric with the rotatable shaft 106 and may be supported on bearings in bearing carriers.

The motor/generator used, in this particular embodiment or in any of the other embodiments described herein, could be any suitable motor generator, such as an AC or DC motor/generator. One example of an AC motor/generator would be an AC induction motor, such as are readily available commercially. Such a motor would operate at constant speed under the constant load provided by the weight 112. An AC synchronous machine would also run at constant speed, synchronized with the AC frequency supplied to it. A variable speed AC machine could also be employed, such as a doubly-fed induction motor/generator. A DC motor/generator with a regenerative drive could also provide variable speed operation.

As described further below, some embodiments of the invention use a system or an array of energy storage devices all employing a simple, single speed AC induction motor/generator to keep costs of the motor/generator and drive electronics to a minimum. Each system would be capable only of putting out either their maximum rated power or zero power. Variable power output for the overall array could be achieved by simply charging or discharging more or fewer units depending on how much power is to be absorbed or released. If finer control over the amount of power uptake or discharge is desired, the array of single-speed energy storage systems could be paired with a single, variable speed energy storage system, capable of absorbing or releasing power at any level, from zero up to its maximum rated power. In this way, the entire energy storage array could absorb or release any level of power desired by charging or discharging the number of single-speed units that most closely matches the desired power level and absorbing releasing precisely the right amount of power with the variable speed energy storage system to bring the total power to the exact right level. It should be appreciated that the relative power ratings of the single-speed energy storage systems and the variable-speed energy storage system should be appropriate. For example, the single-speed energy storage systems could all be of the same power rating, while the variable-speed system could be of at least half the power rating of one of the single-speed systems, so that by either charging or discharging, the total power output of the energy storage array can be brought to any level within the maximum power level of the array. A control scheme could also be implemented to ensure that the energy storage systems all see approximately equal run time, so as to spread wear and tear equally among all the single speed systems.

Further, the motor/generator could be designed to run in air, such as a typical off the shelf industrial motor and could be sealed inside an external housing, or it could be designed to run in an ocean surface or underwater environment. In the case where the motor/generator operates underwater, for example in connection with the energy storage systems described further below in connection with FIGS. 13-21, it could be designed to operate at a slow speed to minimize hydrodynamic drag during operation.

Motor/generators, and especially AC motor/generators, could be designed to interface directly with the electric grid through the use of simple electronics, including, for example, transformers. For example, the motor could be designed to run at 480 VAC and turn the appropriate speed at grid frequency, for example 60 Hz. Such a motor could turn at 1200, 1800, or 3600 RPM, or could be designed to turn at any suitable speed.

The motor/generator could be sized for any power rating but would probably be sized to absorb (i.e., store) or release the energy storage device's or system's rated peak power for its rated discharge duration. For example, a 100 kWh energy storage device with a discharge duration of 1 hour would likely have a motor/generator that was capable of putting out 100 kW continuously for one hour. The motor/generator might be sized, however, to absorb or release a higher amount of power for a shorter duration of time to accommodate absorbing or supplying power spikes.

Energy storage devices and systems and their corresponding motor/generators could be made to be any size, from less than 1 kW to hundreds of MW or more. In some embodiments, the motor/generator can be in the range of 100 kW to 15 MW per system, depending on the size of the energy storage element, the water depth, and the design discharge duration.

The motor/generator 104, the rotatable shaft 106, and the spool 108 are disposed on a barge 114 that floats on the surface of the body of water 102. The barge 114 is held in a relatively stationary position on the surface of the body of water 102 by a mooring cable 116 that is anchored. It should be appreciated that any platform or other device having sufficient buoyancy or flotation capability may be used to hold the necessary components of the energy storage device 100. It should also be appreciated that FIG. 1 illustrates these components as being in an open environment and exposed to environmental elements. Therefore, an enclosure (not shown) that covers these components, such as a weather-proof enclosure, may be used.

The rotatable shaft 106 may be any shaft known in the art, and one of skill in the art will appreciate how to size the rotatable shaft 1308 to be compatible with the motor-generator 104. Also, one of skill in the art will appreciate the materials from which the rotatable shaft 106 can be made, given the mechanical demands and stresses and strains that will be placed on the rotatable shaft 106, as well as its environmental surroundings.

Similarly, the spool 108 may any spool known in the art, and one of skill in the art will appreciate how to size the spool 108 to be compatible with the rotatable shaft 106. Also, one of skill in the art will appreciate the materials from which the spool 108 can be made, given the mechanical demands and stresses and strains that will be placed on the spool 108, as well as its environmental surroundings The tether 110 is attached at one end to the spool 108 and extends downward from the spool 108 into the body of water 102 where is it attached to a weight 112 at its opposite end. The tether 110 may be attached to the weight 112 by any means known in the art sufficient to ensure that the weight 112 will not detach from the tether 110.

The tether may be made from any material provided has sufficient strength to hold the weight and the ability to be wound and un-wound around a spool. In addition, the tether should be made of a material that is sufficient to withstand the water conditions, such as salt water, in which it will be used. For example, if a significantly heavy weight is used, the tether may be a metal cable; however, if the tether will be used in an ocean water environment, the particular metal selected will need to withstand corrosion from the salt water. The material should also have a sufficiently long useful life to minimize maintenance for the energy storage device. The diameter of the tether should be sized based on similar considerations. The length of the tether may be any length depending upon the depth of the body of water in which it is used and the desired energy storage capacity of the energy storage device, as described in more detail below.

In particular, tethers could be a fiber rope, such as nylon, or a wire rope, such as steel cable. Wire rope might be made from stainless steel, such as 302 or 304 stainless, to resist corrosion. Tethers could also be high-strength fiber, such as an ultra-high-molecular-weight polyethylene fiber. Tethers could be commercially available products or custom designed and manufactured. Each tether could also be made up of multiple, independent cords that could be braided together or simply run parallel to one another. Tethers could be jacketed with a protective sheath to protect against abrasion, marine growth, and other potential hazards.

The weight may be any object that has a desired or predetermined weight or mass, which is proportional to the amount of energy that can be stored, as discussed in more detail below. In other words, the weight is designed with a desired or predetermined weight or mass to provide the energy storage device with the desired energy storage capacity, given the depth of the body of water in which it will be used. For example, if the body of water is relatively shallow, a weight having a greater weight or mass may be used to increase the amount of energy that can be stored, since a weight with greater weight or mass requires more energy to pull it upward thereby storing a greater amount of potential energy. Further, even when the body of water has a significant depth, a weight having a greater weight or mass may be used to increase the amount of energy that can be stored. Of course, the opposite is true for a weight having a relatively lower weight or mass.

The weights could be made from any material, so long as the weight is denser than the ambient water overall. Ideally these materials would also be low cost. Concrete is an example of such a material. Concrete could also be used to form a structural shell that could be filled with other materials that are dense and low cost, such as sand or gravel or dredgings from the ocean floor. Large pieces of dense and low-cost aggregate, such as stone, iron ore, or construction debris, could also be cast into a concrete matrix. Further, a number of shapes could be employed. Spheres, cylinders, extruded polygons, ellipsoids, or cones could all be used. In some embodiments, the weight may be shaped to minimize frictional losses as it travels through the water. One possibly advantageous shape could be a teardrop, because its hydrodynamic shape would reduce viscous losses. Flat disks or plates might also provide an advantage by allowing for maximum travel distance of the weight in a given water depth. Weights could be finished or coated so as to reduce hydrodynamic drag. For example, weights could be finished with a smooth polished surface to limit skin friction. Weights could also be finished with an antifouling coating or paint, such as is used on ships to inhibit marine growth during extended periods in the water. Weights could take on a huge range of sizes, from hundreds to millions of pounds, with practical ranging between 50,000 and 200,000 lbs (25 to 100 tons) each.

As noted, the energy storage device 100 receives energy for storage and delivers stored energy for use through an electrical cable 118 that is electrically connected to the motor/generator 104. Energy to be stored by the energy storage device 100 is supplied to the energy storage device 100 as electricity from a source of electricity by the electrical cable 118. When the stored energy is required for use, the energy storage device 100 delivers the stored energy as electricity through the electrical cable 118 to an electrical load. It should be appreciated that the source of electricity and the electrical load at end of the electrical cable 118 opposite that end connected to the motor/generator 104 may be any electrical source and any electrical load. For example, the electrical source may be a grid with excess electrical generation capacity, co-located renewable or conventional generation, or remote renewable or conventional generation. The electrical load may also be an electric grid or any other load that can utilize the amount of electricity provided by the generator portion of the motor/generator 104. It should be appreciated that the electrical energy supplied to the energy storage device 100 for storage for the electrical energy released from the energy storage device 100 for use may be any form of electrical energy, including alternating current or direct current.

In operation, when energy to be stored is delivered to the energy storage device 100 as electricity through the electrical cable 118, the motor of the motor/generator 104 is utilized. In this case, the motor provides an electrical load for the electrical energy delivered to the energy storage device 100 through the electrical cable 118, which causes the rotatable shaft 106 to rotate thereby converting the electrical energy to mechanical energy. The rotation of the rotatable shaft 106 rotates the spool 108 causing the tether 110 to be wound around the spool 108 thereby retracting the tether 110. As the tether 110 is wound around the spool 108 or retracted, it pulls the weight 112 up through the water toward the surface of the body of water 102. By raising the weight 112, the electrical energy utilized by the motor that has been converted to mechanical energy is now converted to potential energy stored by the weight 112, which is now held at a height above that at which it started in proportion to the amount of energy transmitted to the motor of the motor/generator 104. Of course, the potential energy is created by gravity and may be referred to as gravitational potential energy.

The energy storage device, including the device of this embodiment as well as any of the embodiments described herein, can be operated by a motor/generator controller that can both supply current to the motor/generator to wind the weights in and couple the motor/generator to an electrical load against which the weights can work to provide the stored energy. In the case where the motor/generator operates at a single speed only, the controller need only provide the functions of charging at a single rate, discharging at a single rate, and holding position. The weights could be held in position by a mechanical brake that couples the weights to the floats mechanically on command from the controller. In the case of a more complex motor/generator operating at variable speed, the controller could also handle the task of controlling the rate of charge and discharge. The motor/generator controller could implement commands sent to it externally from, for example, a human operator or signals from the electric grid. The controller could also act in response to various sensors with which the energy storage device could be equipped. For example, the controller might halt a charge or discharge operation in response to a signal from a sensor indicating that the weights had reached the end of their travel, or that the system had experienced a fault or mechanical failure of some kind.

When the stored potential energy is to be used, the weight 112 is allowed to fall toward the bottom of the body of water 102, thereby releasing the potential energy. As the weight 112 falls, the tether 110 is pulled and unwinds from the spool 108, which causes the spool 108 to rotate in the opposite direction from when the spool 108 was used to wind the tether 110 and to raise the weight 112. As the spool 108 rotates, the rotatable shaft 106 also rotates, again in the opposite direction from when the motor was used to rotate the rotatable shaft 106. The rotation of the rotatable shaft 106 in this direction causes the generator of the motor/generator 104 to be used, thereby generating electricity that is transmitted over the electrical cable 118 to an electrical load for use. Accordingly, the potential energy in the weight 112 is converted to mechanical energy that rotates the spool 108 and the rotatable shaft 106 that is then converted to electrical energy by the generator.

It should be appreciated that the overall size of the energy storage device 100 and its component parts may range depending upon the amount of energy desired to be stored and the body of water in which the energy storage device 100 will be used. For example, if a larger amount of energy is to be stored and if the energy storage device 100 will be operated in open ocean, the device may need to be relatively larger to both accommodate storing a larger amount of energy and to maintain stability in the ocean. Of course, as discussed above, the depth of the body of water in which the energy storage device is used and the size or mass of the weight used will affect the amount of energy stored.

Energy storage devices generally, including any of those described herein, could be useful at any number of scales, storing amounts of energy ranging from less than 1 kWh to hundreds of MWh or more, with some devices storing amounts of energy ranging from 50 kWh to 10 MWh. Devices could be designed to discharge their stored energy over any amount of time from less than a few seconds to more than a few days, with some devices falling in the range of 15 minutes to 10 hours. Several devices could be grouped together into an array to store more energy, as described in some embodiments below. Devices in an array could be charged or discharged one at a time to lengthen the discharge duration, all at once to maximize power rating, or in any other combination that is useful.

Physically, each device might contain multiple weights, as described further below, arrayed around a central spool in a circular pattern. In this case, the total energy stored will be a function of the distance the weights can travel and the net weight of the weights. For example, a system with six 137,000 lb weights with 330 feet of travel would store approximately 100 kWh of energy. If such a system were to be charged or discharged in 1 hour, the system would have a power rating of 100 kW.

The electricity sent to and from the device could be of any kind It might be DC electricity for use in a remote station or for another use. In some embodiments, it might be AC power matching the frequency of the local electric grid at 50 or 60 Hz or AC power for some other use. The voltage from the grid might be transformed down from the line voltage to a voltage more suitable for the motor/generator in use. For example, with an AC induction motor/generator, the voltage might be transformed down to around 480 volts. At such a voltage, the motor/generator in the 100 kW example above would draw or output approximately 208 amperes.

Figure 2:
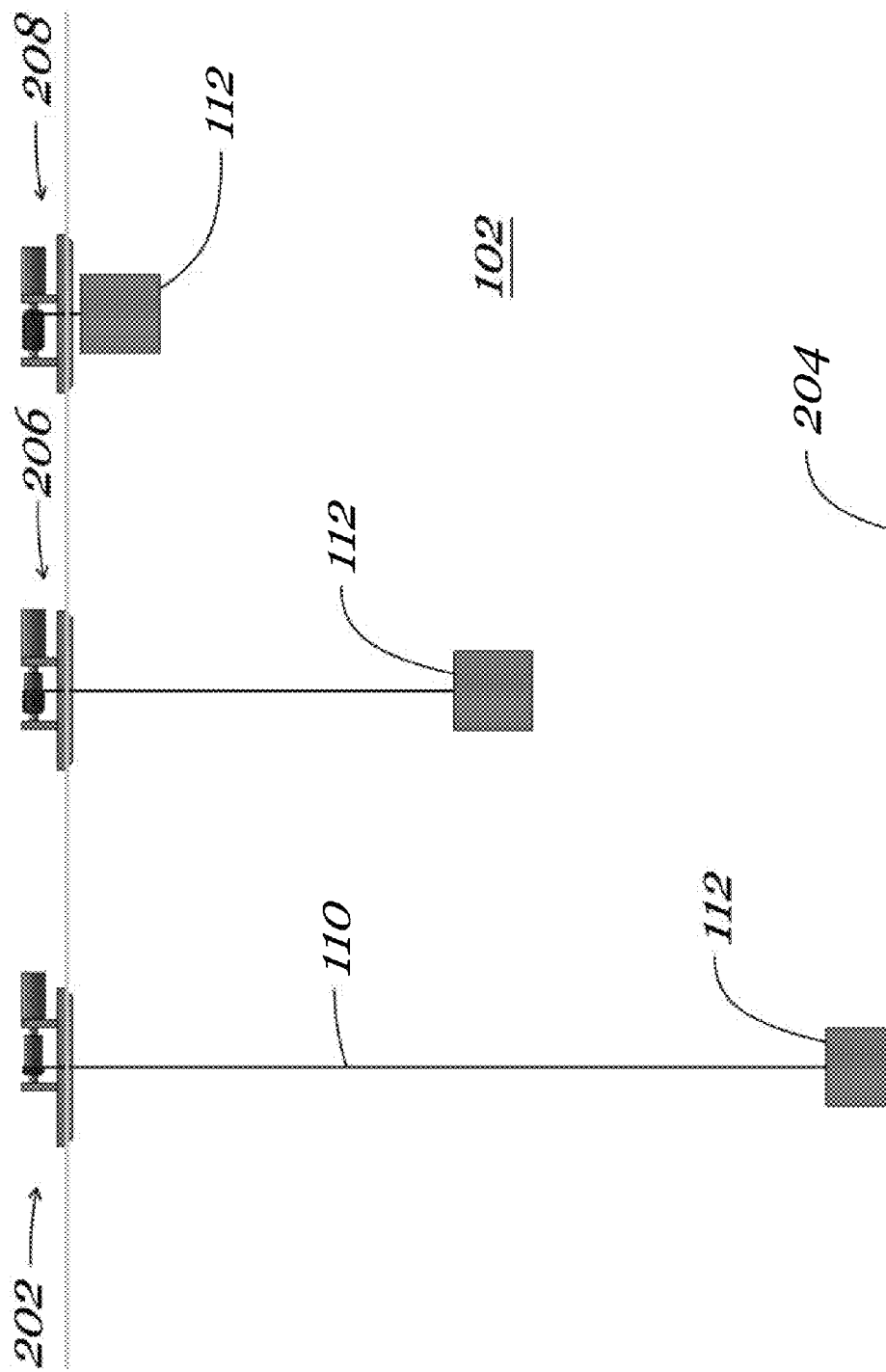
FIG. 2 illustrates the energy storage device of FIG. 1 in three different operational states: no energy stored, some energy stored, and a maximum amount of energy stored.

FIG. 2 illustrates the energy storage device of FIG. 1 in three different operational states: no energy stored, some energy stored, and a maximum amount of energy stored. The state of the energy storage device 202 on the far left of FIG. 2 illustrates the device when no energy is being stored. In this case, the tether 110 is fully extended such that the weight 112 is at the furthest distance from the spool 108. In some embodiments, the length of the tether 110 when fully extended may allow the weight 112 to be at or near the bottom 204 of the body of water 102. Although, it should be appreciated that the length of the tether 110 when fully extended may be shorter than the distance from the spool 108 on the surface of the body of water 102 to the bottom 204 of the body of water 102.

It should be appreciated that the length of the tether 110 used is directly proportional to the amount of energy that can be stored. In other words, a longer tether 110 allows the weight 112 to be raised a greater distance, thereby storing a larger amount of potential energy. Similarly, a shorter tether 110 will be more limited in the distance the weight 112 can be raised, thereby limiting the amount of potential energy that can be stored. Accordingly, a deeper the body of water will allow for use of a longer tether, thereby providing for the ability to store a larger amount of energy. Similarly, the density or weight of the weight 112 is also proportional to the amount of energy that can be stored. Using a heavier weight will result in the storage of more potential energy that using a lighter weight.

The state of the energy storage device 206 shown in the middle of FIG. 2 illustrates the device after the weight 112 has been raised by some amount. In this case, electrical energy supplied to the energy storage device for storage has been used by the motor to rotate the spool 108 to wind the tether about the spool 108, thereby pulling the weight 112 up and creating a given amount of potential energy.

The state of the energy storage device 208 shown on the far right of FIG. 2 illustrates the device after the weight 112 has been raised by its maximum amount. In this case, electrical energy supplied to the energy storage device for storage has been used by the motor to rotate the spool 108 to wind the tether 110 about the spool 108, thereby pulling the weight 112 up as far as possible. In other words, the entire length of the tether 110 has been wound about the spool 108 such that the weight 112 cannot be raised any further in height. In this state, the weight 112 is at its highest point and is storing the maximum amount of potential energy for later use.

As described above, to release the stored energy, the weight 112 is allowed to sink back towards the bottom 202 of the body of water 102, thereby turning the spool 108 as the weight 112 descends. The spool 108 backdrives the motor/generator 104 via the rotatable shaft 106, and the motor/generator 104 converts the released potential energy into electrical energy, while providing a mechanical torque that resists the torque the weight 112 exerts on the spool 108, thereby controlling the descent of the weight 112.

It should be appreciated that the energy storage device operates smoothly between the various stages illustrated in FIG. 2. In particular, the middle stage 204 illustrated in FIG. 2 is exemplary and is not necessarily a specific point or discrete stage at which the energy storage devices stops operation. In other words, the energy storage device may move freely between the stage of no energy storage 202 and maximum energy storage 208, stopping at any point in between whether the energy storage device is in the process of storing energy or releasing energy.

Figure 3:
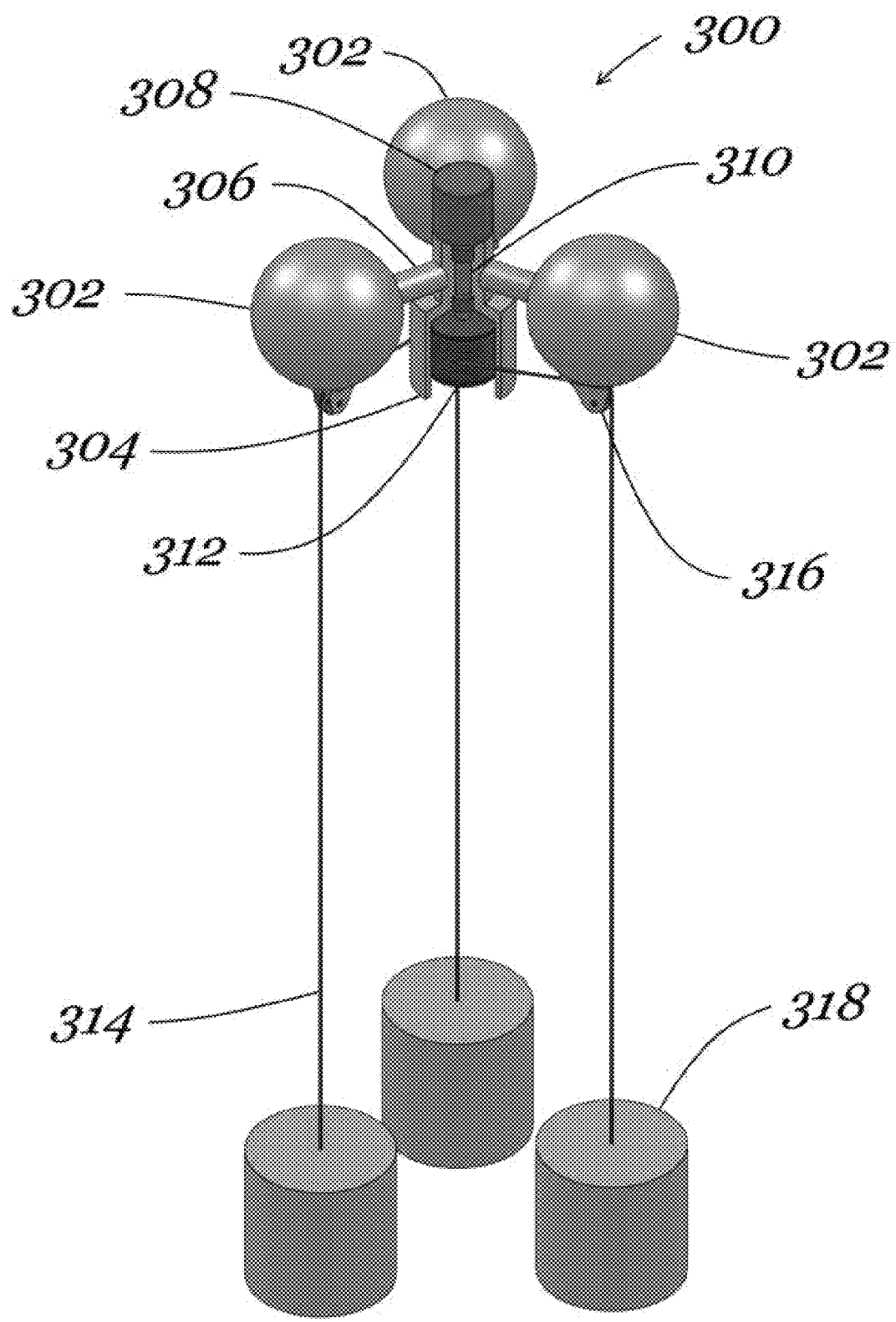
FIG. 3 illustrates an energy storage device that uses the movement of multiple weights to store and release energy according to another embodiment of the invention.

FIG. 3 illustrates an energy storage device that uses the movement of multiple weights to store and release energy according to another embodiment of the invention. In this energy storage device 300 multiple floats 302 are equally arrayed about a central axis or equally spaced around a housing 304 located in the center of the floats 302. The floats 302 are each individually attached to the housing 304 by a corresponding strut 306. A motor/generator 308 is attached to the upper end of the housing 304. The housing 304, shown as a cut-away in FIG. 3, holds a vertical rotatable shaft 310 that is operatively connected to the motor/generator 308. The housing 304 also holds a central spool 312 that is connected to the vertical rotatable shaft 310 such that rotation of the vertical rotatable shaft 210 will cause the central spool 312 to rotate and vice versa.

Multiple tethers 314 are each attached at one end to the central spool 312 such that each tether 314 will be wound or un-wound in the same direction. One tether 314 is used for each float 302. Each tether 314 passes through openings in the housing 304 (not shown) from the central spool 312 through a pulley 316 attached to the bottom surface of each float 302. Accordingly, all of the tethers 314 wrap around the single central spool 312 in the same direction, but each tether 314 is routed from the central spool 312 in a substantially horizontal direction tangent to the central spool 312 to a corresponding pulley 316 on each float 302 that changes the tether's path to a vertical, downward direction. From there each tether extends downward and is attached to a separate weight 318, wherein each of the weights is equally shaped and sized and are substantially equally spaced from each other and arrayed about a vertical axis.

The floats 302 are designed with sufficient buoyancy to support the energy storage device 300 on top of a surface of a body of water or near the surface, in particular the motor/generator 308 and the housing 304 for the central spool 312. In other words, the floats should be of sufficient buoyancy to support the weights, drivetrain, and any additional structure at the desired level of submersion. Accordingly, the floats 302 can be any type of floatation device known in the art. The floats 302 may be made from any material, but the water and atmospheric environment to which the floats will be exposed should be taken into account in selecting a material. The floats 302 may be any shape or size, which may also be determined based upon the conditions in which the energy storage device 300 will be used. For example, if the energy storage device 300 will be used in rough, open ocean or turbulent waters, larger, more stable floats may be desirable. If the energy storage device 300 will be used in a corrosive water environment, then a material that will withstand such corrosion would be desirable. The struts 306 may similarly be made from any material sufficient to hold the floats 302 to the housing 304 and to withstand the environment to which the energy storage device 300 will be exposed.

More specifically, the floats may be constructed in any way such that they are positively buoyant. The floats could be made to be hollow shells of steel, concrete, or fiber reinforced plastic. These shells might also be filled with a low-density material like foam, which could be a closed cell foam to keep the floats buoyant even in the event of a failure of the outer shell. The floats may require features for attachment of pulleys for the weights or structural elements to hold them together with other floats.

The motor/generator 308 and the vertical rotatable shaft 310 are similar to the motor/generator and the rotatable shaft described in connection with FIG. 1; however, in this embodiment, the motor/generator 308 and the vertical rotatable shaft 310 are oriented such that the vertical rotatable shaft 310 is rotated about a vertical axis. Additionally, it should be appreciated that the vertical rotatable shaft 310 is enclosed in a housing 304, whereas the rotatable shaft in FIG. 1 is open. Nonetheless, the discussion of the motor/generator and the rotatable shaft in FIG. 1 applies equally to the motor/generator 308 and the vertical rotatable shaft 310 in this FIG. 3, including how they are operatively connected. Also, it should be appreciated that similar to FIG. 1, the motor/generator 308 is attached to one or more electrical cables (not shown) to transmit electricity to the motor/generator 308 with the motor is used and to transmit electricity from the motor/generator 308 from the generator is used. Regarding the motor/generator 308, it should be appreciated that this is exposed to the environment as it is disposed outside of the housing 304. Accordingly, a cover or other seal may be used to isolate the motor/generator 308 from the environment. Also, similar to FIG. 1, the vertical rotatable shaft 310 is coupled to central spool 312 such that rotation of either the vertical rotatable shaft 310 or the central spool 312 will cause rotation of the other. It should be appreciated that the central spool 312 is mounted concentric with the vertical rotatable shaft 310, which may be supported on bearings in bearing carriers 320.

The tethers 314 and the weights 318 are similar to those described in connection with FIG. 1. Therefore, that discussion applies equally to the tethers 314 and weights 318 in this FIG. 3. However, since multiple weights 318 are used in an arrangement where the weights are next to each other, space considerations may affect the overall size or mass and shape of the weights 314 being used. In other words, smaller weights may be desirable depending upon how close the weights may come to each other during operation to avoid any collisions with each other or entanglement of the tethers. Further, using weights of the same mass or weight allows for equal tension on each of the tethers when the weights are lowered or raised, which will aid in the overall stability of the energy storage device in the water. Of course, the length of the struts 306 will also affect the distance between the tethers 314 and the weights 318, since longer struts 306 will place the tethers 314 and weights 318 relatively further from each other.

The energy storage device 300 operates in a manner similar to that described in connection with FIG. 1. When energy to be stored is delivered to the energy storage device 300 as electricity through an electrical cable, the motor of the motor/generator 308 is utilized. In this case, the motor provides an electrical load for the electrical energy delivered to the energy storage device 300, which causes the vertical rotatable shaft 310 to rotate thereby converting the electrical energy to mechanical energy. The rotation of the vertical rotatable shaft 310 rotates the central spool 312 causing each of the tethers 314 to be wound around the central spool 312 thereby retracting each of the tethers 314. As the tethers 314 are wound around the central spool 312 or refracted, each of the weights 318 is pulled up through the water toward the surface of the body of water or towards their respective floats 302. By raising the weights 318, the electrical energy utilized by the motor that has been converted to mechanical energy is now converted to potential energy stored by the weights 318, which are now held at a height above that at which they started in proportion to the amount of energy transmitted to the motor of the motor/generator 308.

When the stored potential energy is to be used, the weights 318 are allowed to fall toward the bottom of the body of water, thereby releasing the potential energy. As the weights 318 fall, the tethers 314 are pulled and unwind from the central spool 312, which causes the central spool 312 to rotate in the opposite direction from when the central spool 312 was used to wind the tethers 314 and raise the weights 318. As the central spool 312 rotates, the vertical rotatable shaft 310 also rotates, again in the opposite direction from when the motor was used to rotate the vertical rotatable shaft 310. The rotation of the vertical rotatable shaft 310 in this direction causes the generator of the motor/generator 308 to be used, thereby generating electricity that is transmitted over an electrical cable to an electrical load for use. Accordingly, the potential energy in the weights 318 is converted to mechanical energy that rotates the central spool 312 and the vertical rotatable shaft 310 that is then converted to electrical energy by the generator. It should be appreciated that the various states for the energy storage device shown in FIG. 2 apply equally to the energy storage device 300 having multiple weights 318.

As described in connection with FIG. 1, the energy storage device 300 may be any size. For example, it should be appreciated that the energy storage device 300 may include additional floats and corresponding weights and is not necessarily limited to three as shown. Additional floats and weights can be similarly oriented around a central axis and equally spaced from the adjacent floats and weights or arranged symmetrically. Further, the floats and weights can be offset from the housing by using different lengths of struts for certain of the floats. For example, every other float could be connected to the housing with a relatively longer strut thereby placing that float, and corresponding weight, a greater distance from the central axis and thereby forming essentially two concentric circles of floats and weights. Further, the energy storage device 300, similar to that described in connection with FIG. 1, may also be anchored using one or more mooring cables to substantially maintain its position in the body of water.

It should be appreciated that the use of multiple tethers and weights enables the use of one large motor/generator rather than several small ones, which is a more efficient design since larger motors and generators are inherently more efficient. Also, the rotationally symmetric placement of the tethers about the spool means that, with substantially equal tension in each tether, there will be nominally zero net radial force on the spool. This eases the requirements on the bearings to carry significant radial loads, allowing them to be less expensive.

Figure 4:
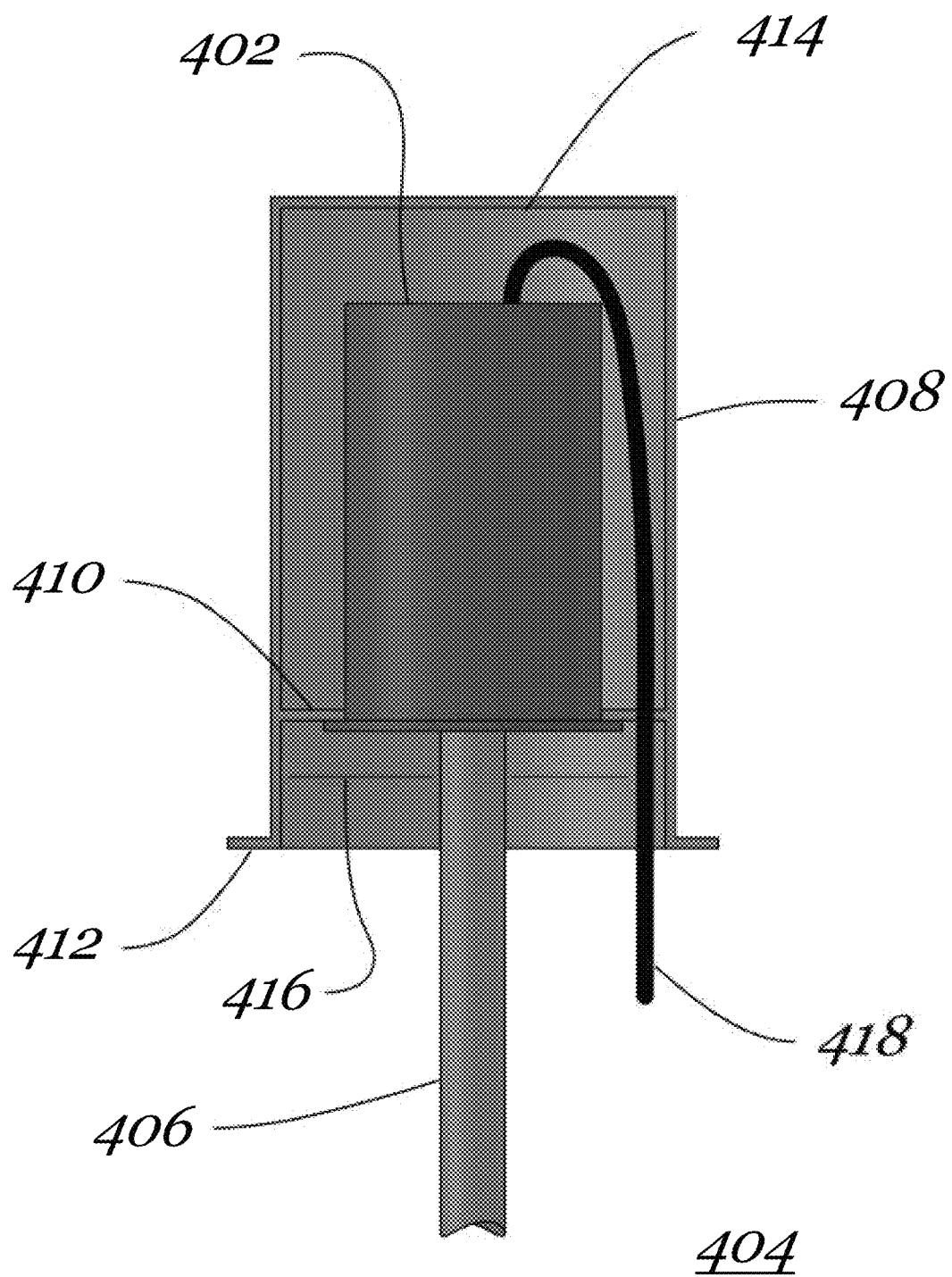
FIG. 4 illustrates a housing for a motor/generator of an energy storage device according to one embodiment of the invention.

FIG. 4 illustrates a housing for a motor/generator of an energy storage device according to one embodiment of the invention. In particular, FIG. 4 illustrates a housing for isolating rotating machinery, for example a motor/generator, from an ambient water environment, including motor/generators that may not be fully submerged, such as those described in connection with FIG. 3, as well as embodiments in which the motor/generator is fully submerged as described below in connection with, for example, FIGS. 13-19.

A motor-generator 402 is disposed in a body of water 404 with its axis of rotation oriented vertically with respect to gravity. A rotatable shaft 406 for transferring energy to and from the motor/generator 402 extends downward from the motor/generator 402. A housing 408 is disposed around the motor/generator 402 such that it extends over the top and around the sides of the motor/generator 402, forming a structure around the motor/generator 402, similar to an upside down cup. The housing 408 is formed such that air cannot pass through the structure. For example, the housing 408 over the top and around the sides of the motor/generator 402 could be monolithic in nature. The housing 408 may include internal features, such as flanges, ears, or tabs, such as interior flange 410 to which the motor/generator 402 and other equipment may be mounted. It may similarly include external features, such as flanges, ears, or tabs, such as exterior flange 412, which may be used to connect the housing 408 to other equipment.

The interior of the housing 408 defines an internal volume 414, and it should be appreciated that the housing 408 can be sized such that the internal volume 414 completely envelops the body of motor/generator 402 but so that a rotatable shaft 406 extends downward beyond the internal volume 414. It should further be appreciated, that because of the orientation of housing 408, that a pocket of air could be trapped by its own buoyant nature within internal volume 414, and that, depending on the amount of air trapped and the pressure of ambient body of water 404, the ambient body of water 404 may extend some distance into housing 408, defining an air-water boundary 416. The pocket of trapped air could also be the result of lowering housing 408 into ambient body of water 404 from the surface oriented as shown in FIG. 4, or the pocket of trapped air could be supplied from another source, such as a separate air tank. It should be further appreciated that, due to the open-bottom nature of the housing 408, the level at which the air-water boundary 416 sits may be adjusted by controlling the amount of air within the housing 408, and that as such, it may be adjusted to lie below the level of the body of the motor/generator 402. Because the rotatable shaft 406 may extend beyond the internal volume 414, into the ambient body of water 404, the motor/generator 402 can be mechanically coupled and, therefore, accessible to transfer mechanical power to and from other equipment disposed in the ambient body of water 404, even while the motor/generator 402 remains isolated from the ambient body of water 404 inside the volume of trapped air, without any need for a dynamic seal around the rotatable shaft 406. As such, the motor/generator 402 could be a commercially available motor/generator designed for operation in dry air.

Energy may be supplied to or taken from the motor/generator 402 by means of an electrical cable 418, which may be routed downward out of the open bottom of the housing 402 without the need for a seal. Electrical cable 418 could also be routed out of the top or sidewall of housing 408 by employing a simple static seal, as are known to those of ordinary skill in the art.

It should be appreciated that instead of trapping air during installation, a pocket of gas can be created using any other suitable gas. For example, a gas line can be attached to the bottom of the housing to allow gas to be pumped from an external container of gas, such as a container attached to a portion of an energy storage device on the surface of the body of water 404, through the gas line and into the bottom opening of the housing 408 or manually in conjunction with periodic maintenance. This arrangement may be used in conjunction with a volume sensor to add gas when the volume drops below a certain level.

It should be further appreciated that a pocket liquid could be used in place of the pocket of gas within housing 408. Such a liquid could be an incompressible liquid less dense than the ambient water, such as a suitable oil. A trapped pocket of incompressible fluid would not vary in volume with variations in pressure, and would provide superior cooling for the motor/generator 402, although higher viscous losses during operation of the motor/generator 402 would be expected, and a motor/generator specially designed to operate in oil may be desirable.

It should be appreciated that housing 408 as described in FIG. 4 can be used in conjunction with any of the energy storage devices described herein making use of a motor/generator with a vertical orientation, and that such energy storage devices need not necessarily be fully submerged in water. For example, this housing and the associated drivetrain can be used in conjunction with the energy storage device of FIG. 3. In this case, the housing 408 covers the motor/generator 308 in energy storage device 300, and rotatable shaft 310 would be one and the same as rotatable shaft 406.

Figure 5:
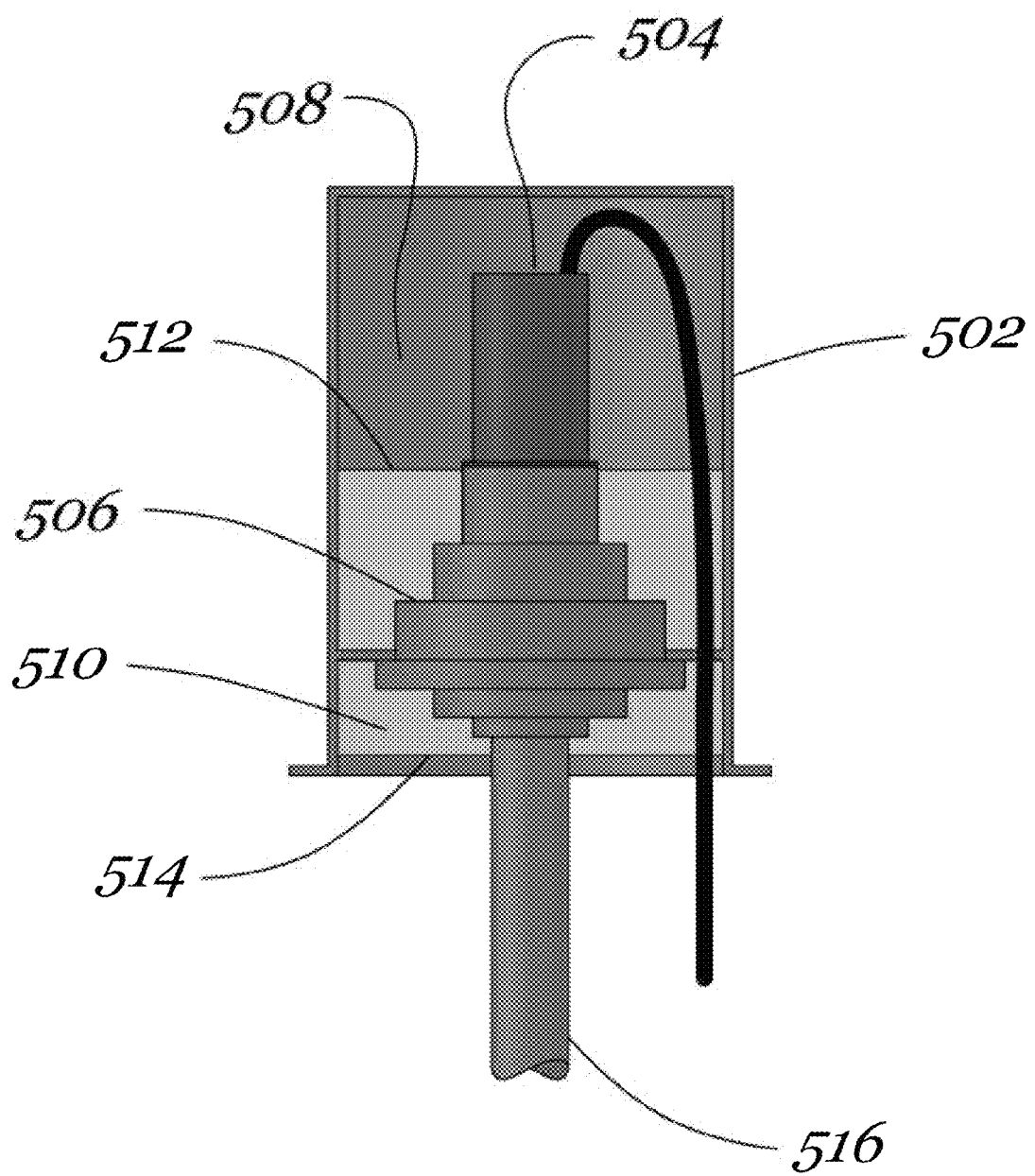
FIG. 5 illustrates a housing for a motor/generator of an energy storage device according to another embodiment of the invention.

FIG. 5 illustrates a housing for a motor/generator of an energy storage device according to another embodiment of the invention. In particular, FIG. 5 illustrates a housing for isolating rotating machinery from an ambient water environment. Again, a housing 502, similar to the housing 408 in FIG. 4, is disposed in an ambient body of water. A motor/generator 504 and a gearbox 506 are contained within housing 502. The body of the motor/generator 504 is fixedly attached to the body of gearbox 506, and the rotatable shaft 516 of motor/generator 504 is operatively connected to the input shaft of gearbox 506, such that the gearbox 506 may change the rotational speed and torque of the motor/generator 504. The housing 502 contains a pocket of trapped fluid comprising two layers. A trapped air pocket 508 resides in the upper portion of the housing 502, and an oil layer 510 is disposed between the pocket of air and the body of ambient water.

Generally, the oil layer 510 is used to preserve the air pocket 508 by either limiting the evaporation of water into the air pocket 508 as well as the opposite dissolution of the gas into the surrounding water. This barrier to evaporation will serve to reduce the amount of water vapor in the air pocket 508 and maintain a non-corrosive environment around the motor/generator 504 and gearbox 506. The amount of air trapped or introduced into the top of the housing 502, along with the amount of oil introduced into the housing 502 will determine the relative positions of the air-oil interface 512 and the oil-water interface 514. In one embodiment, the oil layer 504 is positioned such that it envelops the gearbox 506. Oil layer 510 may serve to lubricate and cool the gearbox 506 during operation, while the motor/generator 504 may operate inside the air pocket 506 to minimize viscous losses. Viscous losses resulting from operation of gearbox 506 in oil may be less of a concern, as the gearbox 506 may be a speed-reducing gearbox and, therefore, operate at lower speed and incur lower viscous losses than the motor/generator 504. For example, the gearbox 506 may drive a spool operatively coupled to the rotatable shaft 516 as part of an energy storage device like that described in FIG. 3. The spool of the energy storage device may only need to turn at a rate of less than 1 RPM during operation, while the motor/generator 504 may rotate at 1800 RPM. It should, therefore, be appreciated that the gearbox 506 may turn much more slowly than the motor/generator 504 and that viscous losses will be of less concern.

It should be further appreciated that the housing 502 and the oil layer 510 could be extended to envelop additional hardware in order to isolate such hardware from the ambient water environment and provide the benefits associated therewith. For example, the housing 502 and the oil layer 510 can be extended downward to envelop a set of bearings for supporting the rotatable shaft 516 and any loads that may be applied to it during operation.

It should be further appreciated that oil may be fed into the housing 502 through the open bottom or through an opening (not shown) in the housing 502 adjacent to the position of the oil layer 510 in order to form or maintain the integrity of that layer 510 should there be losses of oil. The oil may be pumped into the oil layer 510 from a container or reserve disposed on an energy storage device on the surface of the body of water or disposed elsewhere, based on readings from a volume sensor (not shown) attached to the housing 502 adjacent to the air-oil interface 512 or the oil-water interface 514, or manually through periodic maintenance checks.

Figure 6:
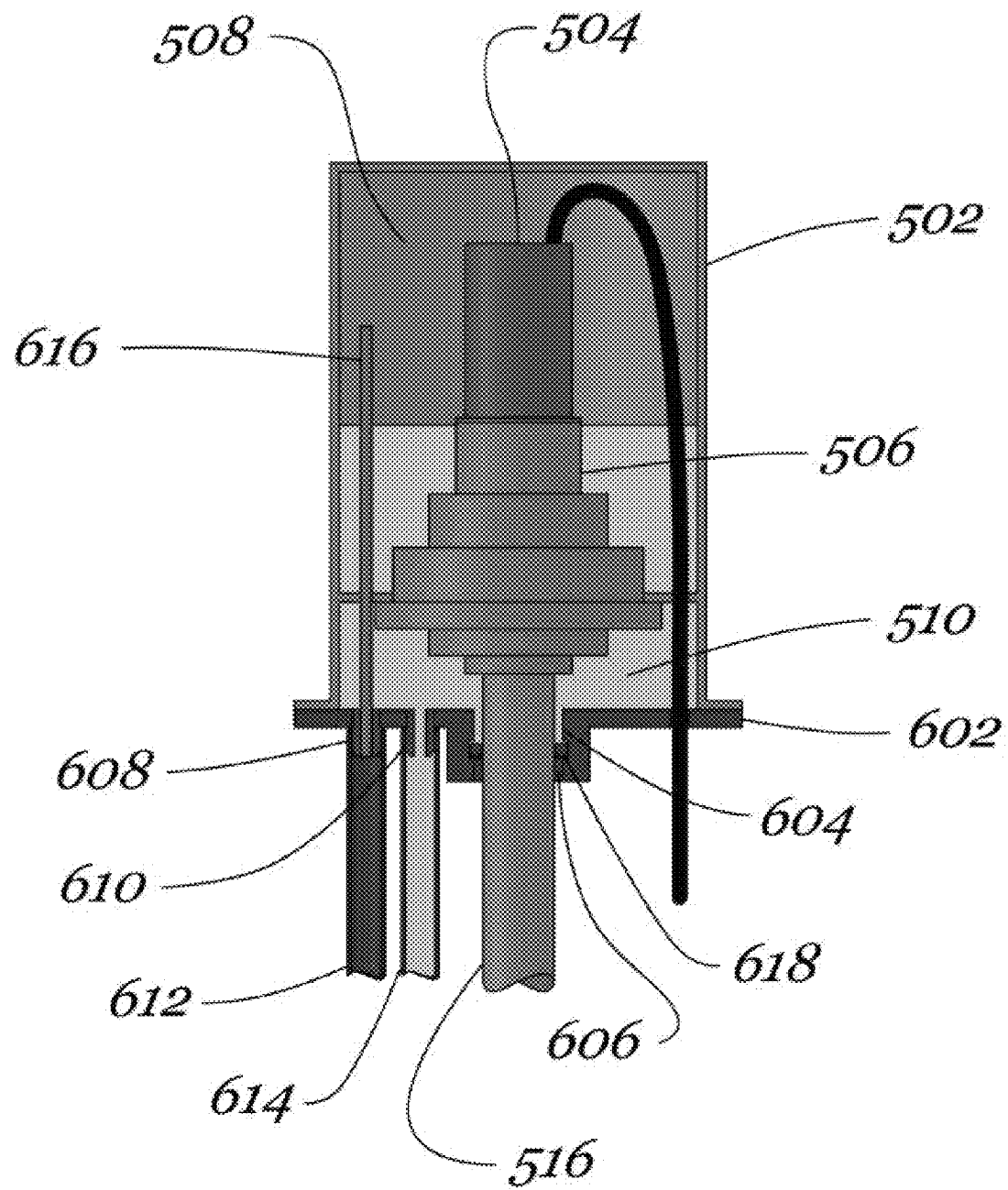
FIG. 6 illustrates the housing of FIG. 5 according to another embodiment of the invention.

FIG. 6 illustrates the housing of FIG. 5 according to another embodiment of the invention. In this embodiment, the housing 502 of FIG. 5 has been extended by means of a bottom cover 602 that fully encloses the motor-generator 504 and the gearbox 506 within the housing 502 and may be sealed by means of a static seal to the housing 502. An opening 604 is provided in the cover 602 through which the rotatable shaft 516 may extend beyond the housing 502 so as to be accessible to transfer mechanical power to and from other equipment disposed in the ambient water. The opening 604 defines a clearance 606 around the rotatable shaft 516. The clearance 606 may be made quite small, thereby limiting the contact area at the oil-water interface 514, and so further limiting the rate of diffusion of trapped fluids into the ambient body of water and the rate of evaporation of the ambient body of water into the air pocket 508. Additionally, the clearance 606 may be fitted with additional means for inhibiting the motion of fluids across the oil-water interface 514. For example, the clearance 606 may be fitted with a porous shield, such as a felt seal. The felt seal can be positioned so that the oil-water interface lies within the volume of the felt seal, and will serve to limit the mixing of the oil layer 510 with the ambient body of water, thereby improving its longevity, while still allowing the pressure inside the housing 502 to equilibrate with the pressure of the ambient body of water. By allowing the internal pressure of housing 508 to equilibrate to the ambient pressure, net hydrostatic pressure on the housing can be effectively eliminated, lessening the need for strength in the housing 502.

The bottom cover 602 could additionally be equipped with ports 608, 610 for supplying air and oil, respectively, to the air pocket 508 and the oil layer 510 from external containers or reservoirs through fluid lines 612, 614. One port 608 can be additionally equipped with a tube 616 for preventing oil flowing from the oil layer 510 into any external air reservoir. Such external reservoirs can be pressurized and equipped with valves and automatic control such that suitable volumes of air and oil can be maintained within the housing 502.

It should be appreciated that the housing 502 may be sealed off from the ambient body of water completely through use of a dynamic seal 618 around the rotatable shaft 516, occupying the clearance 606, as well static seals on all other ports and joints in the housing 502. Through use of external reservoirs with automatic or manual control as described above, it should be appreciated that the pressure inside the housing 502 could be maintained at the same level as that of the ambient body of water surrounding the housing 502, and, therefore, the pressure difference across the seals in the housing 502 can be maintained at nominally zero, making the task of creating effective seals substantially easier. Additionally, the housing 502, although sealed, need not withstand high external pressures, since the pressures on both sides of the housing wall can be made equal. If the seals are all contained below the level of the bottom of the gearbox 506, such as, for example, within the bottom cover, then the seals may not be critical to the continued functioning of the housing 508, since the orientation of the housing prevents buoyant leakage of the trapped fluids, even in the event of failure of any or all of the seals.

Those skilled in the art will appreciate that gearboxes are often manufactured with sealed housings, and that part of housing 502, especially the part containing oil layer 510, could be one and the same as the housing of gearbox 506, and that a second part of housing 502 containing the air pocket 508 around the motor/generator 504 could be fixedly attached and sealed to the gearbox 506 housing. An oil port 610 could similarly be integral with the housing of the gearbox 506 and used for pressurizing the oil within it. The housing of gearbox 506 would then be in direct contact with the ambient body of water and would benefit from the additional cooling provided thereby.

It should be further appreciated, that, according to another embodiment of the invention, maintenance of the air pocket 508 and the oil layer 510 can be carried out passively without the need for active or manual control by making the external reservoirs flexible and disposing them in the ambient body of water at a depth similar to that of the housing 502. Flexible reservoirs will passively equilibrate with the ambient water, and when fluidly coupled to the housing 502, will passively equilibrate with the internal housing pressure as well. If fluid is lost from the housing 502, the ambient water pressure will tend to push additional fluid from the flexible external reservoirs into the housing 502 to replenish it.

It will be apparent to those skilled in the art that FIGS. 4, 5, and 6 disclose a number of methods for robustly and cost-effectively maintaining a favorable operating environment for rotating machinery within a body of water by isolating that machinery from the ambient water. It should be further appreciated that the techniques described in FIGS. 4, 5 and 6 can be readily applied to any number of devices operating in a water environment, including the energy storage devices described herein, and that other variations and possible combinations and uses of the techniques disclosed herein can be made.

Figure 7:
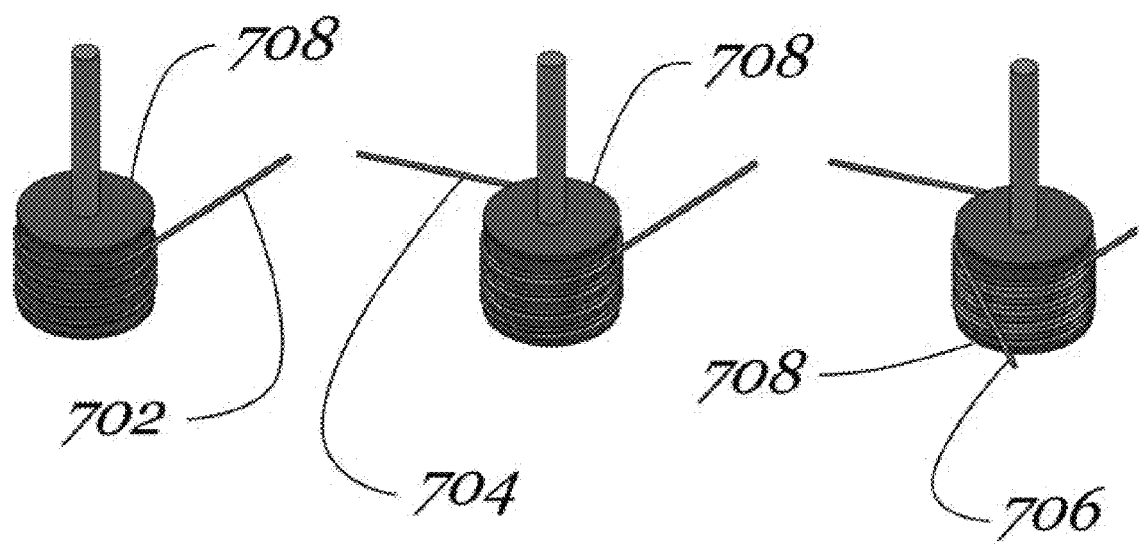
FIG. 7 illustrates a method for winding multiple tethers onto a single central spool according to one embodiment of the invention.

FIG. 7 illustrates a method for winding multiple tethers onto a single central spool according to one embodiment of the invention. As described above in connection with FIG. 3, some embodiments of the energy storage device incorporate multiple tethers and corresponding weights that are wound and un-wound on a common spool, such as the central spool shown in connection with FIG. 3. To operate reliably and unattended for an extended period of time, it may be desirable to carefully control the manner in which the tethers wind onto and unwind from the spool.

In this embodiment, three tethers, 702, 704, 706 are wound around a common or central spool 708 that is rotated by a shaft 710 that may be connected to a motor/generator or that is rotated by movement of the tethers 702, 704, 706 as described above in connection with FIGS. 1-3. Each tether 702, 704, 706 is wound in a helical pattern with a pitch sufficient to allow space between each turn. Each tether 702, 704, 706 first comes into contact with the spool 708 at a different point around the circumference of the spool 708, with the points separated by 120 degrees, so that the tethers 702, 704, 706 together form a triple helix. The pitch of the helix can be designed such that the tethers 702, 704, 706 pack tightly together on the spool 708 to minimize its size. This multiple-helix winding arrangement can be employed with any number of tethers, including as little as two and as many as can be accommodated by an energy storage device.

Figure 8:
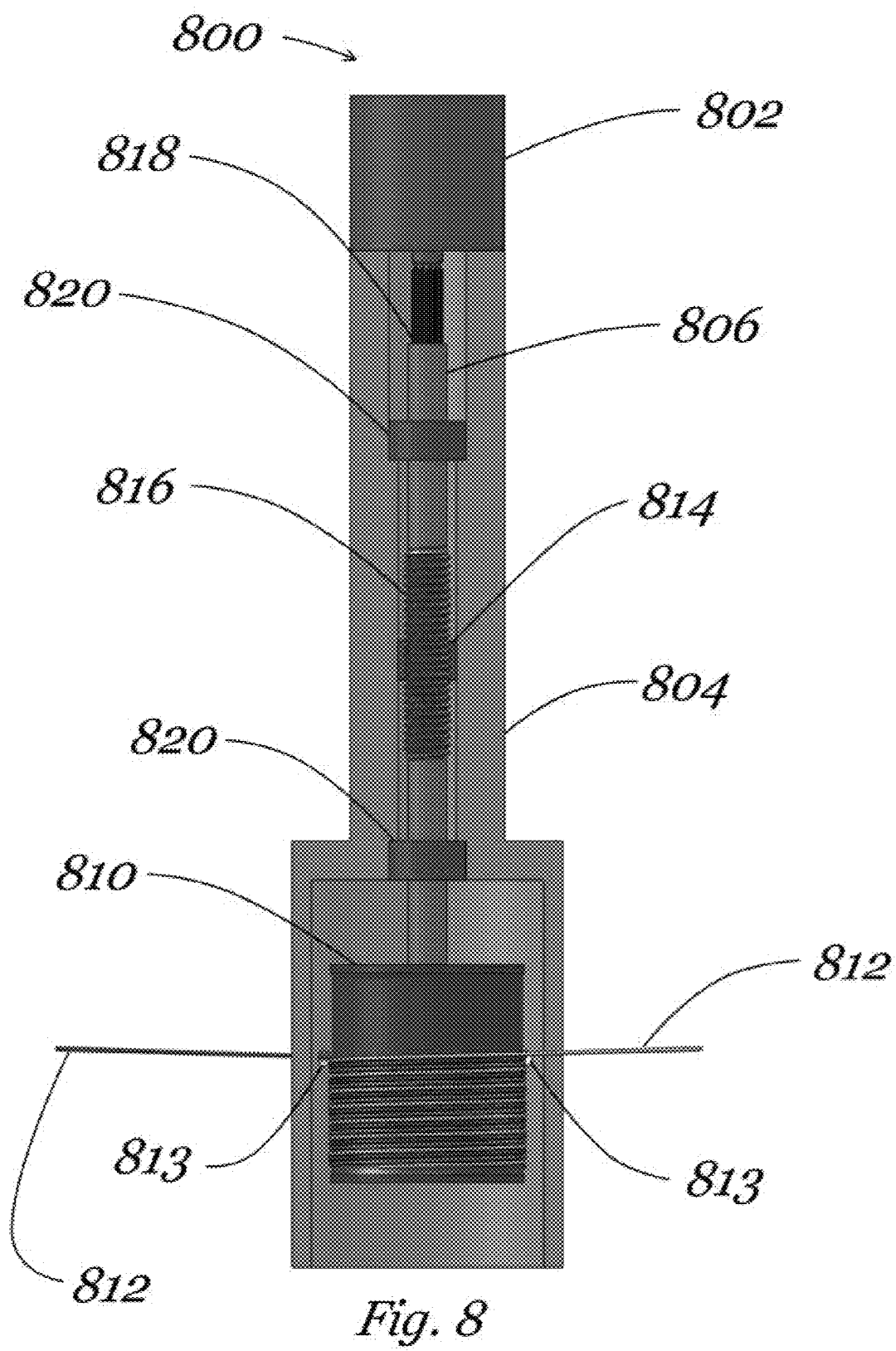
FIG. 8 illustrates a drivetrain for use in an energy storage device that controls the winding and un-winding of tethers on a central spool according to one embodiment of the invention.

FIG. 8 illustrates a drivetrain for use in an energy storage device that controls the winding and un-winding of tethers on a central spool according to one embodiment of the invention. The drivetrain 800 is similar to that described in connection with FIG. 3, wherein the motor/generator 802 is disposed on top of a housing 804 that holds a vertical, rotatable shaft 806 and a central spool 810 for multiple tethers 812 (only two tethers are shown with corresponding holes 813 in the housing 804). However, in this embodiment, a lead screw is used to carefully control the winding and un-winding of the tethers 812 such that they wind in the pattern described in connection with FIG. 7, the helix pattern.

The lead screw includes two threaded components that cooperatively screw together. These two threaded components are a lead screw internal thread 814 and a lead screw external thread 816. The internal lead screw thread 814 is a stationary internally threaded portion of the housing 804 located adjacent to a portion of the vertical rotatable shaft 806 such that the vertical rotatable shaft 814 passes through this lead screw internal thread 814. It should be appreciated that this lead screw internal thread 814 may be a fixed or integral portion of the housing 804 or may be a separate piece, such as a nut, that is fixedly attached to the inside of the housing 804. The lead screw external thread 816 is thread disposed on a portion of the vertical rotatable shaft 806 adjacent to the lead screw internal thread 814. The lead screw external thread 816 extends along a portion of the vertical rotatable shaft 806 for a length necessary to completely wind and un-wind the tethers 812 about the central spool 810.

In addition, the motor/generator 802 is coupled to the vertical rotatable shaft 806 with a splined interface 818. This splined interface 818 transmits torque but allows the vertical rotatable shaft 806 to slide axially. Accordingly, the bearings 820 that support the vertical rotatable shaft 806 allow for both axial and rotational motion to accommodate the axially and rotational motions of the vertical rotatable shaft 806. This axially-free but rotationally-coupled connection may be achieved by any method known in the art, such as a ball spline or flexure. Given the use of the lead screw, it should be appreciated that the vertical rotatable shaft 806 may have a relatively longer length. Therefore, the length of the housing 804 may be extended to accommodate the additional length of the vertical rotatable shaft 806.

In operation, the lead screw, including the lead screw internal thread 814 and the lead screw external thread 816, operate cooperatively to move the vertical rotatable shaft 806 axially, thereby moving the vertical rotatable shaft 806 and the spool 810 in an axially or vertical up and down direction. This is accomplished in part due to the splined interface 818 that couples the vertical rotatable shaft 806 to the motor/generator 802, which allows the vertical rotatable shaft 806 to move axially toward and away from the motor/generator 802 while still remaining connected to the motor/generator 802 and while rotating as well. Accordingly, when the motor is used to rotate the vertical rotatable shaft 806, the lead screw external thread 816 cooperates with the lead screw internal thread 814, which is in a fixed position, to move the vertical rotatable shaft axially. This in turn causes the central spool 810 to not only rotate but to also move axially. Similarly, when the central spool 810 is rotated based upon a release of the potential energy that pulls on the tethers 812, the lead screw external thread 816 again cooperates with the lead screw internal thread 814 to move the vertical rotatable shaft axially in the opposite direction. The rotation of the central spool 810 concurrently with its movement in an axially direction allows multiple tethers to be wound about the central spool 810 in a multiple, helical pattern, as described in connection with FIG. 7 and to similarly be un-wound.

It should be appreciated that this drivetrain embodiment may be used with any of the energy storage devices described herein, including, for example, those described in connection with FIGS. 1 and 3 and variants thereof. In particular, the lead screw and lead screw thread on the vertical shaft may be used in connection with the drivetrains described in connection with FIGS. 4-6 such that lead screw and lead screw thread can be used in conjunction with the various fluids used within the housing of those drivetrains.

Figure 9:
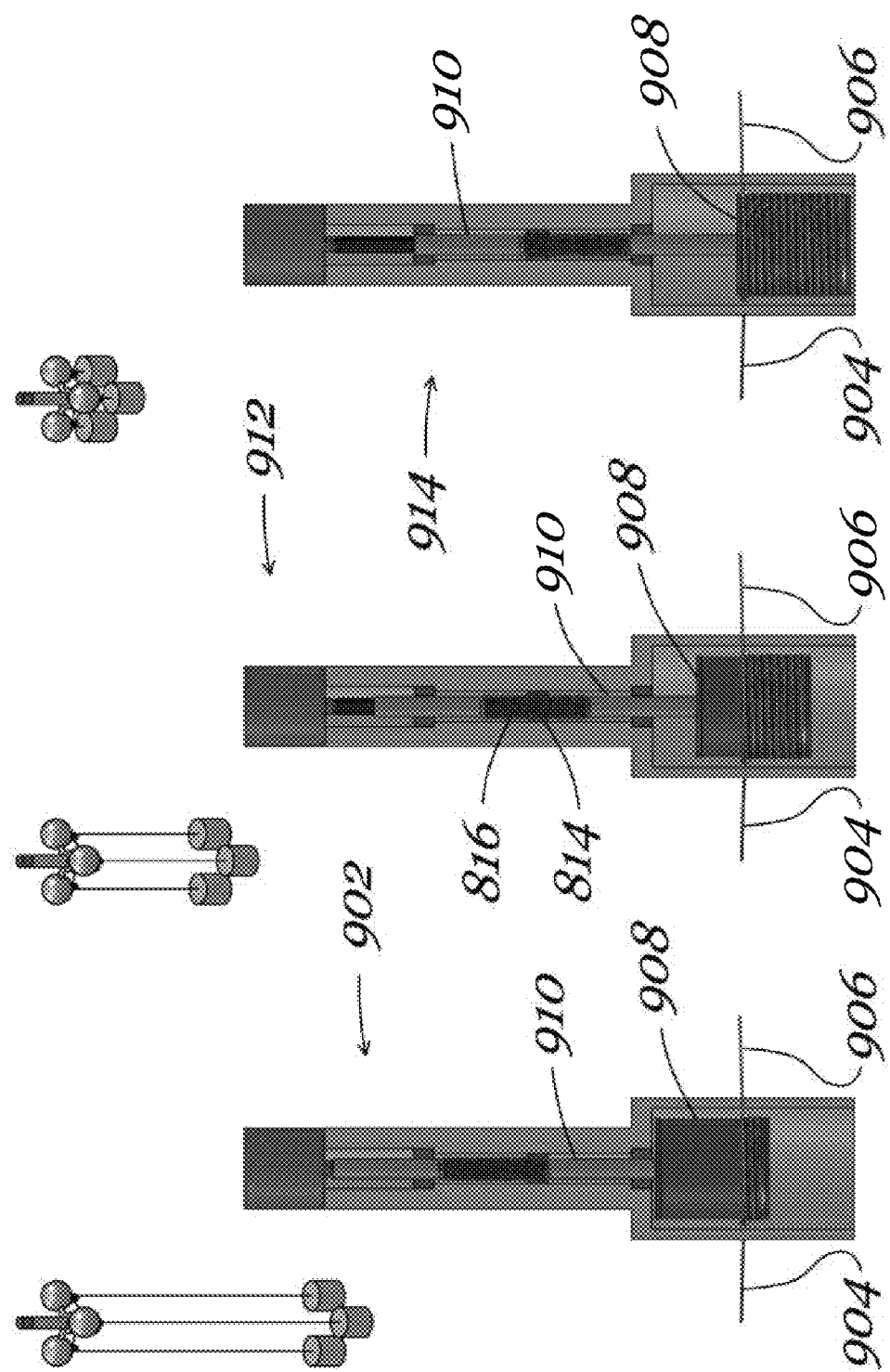
FIG. 9 illustrates the drivetrain of FIG. 8 in three different operational states: no energy stored, some energy stored, and a maximum amount of energy stored.

FIG. 9 illustrates the drivetrain of FIG. 8 in three different operational states: no energy stored, some energy stored, and a maximum amount of energy stored. In addition, images of an energy storage device such as one described in connection with FIG. 3 are illustrated next to each of the different operational states. It should be appreciated that FIG. 9 is similar to FIG. 2 and the description regarding FIG. 2 is applicable to FIG. 9 as well, including the description regarding the length of the tethers, the size of the weights, and the depth of the body of water in which the energy storage device and drivetrain are used.

The state of the drivetrain 902 on the far left of FIG. 9 illustrates the drivetrain when no energy is being stored. In this case, the tethers 904, 906 are fully extended or un-wound from the central spool 908 such that their corresponding weights are at the furthest distance from the central spool 908. Accordingly, the central spool 908 and the vertical rotatable shaft 910 are at their highest position. It should be appreciated that while only two tethers 904, 906 are shown, if additional tethers are in use, they similarly would be fully extended and un-wound from the central spool 908. Further, even though the tethers 904, 906 are considered to be fully extended, there may still be a few windings of the tethers 904, 906 around the central spool 908 as shown.

The state of the drivetrain 912 shown in the middle of FIG. 9 illustrates the drivetrain after the weights have been raised by some amount such that some energy has been stored. In this case, electrical energy supplied to the energy storage device for storage has been used by the motor to rotate the central spool 908 to wind the tethers 904, 906 about the central spool 908, thereby pulling the corresponding weights up and creating an amount of potential energy. As shown, roughly half the lengths of the tethers 904, 906 are wound onto the central spool 908. Accordingly, the vertical rotatable shaft 910 and the central spool 908 have advanced downward, and the lead screw external thread 816 is approximately centered with respect to the lead screw internal thread 814. Also, the central spool 908 is roughly half-filled with the tethers 904, 906 wrapped around it.

The state of the drivetrain 914 shown on the far right of FIG. 9 illustrates the drivetrain after the weights have been raised by their maximum amount. In this case, electrical energy supplied to the energy storage device for storage has been used by the motor to rotate the central spool 908 to wind the tethers 904, 906 about the central spool 908, thereby pulling the weights up as far as possible. In other words, the entire lengths of the tethers 904, 906 has been wound about the central spool 908 such that the weights are at their highest point and are storing the maximum amount of potential energy for later use. Accordingly, the vertical rotatable shaft 910 and the central spool 908 are now at the lower extent of their vertical or axial travel, and the lead screw external thread 816 has threaded itself all the way through the lead screw internal thread 814 and are at the extreme opposite position of that shown in the drivetrain 902 shown in the far left. Also, the central spool 908 is completely filled with the tethers 904, 906 wraps in a multiple-helix winding pattern.

Figure 10:
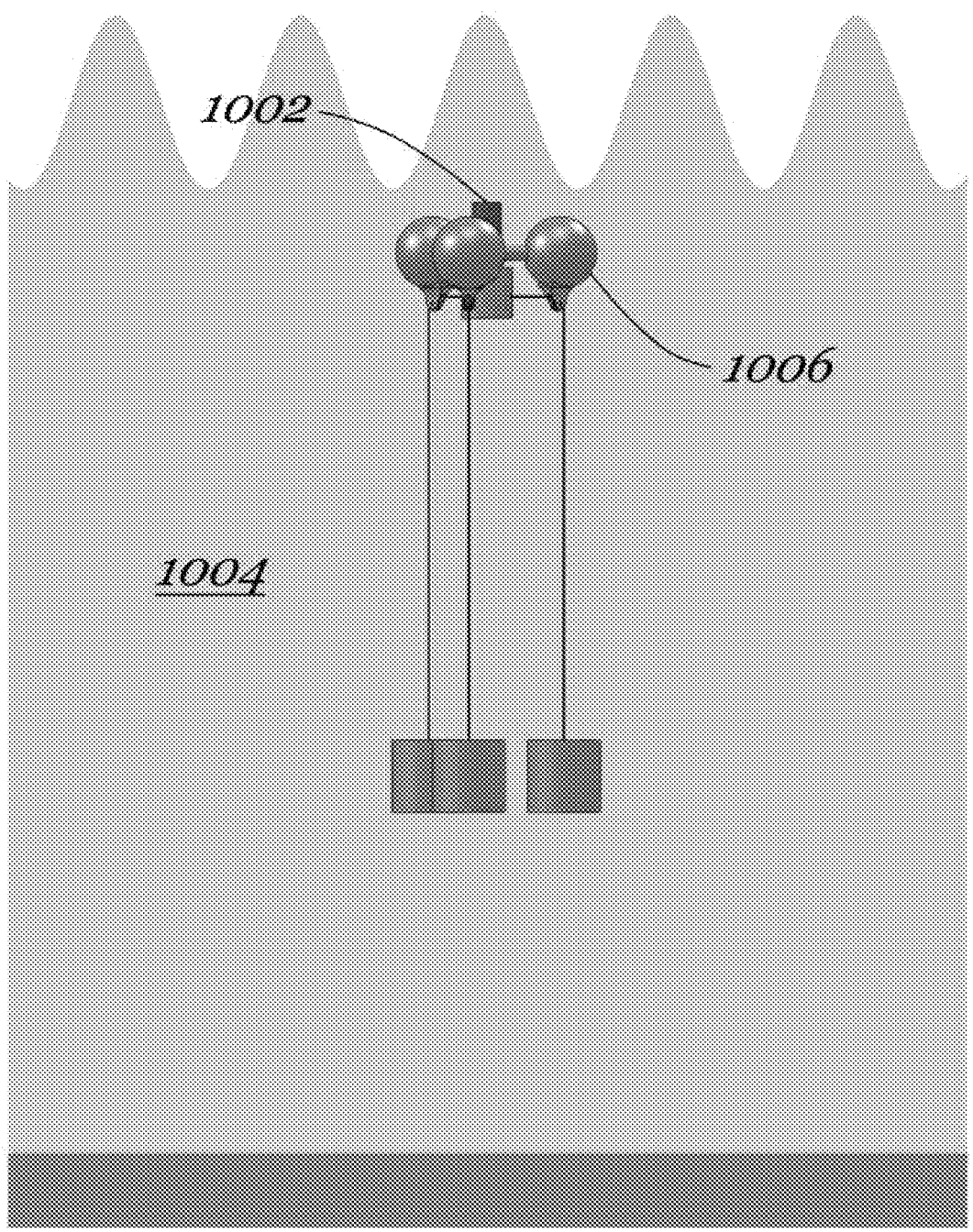
FIG. 10 illustrates an energy storage device according to another embodiment of the invention.

FIG. 10 illustrates an energy storage device according to another embodiment of the invention. The energy storage device 1002 is similar to that described in connection with FIG. 3; however, in this embodiment, the energy storage device 1002 is disposed below the surface of the body of water 1004. The placement of the energy storage device 1002 at a given position or depth is accomplished by designing the floats 1006 such that the energy storage device 1002 is neutrally buoyant at the desired depth. Alternatively, the floats 1006 can be designed to make the energy storage device 1002 positively buoyant but held in place at the desired depth below the surface of the body of water 1004 using one or more mooring cables.

By placing the energy storage device 1002 below the surface of the body of the water 1004, waves that may otherwise move the energy storage device and impede its smooth operation. For example, relatively high waves may move the energy storage device 1002 to such a degree that the floats 1006 move and cause the tether and corresponding weights 1008 to possibly become entangled. In addition, by keeping the energy storage device 1002 below the surface, particularly when displaced in a salt water environment, it remains completely submerged and free from possible corrosion caused by exposure to both salt water and oxygen in the air.

Figure 11:
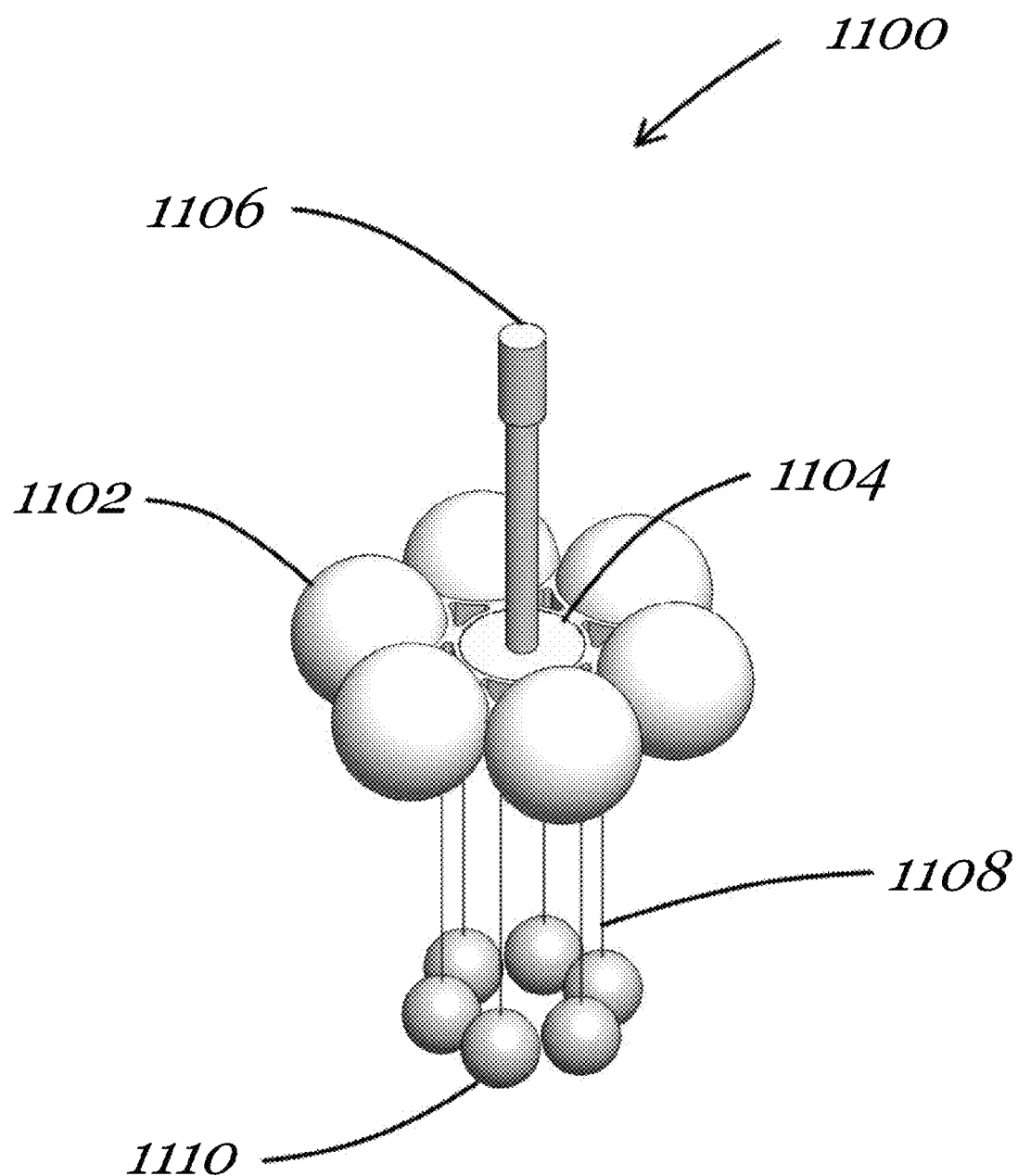
FIG. 11 illustrates an energy storage device that uses the movement of multiple weights to store and release energy according to another embodiment of the invention.

FIG. 11 illustrates an energy storage device that uses the movement of multiple weights to store and release energy according to another embodiment of the invention. The energy storage device 1100 uses the movement of weights to store and release energy similar to the energy storage devices described in connection with FIGS. 1 and 3. Therefore, the descriptions regarding those energy storage devices apply as well to the energy storage device 1100 described in connection with this FIG. 11.

In this energy storage device 1100, multiple stationary floats 1102 are attached to a support structure 1104. The floats are designed with sufficient buoyancy to support the energy storage device 1100 on top of a surface of a body of water or near the surface. The support structure 1104 may be made from any material compatible with the water in which the energy storage device 1100 will be used and provided it is sufficient to hold the various components of the energy storage device 1100.

A central housing 1106 houses a drivetrain including a motor/generator, a vertical rotatable shaft, and a central spool similar to those described in connection with FIG. 3, noting that the variations described in connection with FIGS. 4-8 may also be used or incorporated. The motor/generator is connected to an electrical cable (not shown) through which energy to be stored is passed to the energy storage device 1100 and through which the stored energy is passed back for use. Each of the floats 1102 has a corresponding tether 1108 that is attached at one end to the central spool and a weight or dense mass 1110 at the other end. As described in connection with FIG. 3, each tether 1108 may pass through a pulley (not shown) associated with each float 1102 to translate the vertical travel of the tethers 1108 to a horizontal direction before passing to the spool. Alternatively, each tether 1108 may pass through a pulley (not shown) attached to a bottom surface of the support structure 1104.

Operation of this energy storage device 1100 is similar to the operation of those described previously. Accordingly, each of the multiple weights 1110 is raised or lowered in proportion to the amount of energy stored and released, respectively.

Figure 12:
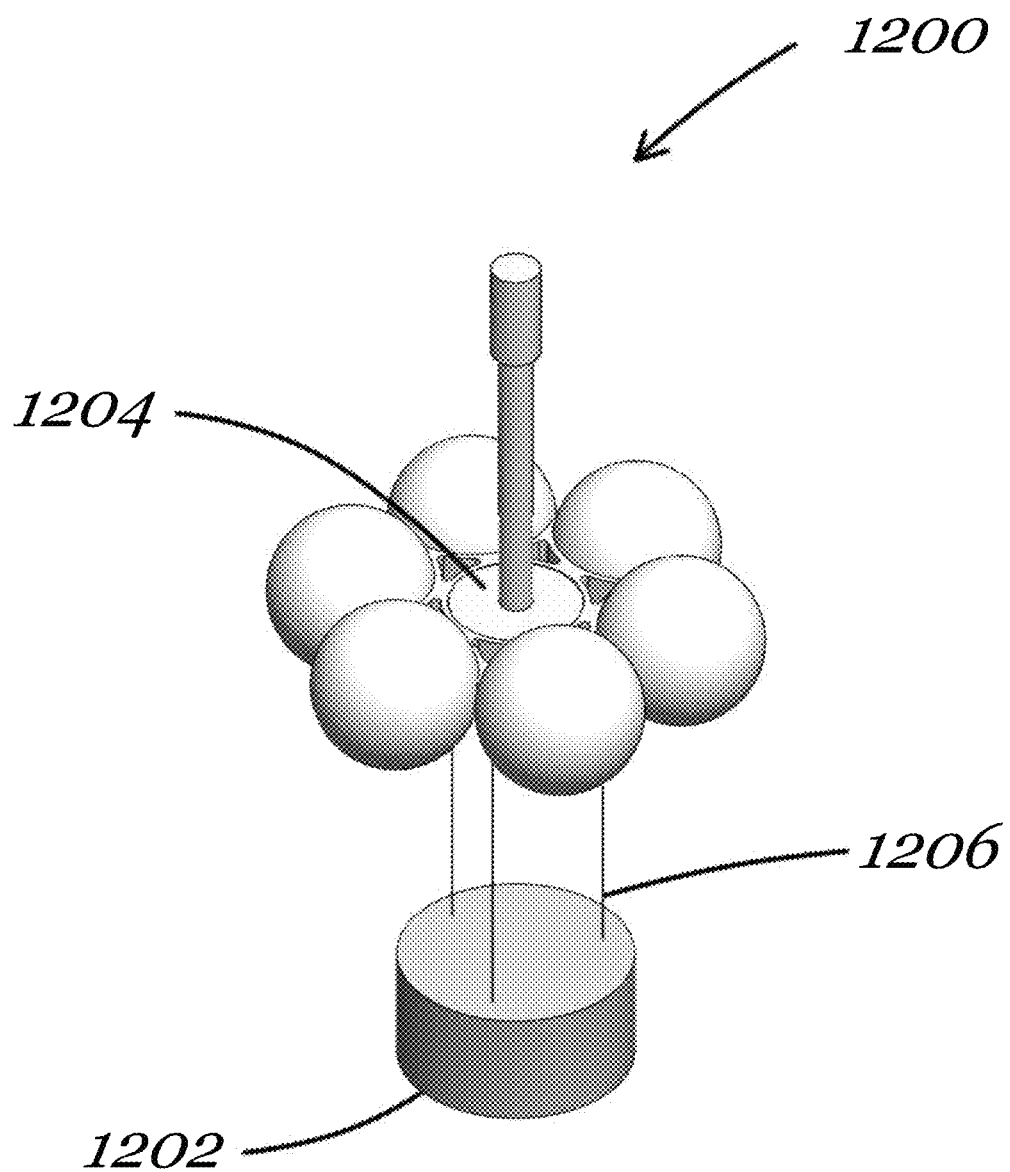
FIG. 12 illustrates an energy storage device that uses the movement of a single weight to store and release energy according to another embodiment of the invention.

FIG. 12 illustrates an energy storage device that uses the movement of a single weight to store and release energy according to another embodiment of the invention. The energy storage device 1200 is similar to that described in connection with FIG. 11 with the exception that instead of multiple weights being used corresponding to each float, only one weight 1202 is used. This single weight 1202 is attached to a support structure 1204 using multiple tethers 1206, the number of which depends upon the size and shape of the weight 1202. Each of the tethers 1206 may pass through a corresponding pulley (not shown) attached to the bottom of the support structure 1204 to translate the vertical travel of the tethers 1206 to a horizontal direction before passing to a central spool.

Figure 13:
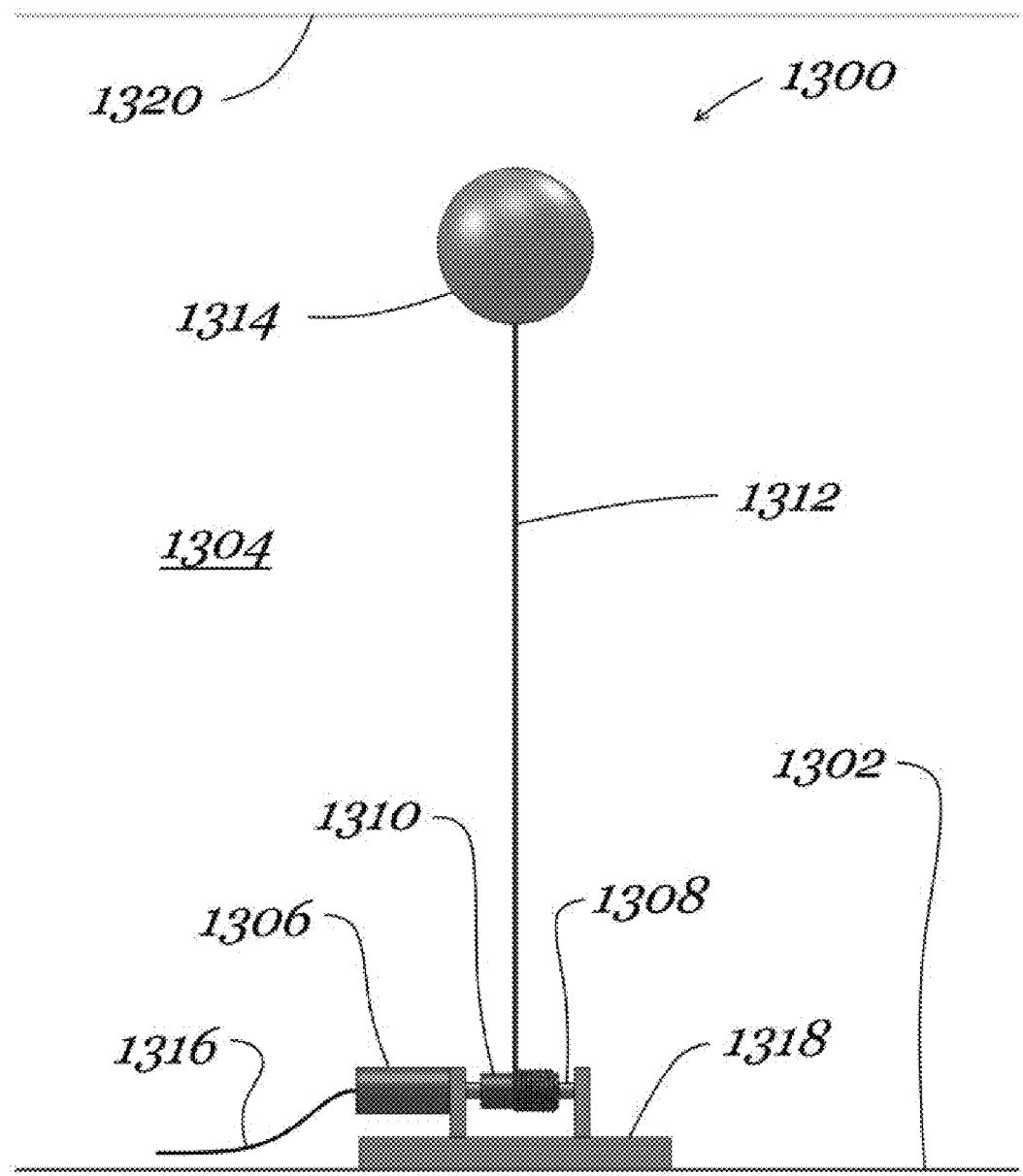
FIG. 13 illustrates an energy storage device that uses the movement of floats to store and release energy according to one embodiment of the invention.

FIG. 13 illustrates an energy storage device that uses the movement of floats to store and release energy according to one embodiment of the invention. In this embodiment, the energy storage device 1300 is disposed on the bottom 1302 a body of water 1304. The energy storage device 1300 has several components, including a motor/generator 1306, a rotatable shaft 1308, a spool 1310, a tether 1312, and a float 1314, which is the mass that is moved to store and release energy. The energy storage device 1300 receives energy for storage and delivers stored energy for use through an electrical cable 1316 that is electrically connected to the motor/generator 1306.

It should be appreciated that the energy storage device 1300 is somewhat similar to that described in connection with FIG. 1; however, the energy storage device 1300 is disposed on the bottom 1302 of a body of water 1304 instead of on the surface, and a float 1314 is used instead of a weight as the component or mass used to store potential energy. Since the energy storage device 1300 is disposed on the bottom of a body of water, the components of the energy storage device 1300 must be capable of operating underwater. Accordingly, any means known in the art for operation of a motor/generator underwater may be used, such as submersible motor/generators. Also, an appropriate enclosure (not shown) can be used to enclose the motor/generator 1306, as well as the other components disposed on the bottom of the water, provided that such enclosure has the necessary water-tight or sealed openings to allow for the tether 1314 and the electrical cable 1316. If should be appreciated that more than one enclosure can be used for each separate component, or for a subset of the components, disposed on the bottom of the water. Further, redundant enclosures may be used such that one enclosure fits inside of another.

The motor/generator 1306 is similar to the motor/generator 1306 described in connection with FIG. 1. Therefore, the discussion regarding the motor/generator of FIG. 1 applies here as well. The motor/generator 1306 includes both a motor and a generator and is coupled to the rotatable shaft 1308, which is coupled to the spool 1310. Accordingly, the motor generator 1304 is configured to operate as both a motor and as a generator. When the motor/generator 1304 receives electricity or acts as an electrical load, the motor/generator acts as a motor and rotates the rotatable shaft 1308 in one direction. When the rotatable shaft is rotated in the opposite direction or is backdriven (by the spool 1310 as described further below), the motor/generator 1306 acts as a generator producing electricity. The rotatable shaft 1308 is coupled to the spool 1310 such that rotation of either the rotatable shaft 1308 or the spool 1310 will cause rotation of the other. It should be appreciated that the spool 1310 is mounted concentric with the rotatable shaft 1308 and may be supported on bearings in bearing carriers.

The rotatable shaft 1308 may be any shaft known in the art, and one of skill in the art will appreciate how to size the rotatable shaft 1308 to be compatible with the motor-generator 1306. Also, one of skill in the art will appreciate the materials from which the rotatable shaft 1308 can be made, given the mechanical demands and stresses and strains that will be placed on the rotatable shaft 1308, as well as its environmental surroundings.

Similarly, the spool 1310 may any spool known in the art, and one of skill in the art will appreciate how to size the spool 1310 to be compatible with the rotatable shaft 1308. Also, one of skill in the art will appreciate the materials from which the spool 1310 can be made, given the mechanical demands and stresses and strains that will be placed on the spool 1308, as well as its environmental surroundings.

As noted, the motor/generator 1306, the rotatable shaft 1308, and the spool 1310 are disposed on the bottom 1302 of the body of water 1304. These components may be attached to a weight or weighted base 1318 at one or more points. The weighted base 1318 should be of sufficient size, surface area and mass, to accommodate these components and to allow the energy storage device 1300 to remain stationary on the bottom 1302 of the body of water 1304. It should be appreciated that the weighted base 1318 may also be anchored to any underlying bedrock on the bottom 1302 either through anchors incorporated directly into the weight or through one or more cables that are attached to the weighted base 1318 and anchored to the bottom 1302 at an adjacent or nearby location. The weighted base 1318 should be made of a material that is sufficient to withstand any corrosion or other environmental conditions that would affect the life of the weight for a sufficient period of time. Accordingly, the weighted base 1318 may be made from, for example, concrete or any other materials as described above in connection with the weights in FIG. 1. Alternatively, to the extent that an enclosure is used to enclose the components disposed on the bottom 1302 or the body of water 1304, such enclosure may also be used to enclose the weighted base 1318.

More particularly, the weighted base can be made from any material, so long as the weight is denser than the ambient water overall. Ideally these materials would also be low cost. Concrete is an example of such a material. Concrete could also be used to form a structural shell that could be filled with other materials that are dense and low-cost, such as sand or gravel, or dredgings from the ocean floor. Large pieces of dense and low-cost aggregate, such as stone, iron ore, or construction debris, could also be cast into a concrete matrix. A number of shapes could be employed. Spheres, cylinders, extruded polygons, ellipsoids, or cones could all be used. Shapes that are relatively flat relative to their volume may be of particular advantage because they may allow the floats to be drawn down to a deeper maximum depth than would be possible with taller floats. Shapes that are closer to spherical may also be of particular advantage, because spheres have the lowest surface area to volume ratio, and therefore could provide the most amount of volume to fill with a low cost, loose fill material like sand per unit invested structural material like steel or concrete to contain the fill.

The tether 1312 is attached at one end to the spool 1310 and extends upward from the spool 1310 into the body of water 1304 where is it attached to a float 1314 at its opposite end. The buoyancy of the float 1314 is what acts to extend or pull the tether 1312 upward from the spool 1310. The tether 1312 may be attached to the float 1314 by any means known in the art sufficient to ensure that the float 1314 will not detach from the tether 1312.

The tether may be made from any material provided has sufficient strength to hold the float and the ability to be wound and un-wound around a spool. In addition, the tether should be made of a material that is sufficient to withstand the water conditions, such as salt water, in which it will be used. For example, if a significantly buoyant tether is used, the tether may be a metal cable; however, if the tether will be used in an ocean water environment, the particular metal selected will need to withstand corrosion from the salt water. The material should also have a sufficiently long useful life to minimize maintenance for the energy storage device. The diameter of the tether should be sized based on similar considerations. The length of the tether may be any length depending upon the depth of the body of water in which it is used and the desired energy storage capacity of the energy storage device, as described in more detail below.

As described above, tethers could be a fiber rope, such as nylon, or a wire rope, such as steel cable. Wire rope might be made from stainless steel, such as 302 or 304 stainless, to resist corrosion. Tethers could also be high-strength fiber, such as an ultra-high-molecular-weight polyethylene fiber. Tethers could be commercially available products or custom designed and manufactured. As an example, a tether supporting a 16 foot diameter spherical float would need to operate under a load of approximately 137,000 lbs and might be approximately 3 inches in diameter, depending on the material and method of construction. Each tether could also be made up of multiple, independent cords, which could be braided together or simply run parallel to one another. Tethers could be jacketed with a protective sheath to protect against abrasion, marine growth, and other potential hazards.

The float may be any object that has a desired or predetermined buoyancy, which is proportional to the amount of energy that can be stored, as discussed in more detail below. In other words, the float is designed with a desired or predetermined buoyancy to provide the energy storage device with the desired energy storage capacity, given the depth of the body of water in which it will be used. For example, if the body of water is relatively shallow, a float having a greater buoyancy may be used to increase the amount of energy that can be stored, since a float with greater buoyancy requires more energy to pull it downward thereby storing a greater amount of potential energy. Further, even when the body of water has a significant depth, a float having a greater buoyancy may be used to increase the amount of energy that can be stored. Of course, the opposite is true for a float having a relatively lower buoyancy.

The float's buoyancy is the difference between the weight of the water it displaces and the weight of the float itself. The buoyancy of a float can be adjusted by varying the size of a float made from a fixed mass of material, by varying the mass of a float of fixed volume, or by varying both the mass and volume at once. For example, a flexible float that is pressurized internally with air to a pressure less than the maximum external pressure it experiences will tend to compress when the external pressure exceeds the internal pressure, causing the volume of the float to decrease while the mass stays the same, and thus lessening the float's buoyancy.

The float may be made from any material, but the water environment to which the float will be exposed should be taken into account in selecting a material. The float may be any shape or size, which may also be determined based upon the conditions in which the energy storage device will be used. For example, if the energy storage device will be used in rough, open ocean or in significant currents, a larger, more stable float may be desirable.

Floats may be made in any number of suitable ways. They may be flexible, like a balloon, and internally pressurized to resist loss of volume at high pressures underwater. A flexible float might be made out of a waterproof fabric, such as rubberized nylon. Floats may also be rigid. For example, they could be made to be hollow shells of concrete, steel, or plastic. Rigid floats may need to resist large pressures at deep ocean depths. For example, a float drawn to 330 feet of depth would need to resist approximately 10 atmospheres of external pressure. Rigid floats could be filled with internal support to prevent buckling under high external pressures. For example, they could be filled with foam. Rigid floats could also be filled with fluid could also supply buckling resistance, so long as the net density of the filled float is less than that of water. A low-density incompressible liquid, such as pentane, could be used. A pressurized gas, such as air, could also be used. It may be desirable to have the floats weigh as little as practical, since the weight of the float subtracts from the amount of energy the float can store. Since the float may need to be strong to resist being crushed at high ocean pressures (or, in the case of an internally pressurized float, to resist rupturing due to high internal pressure), it may be desirable to use a high strength-to-weight ratio material, such as fiber-reinforced plastic, such as fiberglass or carbon fiber, to form the shell. Such a fiber-reinforced plastic shell could be formed by any method known to those skilled in the art, such as vacuum forming or single-strand winding. Floats may need an attachment point for one or more tethers, which could be formed integrally into the structure of the float. Floats may also need ports in order to be filled with liquid or gas. Suitable openings for ports could be formed into the float or could be cut afterward. Ports could be fitted with valves for fluidly coupling and decoupling the interior of the float to a source of fluid and fittings for attaching fluid hoses or pipes.

Floats could also be finished or coated so as to reduce hydrodynamic drag. For example, floats could be finished with a smooth polished surface to limit skin friction. Floats could also be finished with an antifouling coating or paint, such as is used on ships to inhibit marine growth during extended periods in the water.

Floats could be made to be any suitable shape, such as spheres, cylinders, ellipsoids, cones, polygonal prisms, toroids, and so forth. One shape that may be of particular advantage is a teardrop, since it would have an especially hydrodynamic shape, and would minimize viscous losses as the float moved through the water. Shapes structurally efficient at resisting pressure, and shapes that are short relative to their volume to allow for maximum float travel in a given water depth may have particular advantage. For example, spheres and cylinders with spherical or elliptical ends may be of particular advantage because of their structural efficiency at withstanding pressure. Floats could also be made up of many smaller closed bodies bundled together, for example, by a net.

Floats could be made to be any size, with displacements ranging from hundreds to millions of pounds, with practical sizes likely being in the range of 50,000 to 200,000 lbs. As an example, a spherical buoy 16 feet in diameter has a displacement of approximately 137,000 lbs.

Similar to the energy storage device of FIG. 1, the energy storage device 1300 receives energy for storage and delivers stored energy for use through the electrical cable 1316 that is electrically connected to the motor/generator 1306. Energy to be stored by the energy storage device 1300 is supplied to the energy storage device 1300 as electricity from a source of electricity by the electrical cable 1316. When the stored energy is required for use, the energy storage device 1300 delivers the stored energy as electricity through the electrical cable 1316 to an electrical load. It should be appreciated that the source of electricity and the electrical load at end of the electrical cable 1316 opposite that end connected to the motor/generator 1306 may be any electrical source and any electrical load. For example, the electrical source may be a grid with excess electrical generation capacity, co-located renewable or conventional generation, or remote renewable or conventional generation. The electrical load may also be an electric grid or any other load that can utilize the amount of electricity provided by the generator portion of the motor/generator 1306. It should be appreciated that the electrical energy supplied to the energy storage device 1300 for storage for the electrical energy released from the energy storage device 1300 for use may be any form of electrical energy, including alternating current or direct current.

In operation, when energy to be stored is delivered to the energy storage device 1300 as electricity through the electrical cable 1316, the motor of the motor/generator 1306 is utilized. In this case, the motor provides an electrical load for the electrical energy delivered to the energy storage device 1300 through the electrical cable 1316, which causes the rotatable shaft 1308 to rotate thereby converting the electrical energy to mechanical energy. The rotation of the rotatable shaft 1308 rotates the spool 1310 causing the tether 1314 to be wound around the spool 1310 thereby retracting the tether 1312. As the tether 1312 is wound around the spool 1310 or retracted, it pulls the float 1314 down through the water toward the bottom 1302 of the body of water 1304. By pulling the float 1314 down, the electrical energy utilized by the motor that has been converted to mechanical energy is now converted to potential energy stored by the float 1314, which is now held at a depth below that at which it started in proportion to the amount of energy transmitted to the motor of the motor/generator 1306.

When the stored potential energy is to be used, the float 1314 is allowed to rise up toward the surface 1320 of the body of water 1304, thereby releasing the potential energy. As the float 1314 rises, the tether 1312 is pulled and unwinds from the spool 1310, which causes the spool 1310 to rotate in the opposite direction from when the spool 1310 was used to wind the tether 1312 and to raise the float 1314. As the spool 1310 rotates, the rotatable shaft 1308 also rotates, again in the opposite direction from when the motor was used to rotate the rotatable shaft 1308. The rotation of the rotatable shaft 1308 in this direction causes the generator of the motor/generator 1306 to be used, thereby generating electricity that is transmitted over the electrical cable 1316 to an electrical load for use. Accordingly, the potential energy in the float 1314 is converted to mechanical energy that rotates the spool 1310 and the rotatable shaft 1308 that is then converted to electrical energy by the generator. In general, the overall control of the energy storage device 1300 may be done in the same manner described above in connection with FIG. 1.

It should be appreciated that the overall size of the energy storage device 1300 and its component parts may range depending upon the amount of energy desired to be stored and the body of water in which the energy storage device 1300 will be used. For example, if a larger amount of energy is to be stored and if the energy storage device 1300 will be operated in open ocean, the device may need to be relatively larger to both accommodate storing a larger amount of energy and to maintain stability in the ocean. Of course, as discussed above, the depth of the body of water in which the energy storage device is used and the size or mass of the weight used will affect the amount of energy stored. In some embodiments, the size of the energy storage device is as described above in connection with FIG. 1.

Figure 14:
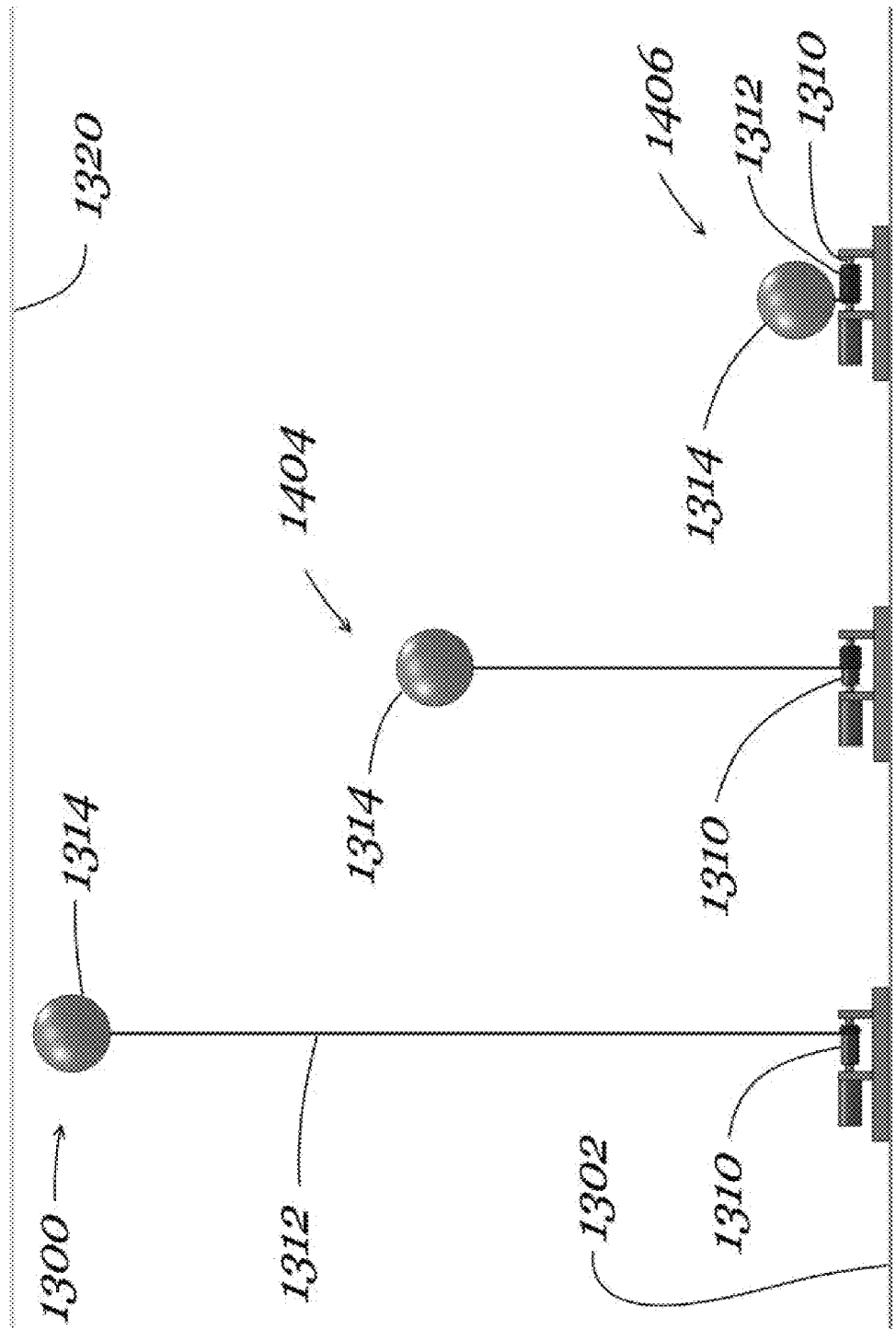
FIG. 14 illustrates the energy storage device of FIG. 13 in three different operational states: no energy stored, some energy stored, and a maximum amount of energy stored.

FIG. 14 illustrates the energy storage device of FIG. 13 in three different operational states: no energy stored, some energy stored, and a maximum amount of energy stored. The state of the energy storage device 1302 on the far left of FIG. 14 illustrates the device when no energy is being stored. In this case, the tether 1312 is fully extended such that the float 1314 is at the furthest distance from the spool 1310. In some embodiments, the length of the tether 1312 when fully extended may allow the float 1314 to be at or near the surface 1320 of the body of water 1304. Although, it should be appreciated that the length of the tether 1312 when fully extended may be shorter than the distance from the spool 1310 on the bottom 1302 of the body of water 1304 to the surface of the body of water 1304.

It should be appreciated that the length of the tether 1312 used is directly proportional to the amount of energy that can be stored. In other words, a longer tether 1312 allows the float 1314 to be lowered a greater distance, thereby storing a larger amount of potential energy. Similarly, a shorter tether 1312 will be more limited in the distance the float 1314 can be lowered, thereby limiting the amount of potential energy that can be stored. Accordingly, a deeper the body of water will allow for use of a longer tether, thereby providing for the ability to store a larger amount of energy. Similarly, the buoyancy of the float 1312 is also proportional to the amount of energy that can be stored. Using a more buoyant float 1312 will result in the storage of more potential energy that using a less buoyant float that would be easier to pull downward.

The state of the energy storage device 1404 shown in the middle of FIG. 14 illustrates the device after the float 1314 has been lowered by some amount. In this case, electrical energy supplied to the energy storage device for storage has been used by the motor to rotate the spool 1310 to wind the tether about the spool 1310, thereby pulling the float 1314 down and creating a given amount of potential energy.

The state of the energy storage device 1406 shown on the far right of FIG. 14 illustrates the device after the float 1314 has been lowered by its maximum amount. In this case, electrical energy supplied to the energy storage device for storage has been used by the motor to rotate the spool 1310 to wind the tether 1312 about the spool 108, thereby pulling the float 1314 down as far as possible. In other words, the entire length of the tether 1312 has been wound about the spool 1310 such that the float 1314 cannot be lowered any further in height. In this state, the float 1314 is at its lowest point and is storing the maximum amount of potential energy for later use.

As described above, to release the stored energy, the float 1314 is allowed to rise back towards the surface 1320 of the body of water 1304, thereby turning the spool 1310 as the float 1314 rises. The spool 1310 backdrives the motor/generator 1306 via the rotatable shaft 1308, and the motor/generator 1306 converts the released potential energy into electrical energy, while providing a mechanical torque that resists the torque the float 1314 exerts on the spool 1310, thereby controlling the rise of the float 1314.

It should be appreciated that the energy storage device operates smoothly between the various stages illustrated in FIG. 14. In particular, the middle stage 1404 illustrated in FIG. 14 is exemplary and is not necessarily a specific point or discrete stage at which the energy storage devices stops operation. In other words, the energy storage device may move freely between the stage of no energy storage 1402 and maximum energy storage 1406, stopping at any point in between whether the energy storage device is in the process of storing energy or releasing energy.

Figure 15:
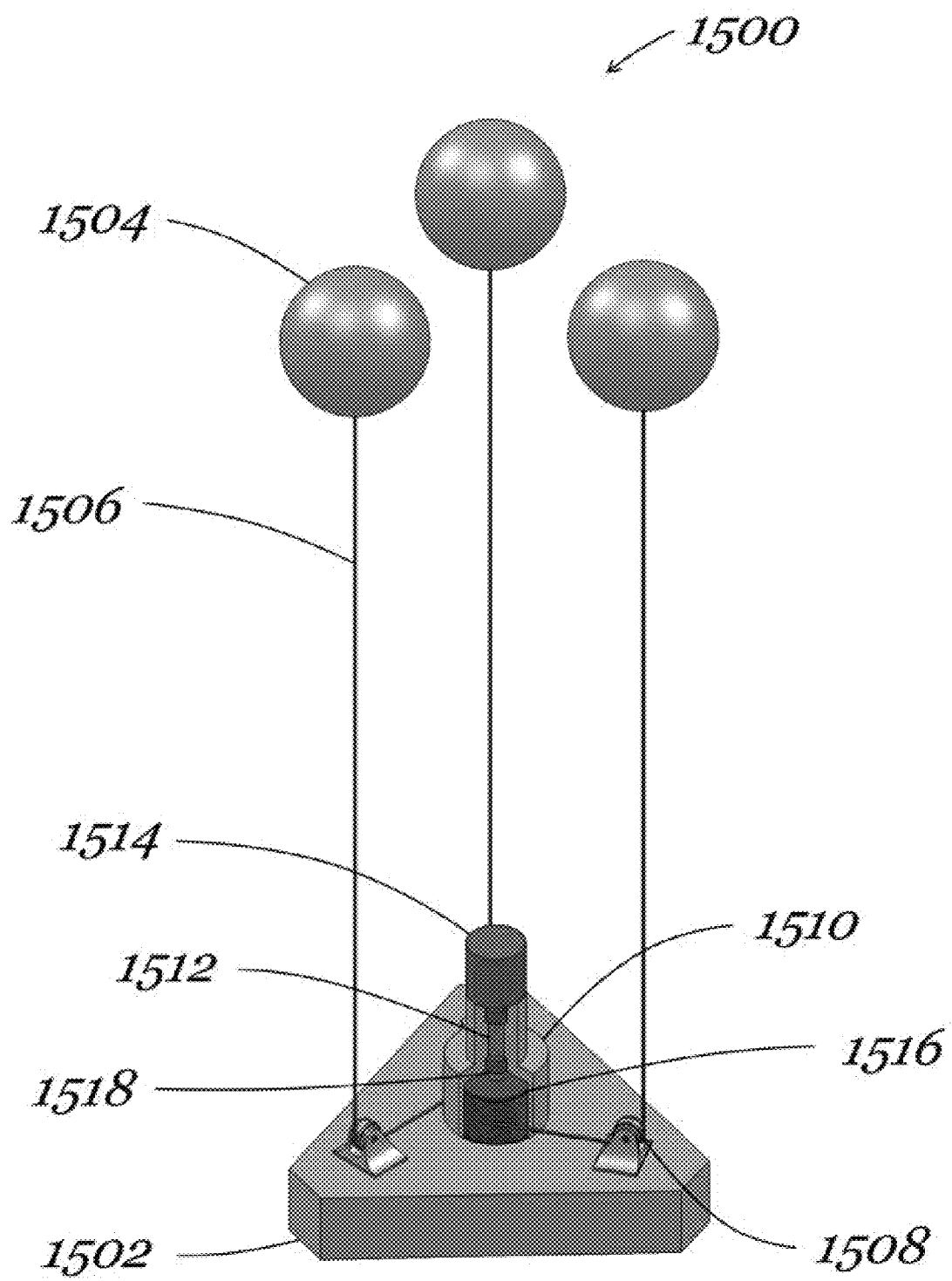
FIG. 15 illustrates an energy storage device that uses the movement of multiple floats to store and release energy according to another embodiment of the invention.

FIG. 15 illustrates an energy storage device that uses the movement of multiple floats to store and release energy according to another embodiment of the invention. In this energy storage device 1500 a weight 1502 is used to anchor the energy storage device 1500 to the bottom of a body of water. Multiple floats 1504 are equally arrayed about a central axis or equally spaced from each other. A separate tether 1506 is attached to the bottom of each of the floats 1504. The tethers 1506 extend vertically downward to a corresponding pulley 1508 that translates the vertically directed tether to a horizontal direction. The pulleys 1508 are attached to a top surface of the weight 1508. A housing 1510, shown as a cut-away in FIG. 15, is positioned on the top surface of the weight 1508 and is located in the center of each of the pulleys 1506. The housing 1510 holds a vertical rotatable shaft 1512 that is operatively connected to a motor/generator 1514 that is disposed on top of the housing 1510. The housing 1510 also holds a central spool 1516 that is connected to the vertical rotatable shaft 1512 such that rotation of the vertical rotatable shaft 1512 will cause the central spool 1516 to rotate and vice versa. It should be appreciated that the shaft and spool can be multiple parts fixedly coupled together or the shaft can be integral to the spool. The ends of each of the tethers 1506 pass from the pulleys 1508 through openings in the housing 1510 (not shown) and wrap around the single central spool 1516 in the same direction such that each tether 1504 will be wound or un-wound in the same direction.

The tethers 1504 and the floats 1502 are similar to those described in connection with FIG. 13. Therefore, that discussion applies equally to the tethers 1504 and the floats 1502 in this FIG. 15. However, since multiple floats are used in an arrangement where the floats are next to each other, space considerations may affect the overall size or mass and shape of the floats being used. In other words, smaller floats may be desirable depending upon how close the floats may come to each other during operation to avoid any collisions with each other or entanglement of the tethers. Further, using floats of the same mass or weight allows for equal tension on each of the tethers when the floats are lowered or raised, which will aid in the overall stability of the energy storage device in the water.

The motor/generator 1514 and the vertical rotatable shaft 1512 are similar to the motor/generator and the rotatable shaft described in connection with FIG. 13; however, in this embodiment, the motor/generator 1514 and the vertical rotatable shaft 1512 are oriented such that the vertical rotatable shaft 1512 is rotated about a vertical axis. Additionally, it should be appreciated that the vertical rotatable shaft 1512 is enclosed in a housing 1510, whereas the rotatable shaft in FIG. 13 is open. Nonetheless, the discussion of the motor/generator and the rotatable shaft in FIG. 13 applies equally to the motor/generator 1514 and the vertical rotatable shaft 1512 in the FIG. 15, including how they are operatively connected. Also, it should be appreciated that similar to FIG. 13, the motor/generator 1514 is attached to one or more electrical cables (not shown) to transmit electricity to the motor/generator 1514 with the motor is used and to transmit electricity from the motor/generator 1514 from the generator is used. Regarding the motor/generator 1514, it should be appreciated that this is exposed to the environment as it is disposed outside of the housing 1510. Accordingly, as described in connection with FIG. 13, any means known in the art for using a motor/generator underwater, including the use of a cover or other seal, may be implemented, including means know to protect the motor/generator from any corrosive effects of the water. Also, similar to FIG. 13, the vertical rotatable shaft 1512 is coupled to central spool 1516 such that rotation of either the vertical rotatable shaft 1512 or the central spool 1516 will cause rotation of the other. It should be appreciated that the central spool 1516 is mounted concentric with the vertical rotatable shaft 1512, which may be supported on bearings in bearing carriers 1518.

The energy storage device 1500 operates in a manner similar to that described in connection with FIG. 13. When energy to be stored is delivered to the energy storage device 1500 as electricity through an electrical cable, the motor of the motor/generator 1514 is utilized. In this case, the motor provides an electrical load for the electrical energy delivered to the energy storage device 1500, which causes the vertical rotatable shaft 1512 to rotate thereby converting the electrical energy to mechanical energy. The rotation of the vertical rotatable shaft 1512 rotates the central spool 1516 causing each of the tethers 1506 to be wound around the central spool 1516 thereby retracting each of the tethers 1506. As the tethers 1506 are wound around the central spool 1516 or retracted, each of the floats 1504 is pulled down through the water toward the bottom of the body of water or towards their respective pulleys 1508. By pulling the floats 1504 down, the electrical energy utilized by the motor that has been converted to mechanical energy is now converted to potential energy stored by the floats 1504, which are now held lower in the water than the point at which they started in proportion to the amount of energy transmitted to the motor of the motor/generator 1514.

When the stored potential energy is to be used, the floats 1504 are allowed to rise toward the surface of the body of water, thereby releasing the potential energy. As the floats 1504 rise, the tethers 1506 are un-wound from the central spool 1516, which causes the central spool 1516 to rotate in the opposite direction from when the central spool 1516 was used to wind the tethers 1506 and pull the floats 1504 downward. As the central spool 1516 rotates, the vertical rotatable shaft 1512 also rotates, again in the opposite direction from when the motor was used to rotate the vertical rotatable shaft 1512. The rotation of the vertical rotatable shaft 1512 in this direction causes the generator of the motor/generator 1514 to be used, thereby generating electricity that is transmitted over an electrical cable to an electrical load for use. Accordingly, the potential energy in the floats 1504 is converted to mechanical energy that rotates the central spool 1516 and the vertical rotatable shaft 1512 that is then converted to electrical energy by the generator. It should be appreciated that the various states for the energy storage device shown in FIG. 14 apply equally to the energy storage device 1500 having multiple floats 1502. In general, the overall control of the energy storage device 1300 may be done in the same manner described above in connection with FIG. 1.

As described in connection with FIGS. 1 and 13, the energy storage device 1500 may be any size. For example, it should be appreciated that the energy storage device 1500 may include additional floats and is not necessarily limited to three as shown. Additional floats can be similarly oriented around a central axis and equally spaced from the adjacent floats or arranged symmetrically. Further, the floats can be offset from the housing by placing corresponding pulleys a different distance from the central spool. For example, the tether for every other float could be connected to a pulley that is further form the central spool than the pulley for an adjacent float, thereby forming essentially two concentric circles of floats and pulleys.

It should be appreciated that the drivetrain and methods described in connection with FIGS. 4-9 are equally applicable to the energy storage devices in which floats are used, as described above in connection with FIGS. 13-15. Accordingly, a housing for the entire drivetrain that incorporates a high speed motor and that allows for the use of a pocket of air or gas to isolate the motor/generator, including methods for maintaining the pocket of air or gas, as described in connection with FIG. 4 may be used. In this regard, since the pocket of air or gas is underwater, additional gas may be supplied to the pocket from a tank of compressed gas as the housing is lowered into position to substantially maintain the volume of the gas pocket at some desired level despite increasing pressure at increasing depth in the body of water.

The hydrophobic liquid layer and the felt seal, as described in connection with FIGS. 5 and 6, respectively, may also be used. Further, the mechanism and method for winding multiple tethers as described in connection with FIG. 7, as well as the use of a lead screw as described in connection with FIGS. 8 and 9, may also be used.

Figure 16:
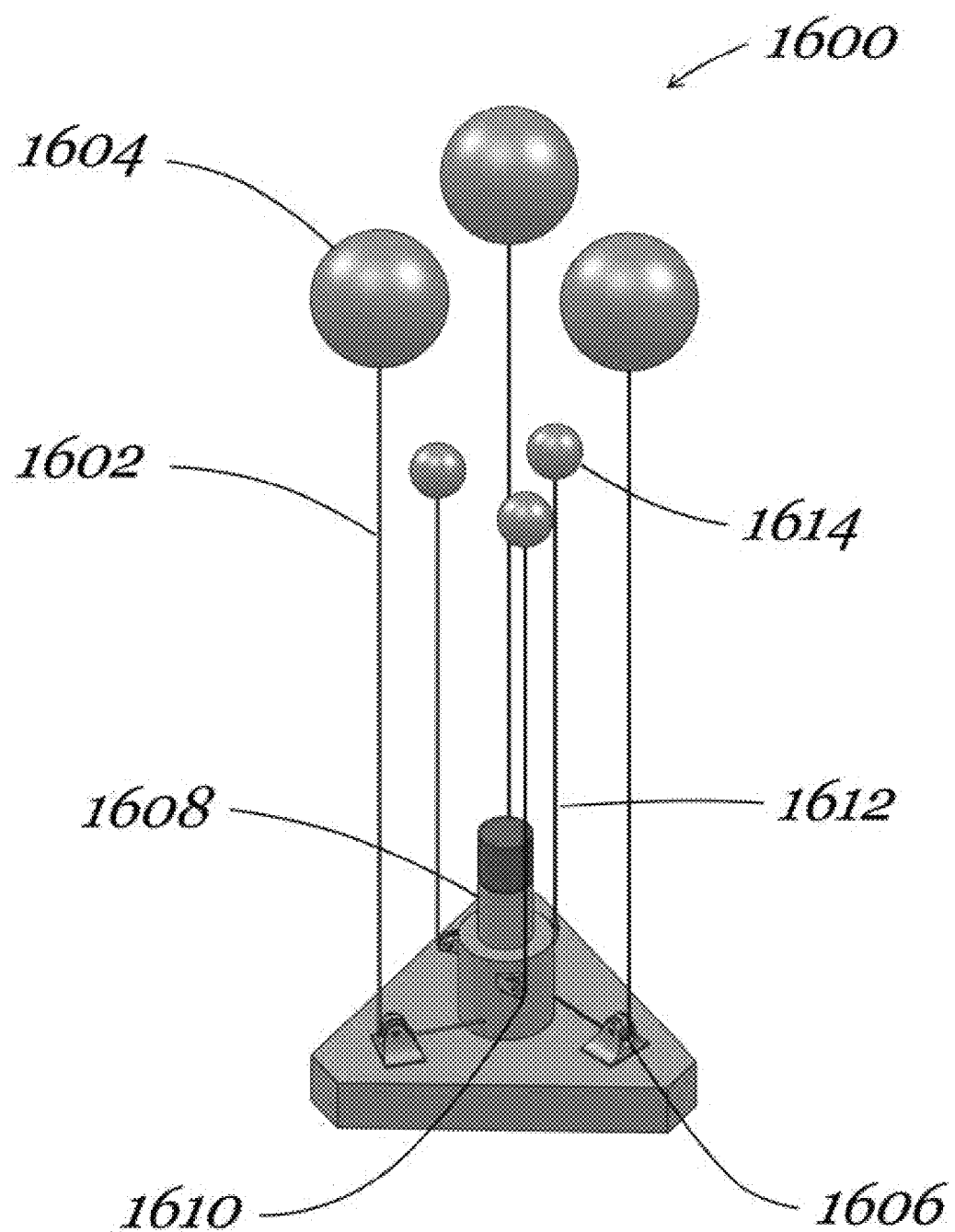
FIG. 16 illustrates an energy storage device that uses the movement of multiple floats to store and release energy and multiple floats to assist in winding of tethers according to another embodiment of the invention.

FIG. 16 illustrates an energy storage device that uses the movement of multiple floats to store and release energy and multiple floats to assist in winding of tethers according to another embodiment of the invention. In this embodiment, the energy storage device 1600 is similar to that of FIG. 15. However, instead of the ends of the tethers being attached to a central spool, in this embodiment, the tethers 1602 pass from the floats 1604 through a corresponding pulley 1606 into a housing 1608. Inside the housing 1608, the tethers 1602 wrap around a central spool and pass out of the housing 1608 and through a second corresponding pulley 1610 that translates the horizontal direction of the tethers 1602 coming off of the central spool and back out of the housing 1608 to a vertical direction. The tethers 1602, at this point referred to as the tail of the tether 1612, extend upward and attach to the bottom of a second corresponding, smaller float 1614, referred to as the "tailing float." The buoyancy of the smaller float 1614 is used to extend the tether tails 1612 in an upward direction.

The smaller float 1614 attached to the tail of each tether 1612 is sized to simply provide the necessary buoyancy to extend the tail 1612 in the vertical direction. However, it should be appreciated, that when the energy storage device is storing the maximum amount of energy, the tail of the tether will be the equivalent of almost the entire tether. Therefore, the buoyancy of the smaller float should provide sufficient tension to hold the entire tether in a upward, vertical direction.

The smaller floats 1614 can be made from any material as the main floats 1604, and can be any shape. However, it should be appreciated that in operation, the main floats 1604 and the smaller floats 1614 will pass each other as they each travel in the opposite vertical direction. Therefore, to avoid any impacts between the floats or entanglement of the tethers, both sets of floats 1604, 1614 should be appropriately sized.

Figure 17:
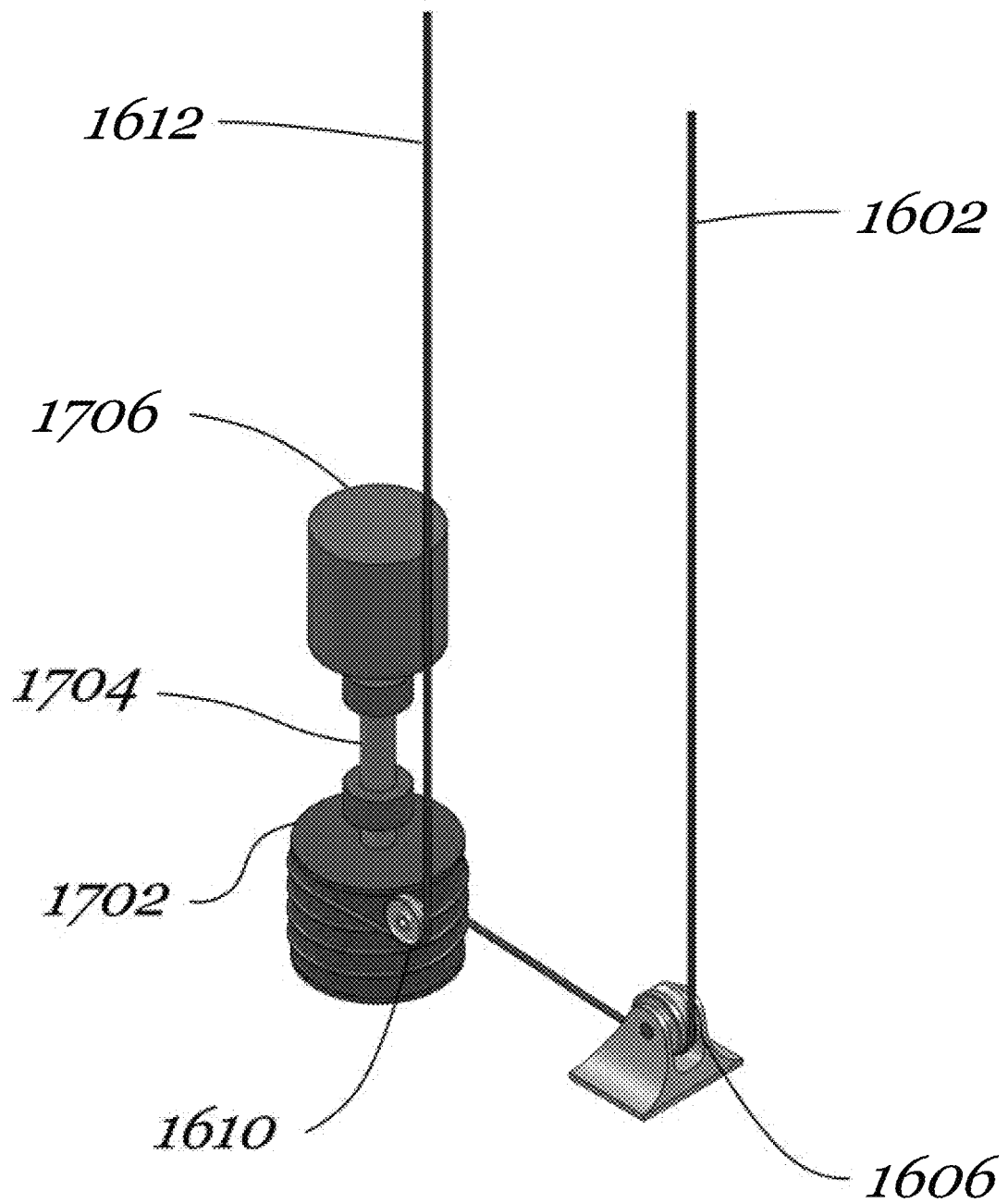
FIG. 17 illustrates tether winding for one tether of the device of FIG. 16.

FIG. 17 illustrates tether winding for one tether of the device of FIG. 16. As shown, the tether 1602 attached to the main float 1604 or the float used to store energy, is passed through the pulley 1606 and through an opening in the housing (not shown) where the tether wraps around the central spool 1702. In this case, however, the end of the tether 1602 is not attached to the spool 1702. In contrast, the tether 1602 simply wraps around the central spool 1702 a set number of time, passes through another opening in the housing (not shown), and passes to a second pulley 1610 that reroutes the tether 1602, or at this point, what is referred to as the tail of the tether 1612 to a vertical direction.

The number of times the tether 1602 is wrapped around the central spool 1702 will affect the tightness of the wrap of the tether 1602 around the central spool 1702. The tightness of the wrap can be utilized to affect the amount of control over pulling the floats 1604 downward to store energy and allowing the floats 1604 to rise to release stored energy. The tightness of the wrap determines the maximum tractive force the central spool 1702 can apply to the tether 1602. It should be sufficiently tight to provide sufficient friction to prevent the tethers 1602 from slipping under load from the floats 1604. The tightness of the wrap will decrease along the length of the tether 1602, with the maximum tightness of wrap occurring where the tether 1602 leads in from the main float 1604 and comes into contact with the central spool 1702, and the minimum tightness of wrap occurring where the tether 1602 exits contact with the spool and leads to the tailing float 1614. The tailing float 1614 must be sized to maintain sufficient tightness of wrap at the point of minimum tightness that the tether 1602 does not slip on the central spool 1702.

In operation, as the central spool 1702 rotates, the tether 1602 winds onto the central spool 1702 from one end, and unwinds from the central spool 1702 from the other end at the same rate so that there is a constant length of tether 1602 engaged with the central spool 1702 at all times. Accordingly, the coupling between tether 1602 and the central spool 1702 is entirely through surface traction due to the tightness of the wrap of the tether 1602 around the central spool 1702. Therefore, the main floats 1604 in combination with the smaller floats attached to the tail of the tether 1612 maintain the tightness of this wrap by applying forces on each end of the tether 1602. Accordingly, with reference to FIG. 14, when the energy storage device has no stored energy, the main float or floats are at their maximum height from the bottom of the body of water, and the smaller floats attached to the tail or opposite end of the tethers are near the bottom of the body of water since the tether is fully extended upward by the main float or floats. As energy is stored the main float or floats will be pulled downward while the smaller floats attached to the tail of the corresponding tethers will rise, at some point, each set of floats will pass each other. When the maximum amount of energy is stored, the main float or floats will be fully retracted or near the bottom of the body of water, and the smaller floats attached to the tail or opposite end of the tethers will be fully extended in an upward direction toward the surface of the body of water.

This embodiment for passing the tail of the tether from around the spool, out of the housing, and through a pulley to a direction parallel to the same tether extending from the float used to store energy can be applied to the energy storage devices that float on or just below the surface of the body of water and that utilize weights to store energy, as described in connection with FIGS. 1-3. In this case, a smaller weight may be attached to the tail of the tether. The weight or mass of the weight only needs to provide sufficient tension to extend the tail of the tether in a vertical downward direction. Since the tail of the tether will be the equivalent of almost the entire tether when a maximum amount of energy is stored, the weight or mass of the smaller weight should provide sufficient tension to hold the entire tether in a downward, vertical direction. These smaller weights may be similar to the larger, main weights and may have any of the same characteristics described above for the main weights. Similarly, however, the two sets of weights will pass each other as they travel in opposite vertical directions. Accordingly, to avoid any impacts between the weights or entanglement of the tethers, both sets of weights should be appropriately sized.

Figure 18:
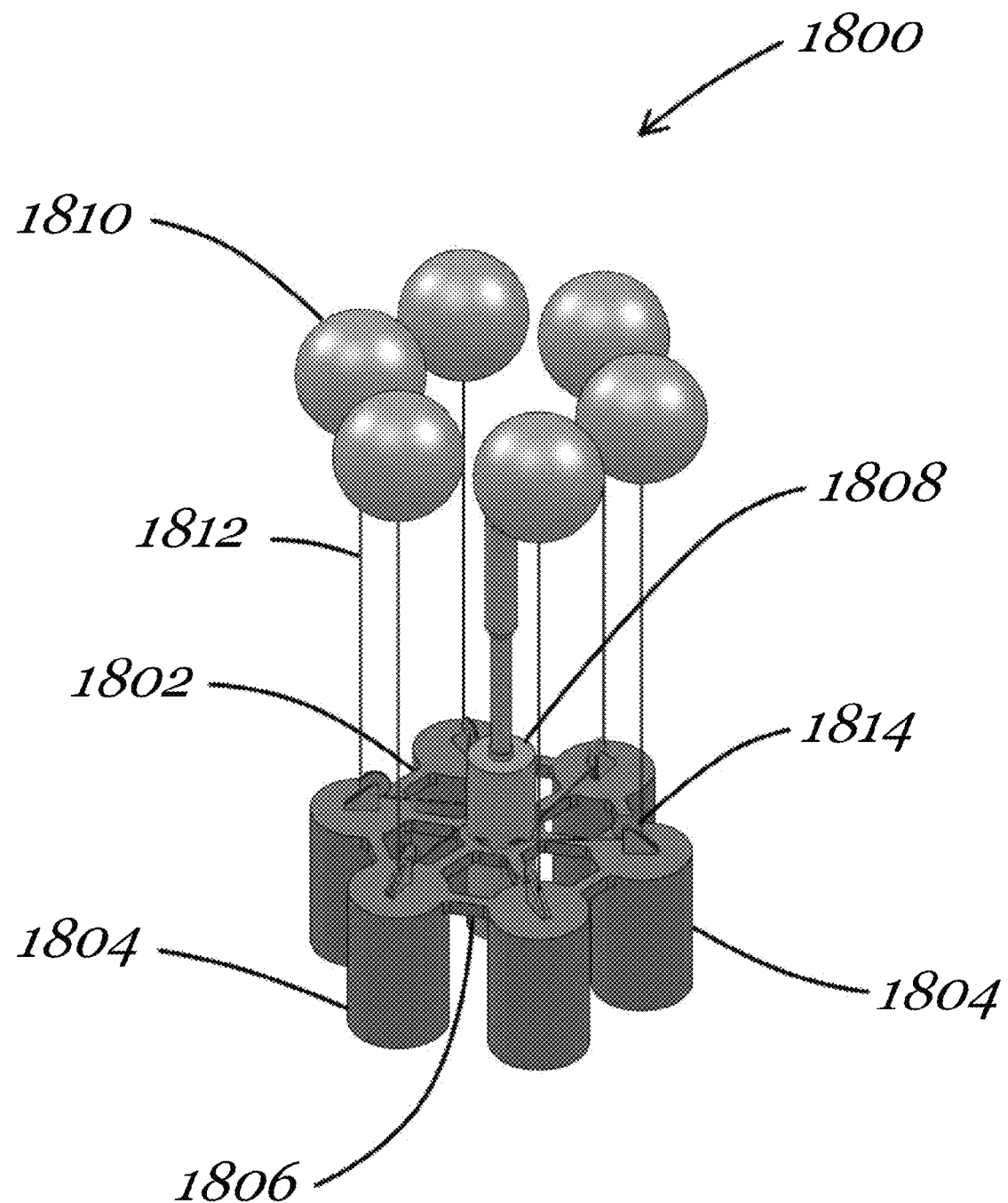
FIG. 18 illustrates an energy storage device that uses the movement of multiple floats to store and release energy according to another embodiment of the invention.

FIG. 18 illustrates an energy storage device that uses the movement of multiple floats to store and release energy according to another embodiment of the invention. The energy storage device 1800 is similar to that described in connection with FIG. 15; however, a different weight or base 1802 is used to anchor the energy storage device 1800 to the bottom of the body of water. Instead of a single weight, the base 1802 comprises multiple weighted portions 1804 that are connected by a support structure 1806. The support structure 1802 holds at its center a housing 1808 that encloses the drivetrain for the energy storage device 1800 or that encloses certain components of the drivetrain and to which a motor/generator may be attached as described in connection with FIGS. 13 and 15, as well as FIGS. 4-9. Also, the embodiment of FIGS. 16 and 17 may be used in connection with the embodiment described here in this FIG. 18.

Similar to the weight of FIGS. 13 and 15 used to anchor the energy storage device, the weighted portions 1804 and the support structure 1806 are also used to anchor the energy storage device 1800 to the bottom of a body of water and, accordingly, can be made from any materials used to make the weight of FIGS. 13 and 15. Also, the support structure 1806 itself is not limited to any particular design, such that any structure can be used to fixedly hold the various weighted portions 1804 together.

In this embodiment, a separate float 1810 and corresponding tether 1812 are used for each weighted portion 1804. Separate pulleys 1814 at disposed on top of each of the weighted portions 1804 through which the tethers 1812 are directed to a central spool (not shown) in the housing 1808. Accordingly, the weighted portions are symmetrically spaced about the housing 1808 and are an equal distance from the housing 1808 so that the corresponding floats 1810 are symmetrically spaced from each other. It should be appreciated that each weighted portion 1804 may be separately detached from the support structure, making replacement of the weighted portion, the corresponding pulley 1814, tether 1812, and float 1810 easier. It should also be appreciated that each weighted portion 1804 may support more than one corresponding pulley 1814, tether 1812, and float 1810. Operation of this energy storage device 1800 is the same as that described in connection with FIGS. 13-15.

Figure 19:
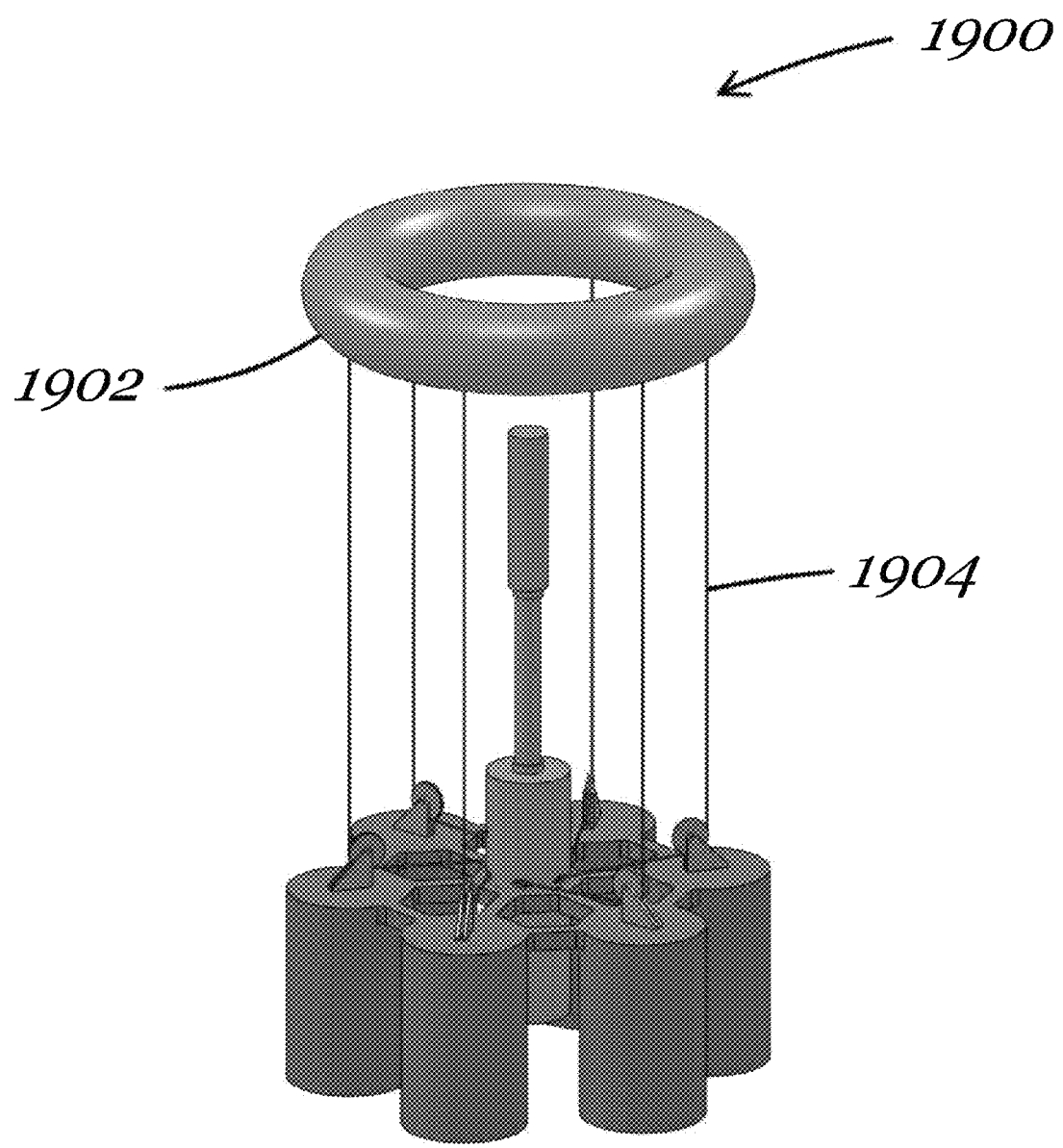
FIG. 19 illustrates an energy storage device that uses the movement of a single float to store and release energy according to another embodiment of the invention.

FIG. 19 illustrates an energy storage device that uses the movement of a single float to store and release energy according to another embodiment of the invention. The energy storage device 1900 is similar to that described in connection with FIG. 18; however, a single float 1902 is used instead of multiple floats. As shown, the single float 1902 is a toroid; however, other shapes may be used but should be selected based upon considerations of controlling the movement of the float through the water as well as minimizing frictional losses during such movement. Spheres, cylinders with spherical and elliptical ends, and toroids may be used because they are structurally sound. A single large sphere or cylinder could be employed where all of the tethers attach to the same float. Similarly, a single large float could be used for the tailing tethers, in the self-tailing design, even if individual floats are used for each tether on the main float, and vice versa.

In this embodiment, multiple tethers 1904 are attached to this float 1902 so that its movement is controlled, but operation is otherwise the same as that described in connection with FIG. 18. It should be appreciated, however, that the single weight or base of FIG. 15 or any other shaped, single weight may be used in connection with the energy storage device 1900 of this FIG. 19.

Figure 20:
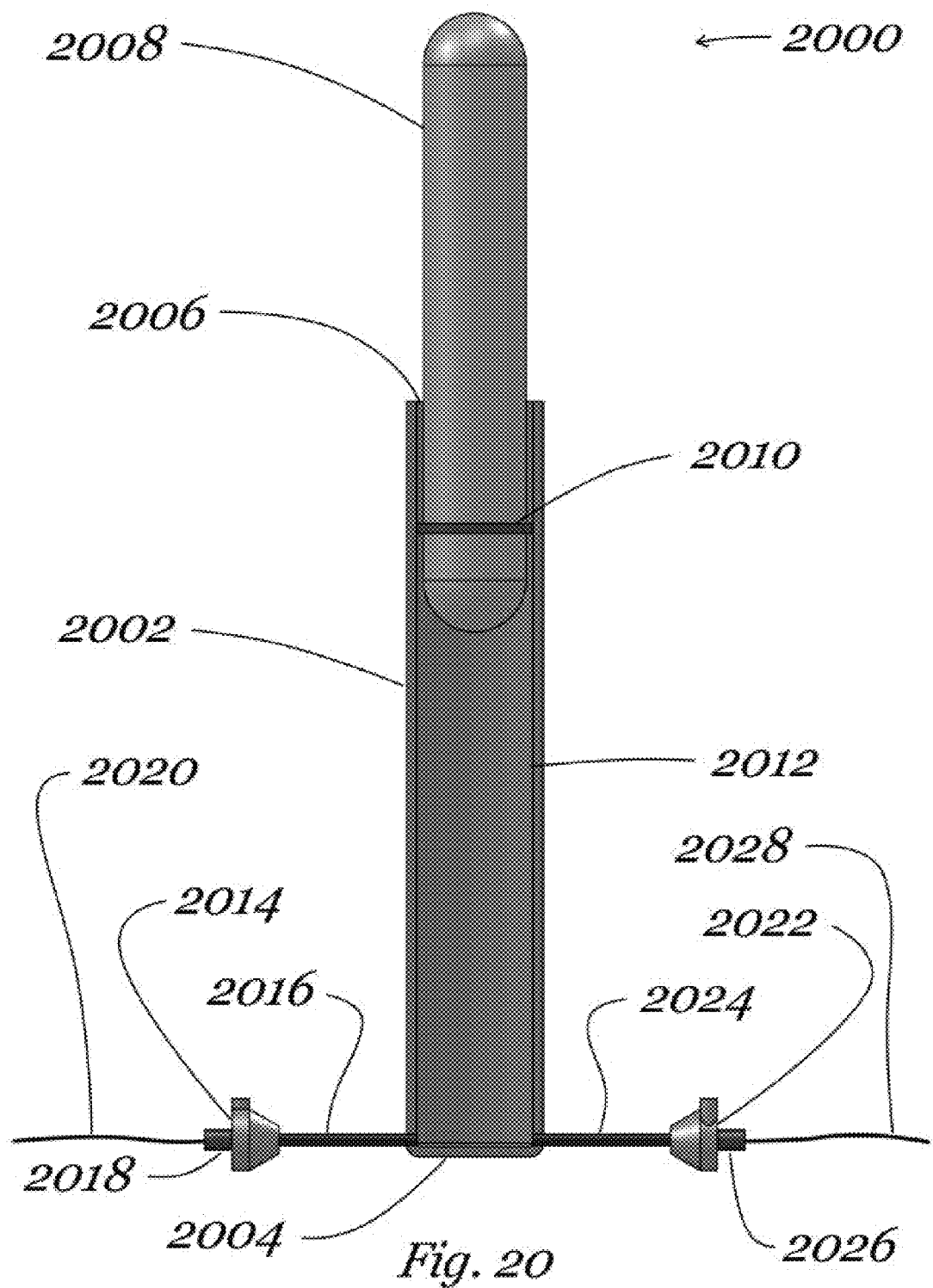
FIG. 20 illustrates an energy storage system that utilizes a buoy and a hydraulic cylinder according to one embodiment of the invention.

FIG. 20 illustrates an energy storage system that utilizes a buoy and a hydraulic cylinder according to one embodiment of the invention. In this embodiment, the energy storage device 2000 includes a hydraulic cylinder 2002 that has solid, stiff walls, a closed bottom 2004, an open top 2006 and is otherwise hollow. A buoy, referred to as a "buoyant piston," 2008 is disposed inside of the hydraulic cylinder 2002. The buoyant piston 2008 has an elongated, cylindrical shape and is sized to fit with the hydraulic cylinder 2002 and to allow movement up and down within the hydraulic cylinder 2002 like a typical piston. The ends of the buoyant piston 2008 can be rounded on both ends. A seal 2010 is used to provide a seal between the outside surface of the buoyant piston 2008 and the inside wall of the hydraulic cylinder 2002. The seal 2010 is disposed around an outside perimeter of the buoyant piston 2008 at a point along its length. The seal can be disposed at any point on the buoyant piston 2008, including at a point on the lower half of the buoyant piston 2008, at a point on the lower quarter of the buoyant piston 2008, at a point on the lower eight of the buoyant piston 2008, or a predetermined distance from the bottom of the buoyant piston 2008. Accordingly, a chamber 2012 is created within the hydraulic cylinder 2002 below the bottom of the buoyant piston 2008. A hydraulic pump 2014 is fluidly connected to the bottom of the chamber 2012 through a pipe or fluid line 2016, and power is supplied to the hydraulic pump 2014 by an electric motor 2018 that is connected to an electric cable 2020 that passes power to be stored to the electric motor 2018. A hydraulic turbine 2022 is also fluidly connected to the bottom of the chamber 2012 through a pipe or fluid line 2024. The hydraulic turbine 2022 is mechanically coupled to an electric generator 2026 that produces electricity and passes it through an electric cable 2028 to an electric load for use.

The energy storage device 2000 is anchored to the bottom of the body of water in which it is used, such as the ocean floor. Accordingly, the hydraulic cylinder 2002 can be built from a relatively dense material, like concrete, so it will be heavy enough on its own to provide sufficient anchoring. Also, the environment in which the energy storage device 2000 will be used should be taken into consideration when selecting the materials of construction for both the hydraulic cylinder 2002 and the buoyant piston 2008. For example, if used in the ocean, corrosive effects of the salt water should be taken into consideration. Otherwise, the hydraulic cylinder 2002 and the buoyant piston 2008 can be made from any suitable material. Similar considerations should be taken into account in selecting the materials used to construct the fluid lines 2016, 2024 and in selecting the hydraulic pump 2014, the electric motor 2018, the hydraulic turbine 2022, and the electric generator 2026. As discussed previously, enclosures may also be used to isolate the hydraulic pump 2014, the electric motor 2018, the hydraulic turbine 2022, and the electric generator 2026 from the water in which they are placed.

It should be appreciated that valves (not shown) can be placed on either or both of the fluid lines 2016, 2024 that connect the hydraulic pump 2014 and the hydraulic turbine 2022 to the chamber 2012. These valves may be opened and closed to control the buoyant piston 2008. For example, if both valves are closed, thus prohibiting any water from being transferred into or out of the chamber 2012, the buoyant piston 2008 will be held stationary and in place. Otherwise, with both valves open, water can pass into and out of the chamber 2012 allowing the buoyant piston 2008 to move up and down as described further below. Alternatively, the buoyant piston 2008 can be held in place through application of a mechanical brake (not shown) that couples the buoyant piston 2008 to the hydraulic cylinder 2002, so that the buoyant piston 2008 can be held in place without concern about leakage. It should also be appreciated that a combined motor/generator can be used in place of the separate hydraulic pump and electric motor and hydraulic turbine and electric generator.

In operation, instead of pulling a buoy using a tether attached to a rotating spool, the buoyant piston 2008 is pulled down using the hydraulic cylinder 2002. Specifically, power to be stored is passed as electricity to the electric motor 2018 through the electric cable 2020. The electric motor 2018 powers the hydraulic pump 2014, which draws water out of the chamber 2012, thereby reducing the pressure inside the chamber 2012. With reduced pressure in the chamber 2012 underneath the buoyant piston 2008, the buoyant piston 2008 will be drawn down into the hydraulic cylinder 2002 storing potential energy as it descends.

It should be appreciated that valves on both the inlet and outlet may be used. In this case, when the energy storage device 2000 is to store energy, the inlet valve, which leads to the hydraulic turbine 2022, should be closed, and the outlet valve, which leads to the hydraulic pump 2014, should be open. Any mechanical brakes (described below) should be disengaged. Energy is then supplied to the hydraulic pump 2014, which pumps water out of the hydraulic cylinder 2002, causing an immediate pressure differential. This pressure differential exerts a downward force on the buoyant piston 2008 greater than the upward force due to its buoyancy, and the buoyant piston 2008 descends.

It should be appreciated that the buoyant piston 2008 can be held in place at any point within the hydraulic cylinder 2002 by closing the valves to both the inlet and outlet. With a good seal, water will be unable to leak into the hydraulic cylinder 2002, and a pressure difference will form immediately between the inside of the hydraulic cylinder 2002 and the ambient water, resulting in a downward force on the buoyant piston 2008 that balances the upward force do to its buoyancy.

Alternatively, a mechanical brake, capable of coupling the buoyant piston 2008 to the hydraulic cylinder 2002 could be used to hold the buoyant piston 2008 in place. It could be designed to be able to engage at any point along the travel of the buoyant piston 2008 so that the energy storage device 2000 could hold any amount of stored energy (up to its maximum) without loss due to leakage of the seals or valves.

To recover the stored energy, the buoyant piston 2008 is allowed to rise within the hydraulic cylinder 2002. As the buoyant piston 2008 rises, the pressure inside the chamber 2012 is decreased, drawing water into the chamber 2012 through the hydraulic turbine 2022. As the water passes through the hydraulic turbine 2022, it rotates, which, in turn, rotates the electric generator 2026, thereby producing electricity that is transmitted through the electric cable 2028.

If using valves, when the energy storage device 2000 is to release stored energy, the outlet valve should be closed, and the inlet valve should be open. The brake should be disengaged if there is one. The buoyant force of the buoyant piston 2008 will pull the buoyant piston 2008 upwards, enlarging the volume inside the hydraulic cylinder 2002, resulting in a pressure differential. This pressure differential will tend to pull water into the hydraulic cylinder 2002 through the hydraulic turbine 2022, which will rotate and extract energy from the flowing water. It will transfer this rotational energy to the electric generator 2026, which will convert it to electrical energy for distribution.

It should be appreciated that the buoyant piston 2008 must have sufficient buoyancy to rise even after the water has been withdrawn from the chamber 2012 to create a sufficient driving force for water to be drawn into the chamber passing through the hydraulic turbine 2022. Also, it should be appreciated that as the height of the buoyant piston 2008 increases, it will store more energy per unit ocean floor area, up to the point when it is half as tall as the water is deep, and so buoyant pistons and hydraulic cylinders of approximately equal height are a possible design. With the buoyant piston drawn all the way into the hydraulic cylinder, a tall, narrow hydraulic system should be a good shape for towing the device to its location for operation. Along these lines, this energy storage device 2000, like a tethered device, can be made to be only slightly negatively buoyant and then equipped with supplemental floatation to allow it to float while being towed into position.

Figure 21:
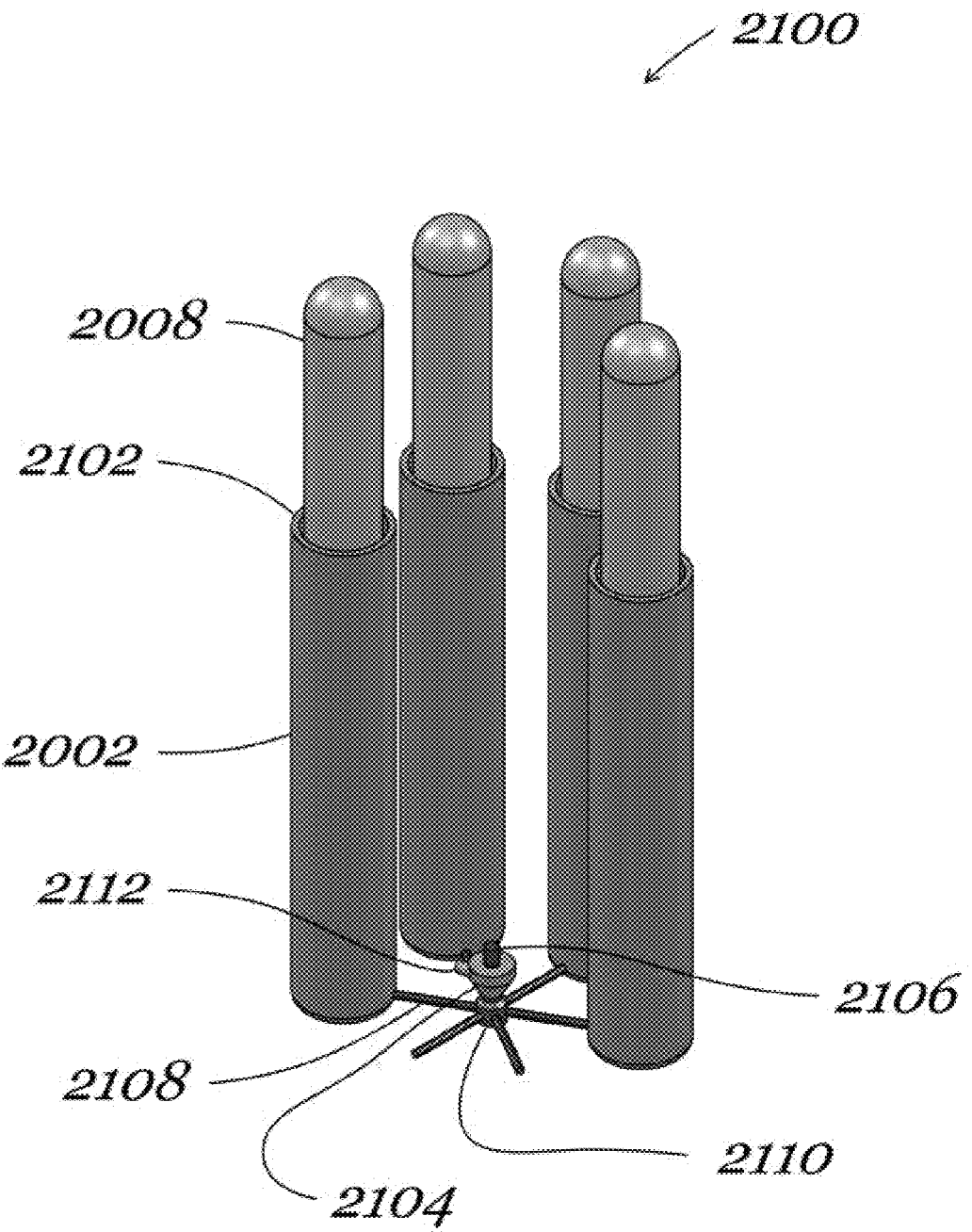
FIG. 21 illustrates an energy storage system the energy storage device of FIG. 20.

FIG. 21 illustrates an energy storage system the energy storage device of FIG. 20. The energy storage system 2100 includes multiple energy storage devices 2102 as described in connection with FIG. 20. Each energy storage device 2102 includes a hydraulic cylinder 2002 and a buoyant piston 2008. The energy storage devices 2012 are arranged symmetrically about a single hydraulic pump/turbine 2104 and an electric motor/generator 2106. It should be appreciated that by using a single hydraulic pump/turbine 2104 and an electric motor/generator 2106, the system 2100 will be more efficient at a larger scale compared to using a hydraulic pump, electric motor, turbine, and generator for each individual energy storage device 2102.

A port 2112 is used to pass water to and from the hydraulic pump/turbine 2104, and an electric cable (not shown) is connected to the electric motor/generator 2106 to supply power to the electric motor for storage and to transmit stored energy for use from the generator. Each of the hydraulic cylinders 2002, in particular the bottom of the chamber (not shown) within each of the hydraulic cylinders 2002, is fluidly connected to the hydraulic pump/turbine 2104 using a hydraulic pipe or fluid line 2108 that are each connected to a central hydraulic coupling or manifold 2110 that is fluidly connected to the hydraulic pump/turbine 2104. The hydraulic pump/turbine 2104 is then mechanically coupled to the electric motor/generator 2106 through a common rotating shaft (not shown). Also, it should be appreciated that the energy storage system 2100 as shown can accommodate six energy storage devices 2102 (two devices are not shown for illustration purposes); however, smaller and larger systems can be constructed to accommodate more or less energy storage devices that utilize the hydraulic cylinder and buoyant piston design of FIG. 20. Further, it should be appreciated that any of the drivetrain designs and options described in connection with FIGS. 4-9 may be used with this system 2100. Alternatively, an enclosure for the single hydraulic pump/turbine 2104 and an electric motor/generator 2106 may also be used.

More particularly, in this embodiment, the six energy storage devices 2102 are each connected via the hydraulic pipe 2108 to the hydraulic manifold 2110, which collects the flow from each cylinder and fluidly couples it to the reversible pump/turbine 2104. The reversible pump/turbine 2104 has at least one inlet/outlet port 2112 that fluidly couples it to the ambient water environment. When energy is to be stored, electricity is supplied to the motor/generator 2106, which acts as a motor. The motor/generator 2106 is connected to the pump/turbine 2104 through a common rotatable shaft, such that the motor/generator 2106 drives the pump 2104. This will cause the pump 2104 to pull water from within each of the hydraulic cylinders 2002 equally, resulting in a pressure difference and pulling each of the buoyant pistons 2008 down as described above. When energy is to be released, the motor/generator 2106 is coupled to an electric load against which it can work. The buoyancy of each buoyant piston 2008 will cause it to rise and enlarge the volume of the chamber within the hydraulic cylinder 2002. This will result in a pressure differential that will tend to pull water through the pump/turbine 2104 and into the hydraulic cylinders 2002, causing the turbine 2104 to rotate and drive the electric generator 2106, which will convert mechanical energy from the fluid flow into electricity to be supplied to the load.

A single valve (not shown) on the inlet/outlet port 2112 in conjunction with effective seals around the buoyant pistons 2008 could be used as a brake or a mechanical brake coupling the buoyant pistons 2008 to the hydraulic cylinders 2002 could be used. Additionally, a grate or filter (not shown) could be used on the inlet/outlet port 2112 to prevent objects above a certain size from entering the pump/turbine 2104 and fouling or damaging it. It should be appreciated that this grate or filter will tend to self clean with each charge-discharge cycle and corresponding flow reversal.

In operation, each energy storage device 2102 will operate as described in connection with FIG. 20. However, upon receiving power for storage, the electric motor 2106 will supply power to the hydraulic pump 2104 to pump water out of the chamber of all of the hydraulic cylinders 2002 discharging the water through the port 2112. Accordingly, each of the buoyant pistons 2008 will descend, thereby storage potential energy. To release the stored energy, the buoyant pistons 2008 are allowed to rise thereby reducing the pressure in each of the chambers of the hydraulic cylinders 2002 and drawing water in through the port 2112 and thereby turning the turbine 2104 and spinning the generator 2106 to produce electricity that can be transmitted through the electric cable.

Accordingly, it should be appreciated that each of the buoyant pistons 2008 will rise and fall together at the same time and to the same degree.

Figure 22:
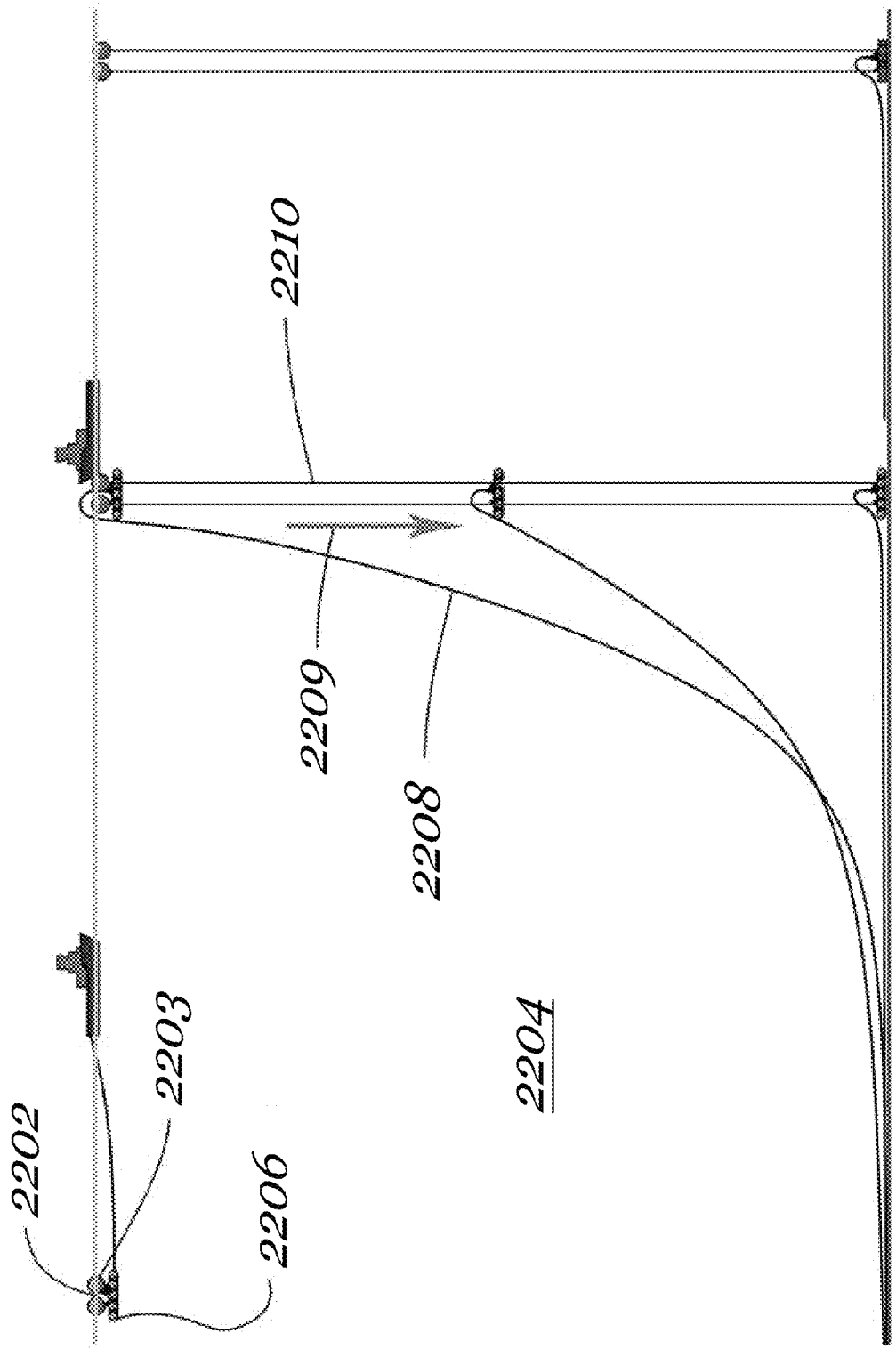
FIG. 22 illustrates a method for deploying an energy storage device resides on the bottom of a body of water and that utilizes the movement of floats according to one embodiment of the invention.

FIG. 22 illustrates a method for deploying an energy storage device resides on the bottom of a body of water and that utilizes the movement of floats according to one embodiment of the invention. In this method, the energy storage device may be any of the energy storage devices described herein that utilize one or more floats to store and release energy, wherein a weight or base is anchored to the bottom of a body of water.

In a first step, an energy storage device 2202 having floats 2203 is constructed to be just slightly negatively buoyant. The energy storage device 2202 is in placed in the body of water 2204 at a location from which it will be transported to its ultimate destination or point of use in the body of water 2204. Either before or while the energy storage device 2202 is being placed in the body of water 2204, it is equipped with a supplemental floatation device 2206, such as an array of floats disposed underneath of the energy storage device 2202 as it sits in the water. The supplemental floatation device 2206 is designed to give the energy storage device 2202 a net-positive buoyancy so that it will float on the surface of the body of water 2204 enabling it to be towed or pulled. The energy storage device 2202 with the supplemental floatation device 2206 is then towed by a tug boat or similar ship to its ultimate destination or point of use in the body of water 2204 as illustrated on the left portion of FIG. 22.

Once the energy storage device is at its destination, as illustrated in the middle of FIG. 22, an electric cable 2208 that supplies energy to be stored to the energy storage device 2202 and that transmits stored energy from the energy storage device 2202 for use is attached to the energy storage device 2202. It should be appreciated that the electric cable 2208 may be a cable that has already been laid previously, and the end of the electric cable 2208 to be attached to the energy storage device 2202 may be attached to a mooring (not shown) at the surface of the body of water 2204 so that it can be readily retrieved for attachment to the energy storage device 2202. This also allows the electric cable 2208 to be attached to the energy storage device 2202 at the surface of the body of water 2204, as opposed to underwater.

With the electric cable 2208 attached, the energy storage device may be deployed to the bottom of the body of water 2204 using its own winch or spool that is used to retract and release the floats 2203 during operation, as further illustrated in the middle of FIG. 22 and as shown by the arrow 2209. In other words, the spool and drivetrain may be used to release the tethers 2210, and with the floats 2203 on the surface of the body of water 2204, that portion of the energy storage device 2202 to be anchored to the bottom of the body of water 2204 will travel toward the bottom of the body of water 2204. The change in potential energy of that portion of the energy storage device 2202 to be anchored to the bottom of the body of water 2204 can be converted to useful electrical energy by the drivetrain during its descent. It should be appreciated that the supplemental floatation device 2206 may still be attached to that portion of the energy storage device 2202 to be anchored to the bottom of the body of water 2204 to aid in control over the speed of descent of the energy storage device 2202. Also, it should be appreciated that as the energy storage device 2202 descends toward the bottom of the body of water 2204, the electric cable 2208 will follow as it remains attached to the energy storage device 2202.

Finally, once on the bottom of the body of water 2204, the supplemental floatation device 2206 can be released remotely, and be allowed to float back to the surface for recovery and reuse in deploying future energy storage devices. The supplemental floats could be released by a variety of mechanisms. Such mechanisms could be operable repeatedly, or they could be single use. A multi-use mechanism might be used again if the system is retrieved and then redeployed, for example, for maintenance. A single use mechanism might be more cost effective if repeated use is unlikely. A variety of repetitive-use actuators could be employed, such as motors, shape memory alloys, pneumatics, hydraulics, and so forth. These actuators could be used to release latches, clasps, hooks, and so forth, so as to decouple the supplemental floatation from the energy storage system. A single-use mechanism might use single-use actuators, such as pyrotechnic bolts, cable cutters, fusible links, and so forth, and might release latches, clasps, hooks, and so on, or sever structural members to release the supplemental floats.

With the extra floatation no longer attached, the energy storage device 2202 will now be sufficiently heavy to be able to pull the floats 2203 underwater completely as shown on the right side of FIG. 22. At this point, the energy storage device 2202 is ready for operation.

Figure 23:
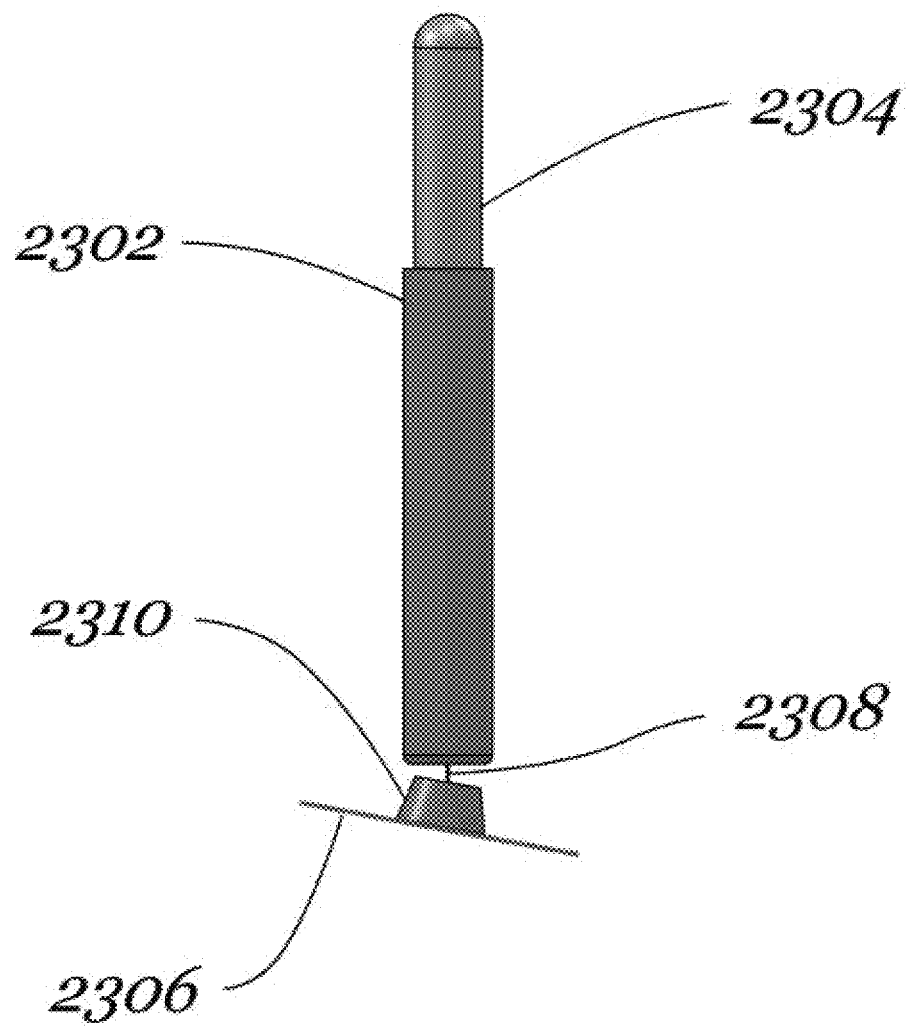
FIG. 23 illustrates an apparatus for deploying an energy storage device that utilizes a buoy and a hydraulic cylinder on a sloped surface on the bottom of a body of water.

FIG. 23 illustrates an apparatus for deploying an energy storage device that utilizes a buoy and a hydraulic cylinder on a sloped surface on the bottom of a body of water. Many ideal spots for energy storage device that utilizes a buoy and a hydraulic cylinder, such as that described in connection with FIG. 20, will be on a sloped floor or sloped bottom of a body of water, particularly where there is sufficient depth for optimal operation. However, the hydraulic cylinder should be placed in a vertical position so that the buoyant piston can move along a vertical axis. Therefore, a mechanism for securing the hydraulic cylinder to a sloped surface while maintaining a vertical orientation can be used.

As illustrated, a hydraulic cylinder 2302 and a buoyant piston 2304 are disposed along a vertical axis; however, the bottom 2306 of the body of water is sloped and cannot easily accommodate resting the bottom of the hydraulic cylinder 2302 on the bottom 2306 of the body of water while maintaining its vertical orientation. Therefore, the bottom of the hydraulic cylinder 2302 is attached by a flexible coupling 2308 that is attached on an opposite side to an anchor 2310. The flexible coupling 2308 could be a flexible structure, or it could be a rigid, jointed structure attached at one end to the anchor and at the other end to the hydraulic cylinder 2302 or upper base. For example, the flexible coupling 2308 could be a fiber or wire rope, a coil spring, a bellows, a flexure, and so on. A rigid, jointed coupling could be, for example, a universal joint, a ball joint, a Stewart Platform, and so on.

The flexible coupling 2308 provides an angular connection that allows the anchor 2310 to rest on the sloped bottom 2306 in an un-level position while permitting the energy storage device to remain vertical. The anchor 2310 rests on the bottom 2306 of the body of water and is of sufficient weight, in combination with the energy storage device itself to anchor the entire device to the bottom 2306, or so that the entire device has a net-negative buoyancy. The anchor 2310 can be made from any material previously described for any anchor or base for the energy storage device.

Alternatively, the bottom of the hydraulic cylinder could be rounded, and if of sufficient weight, could simply rest on the bottom of the body of water. The buoyancy of the buoy will hold the hydraulic cylinder upright, and the hydraulic cylinder can then roll in reaction to overturning moments from side loads on the buoy and hydraulic cylinder.

Figure 24:
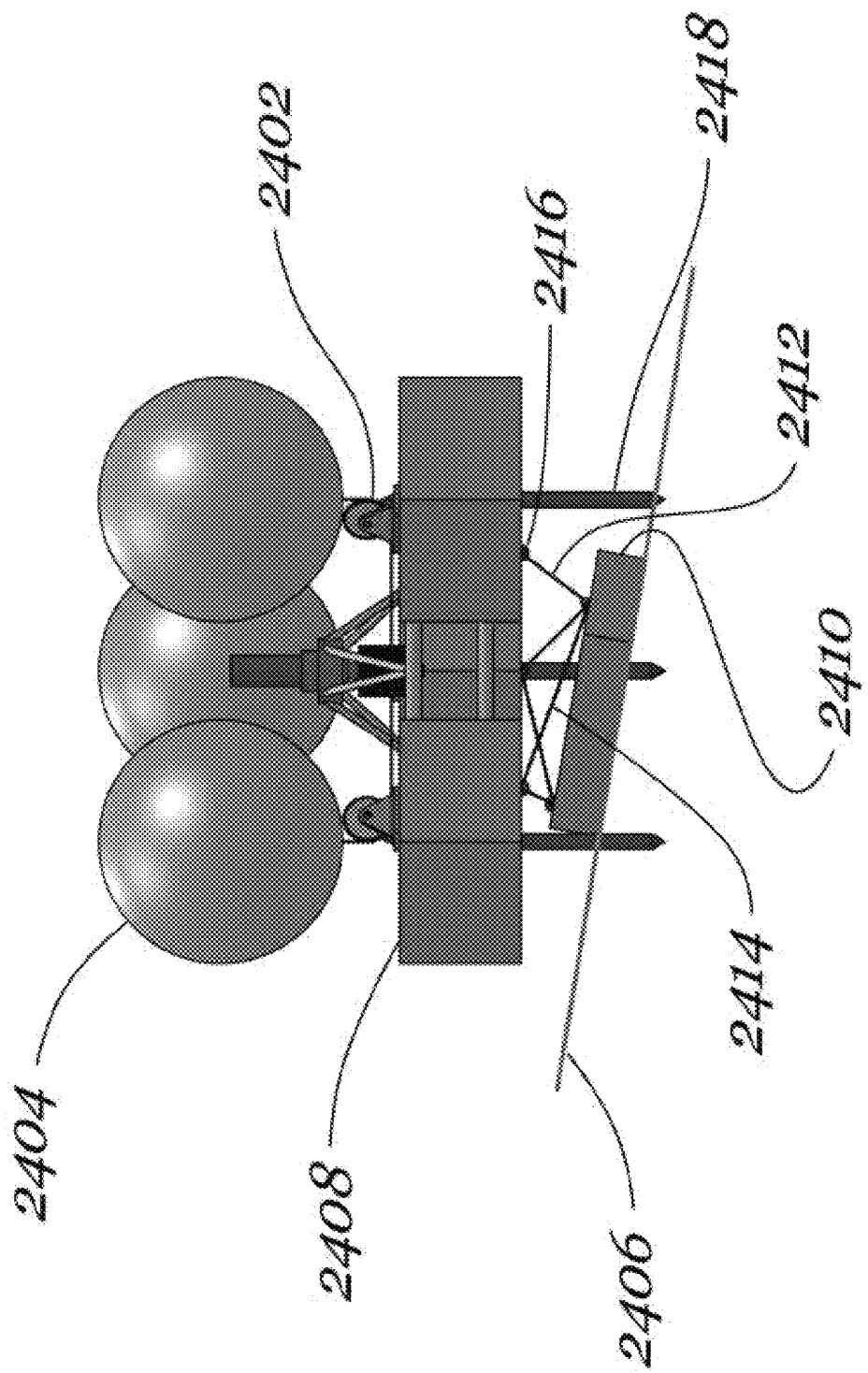
FIG. 24 illustrates another apparatus for deploying an energy storage device on a sloped surface on the bottom of a body of water.

FIG. 24 illustrates another apparatus for deploying an energy storage device on a sloped surface on the bottom of a body of water. In this embodiment, the energy storage device 2402 is one that utilizes floats 2404 but that otherwise is disposed on the bottom 2406 of a body of water. Again, the energy storage device 2402 should be level. Therefore, rather than have the base or weight 2408 rest on the bottom 2406, anchor or second base or weight 2410 is used. The anchor 2410 is disposed on the bottom 2406 of the body of water and is connected to the base or weight 2408 of the energy storage system 2402 by a flexible coupling 2412.

In this embodiment, the flexible coupling 2412 may be a hexapod with variable length legs 2414, commonly known as a Stewart Platform. In this case, the Stewart Platform is formed by routing a continuous loop of tether through six eyelets 2416, three on the upper base or weight 2408 and three on the anchor 2410, with each set of eyelets 2416 forming an equilateral triangle. As the anchor 2410 conforms to the bottom 2406, the tether will run through the eyelets to adjust the length of the legs 2414 of each bipod to enable the base or weight 2408 to maintain a level attitude. The Stewart Platform will resist twisting more effectively than a single flexible coupling, such as that shown in FIG. 23, while still functioning passively. Additionally, three spikes 2418 can be driven into the bottom 2406 by the weight of the energy storage device 2402 to further resist twisting and gross lateral slip of the base or weight 2408.

Figure 25:
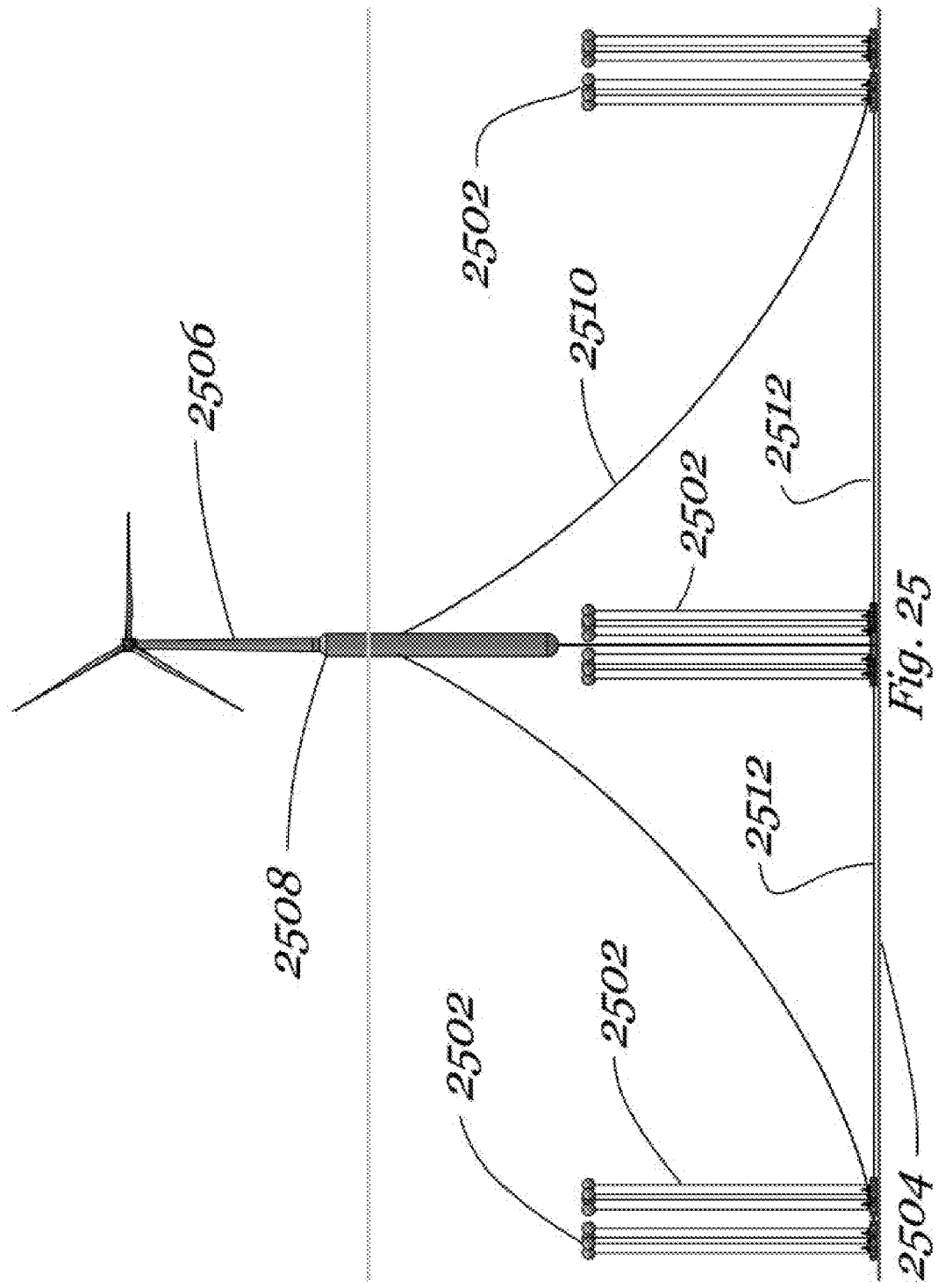
FIG. 25 illustrates the use of an energy storage system in conjunction with offshore energy generation according to one embodiment of the invention.

FIG. 25 illustrates the use of an energy storage system in conjunction with offshore energy generation according to one embodiment of the invention. In this embodiment, multiple energy storage devices 2502 are disposed on the bottom 2504 of a body of water, such as the ocean. In this case, three clusters of energy storage devices 2502 are shown; however, any number of clusters with any number of energy storage devices in each cluster may be used. Further, it should be appreciated that while the energy storage devices 2502 are those that utilize floats to store and release energy, any of the energy storage devices described herein may be used. An offshore wind turbine 2506 is disposed on top of a floating support platform 2508. The floating support platform 2508 may be a spar buoy, as shown, but can also be any number of designs known in the art.

These energy storage devices 2502 provide both energy storage for electricity generated by the wind turbine 2506 and anchorage for slack mooring lines 2510 that keep the floating support platform 2508 in place. The energy storage devices 2502 are sufficiently negatively buoyant to both maintain their own positions securely and to provide sufficient anchoring force to hold the wind turbine 2506 in place at the same time. Although slack mooring lines 2510 are shown here, the energy storage devices 2502 would also work with a taught-leg or a tension-leg design with sufficient negative buoyancy designed into the systems.

In operation, energy produced by the wind turbine 2506 would be supplied to the energy storage devices 2502 for storage through marine electrical cables 2512. Each of the energy storage devices would be electrically connected via these marine electrical cables 2512 that can also be connected to any electrical load to which stored energy is provided, including a gird or an offshore wind farm. In the latter case, the energy storage devices would store energy provided by a single wind turbine and then release the stored energy to a wind farm that would then ultimately transfer all of the power generated by a collection of wind turbines to an electrical load such as a grid. The presence of storage at the wind farm site may mean that power from peak output periods can be stored and subsequently transmitted during periods of low output, enabling a reduction in the power-rating of the electrical cable that runs from the wind farm back to shore, reducing its cost. The storage could also be used by the grid directly to provide power on demand for a number of applications and in so doing provide additional revenue for a wind project.

Figure 26:
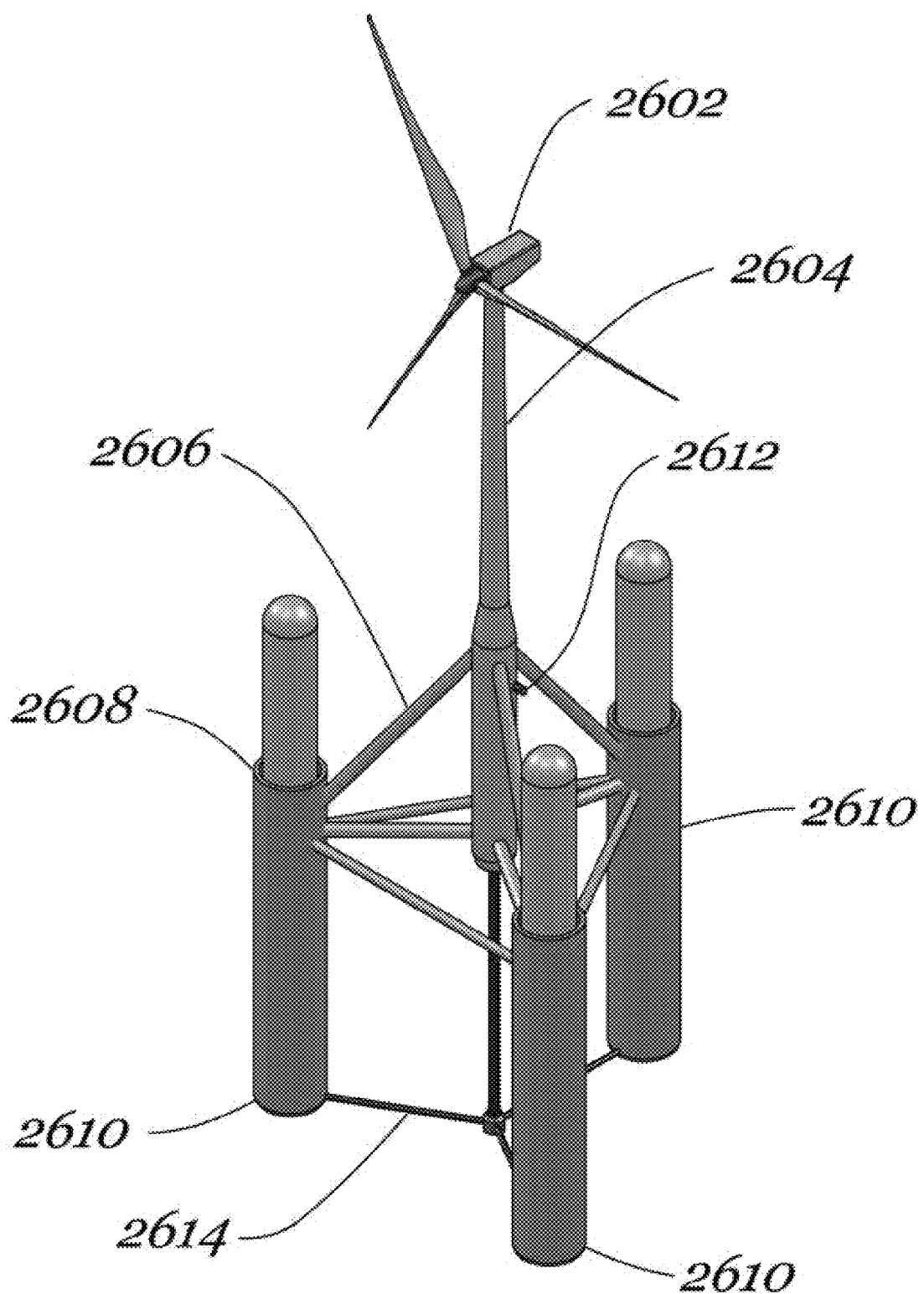
FIG. 26 illustrates the use of energy storage devices that utilize a buoy and a hydraulic cylinder in conjunction with a wind turbine.

FIG. 26 illustrates the use of energy storage devices that utilize a buoy and a hydraulic cylinder in conjunction with a wind turbine. In this embodiment, a wind turbine 2602 is mounted on a tower 2604 that is supported by a truss structure 2606 that connects three or more energy storage devices 2608 that each utilize a buoy and a hydraulic cylinder. The three energy storage devices 2608, which are anchored to the bottom of a body of water provide a gravity foundation for the wind turbine 2602 such that it is essentially mounted to the bottom of a body of water. The hydraulic cylinders 2610 provide a footing for the wind turbine 2602 to react to the overturning moments applied to it from the wind. Since the hydraulic cylinders 2610 are likely to be approximately one-half of the water depth in height, it may be possible to build seabed mounted turbines in deeper water than is currently feasible, because the truss structure is positioned halfway to the surface of the body of water rather than on the seafloor.

This collocation of the energy storage devices 2608 that utilize a hydraulic cylinder and buoy with a wind turbine 2602 may allow for direct mechanical integration with the wind turbine 2602. In this case, the hydraulic turbine associated with the hydraulic cylinder and buoy, as described in connection with FIG. 20, can be placed inside the tower 2604 or the truss structure 2606 and coupled to the wind turbine's main shaft through a gearbox or transmission. In this case, the motor-generator associated with the energy storage device 2608 can be eliminated entirely, and a single generator can be used for both the wind turbine 2602 and the hydraulic buoy storage devices 2608, thereby reducing costs. Accordingly, each of the energy storage devices 2608 would be hydraulically coupled to the single pump and generator by hydraulic couplings or lines 2610, and a water inlet/outlet 2612 in the tower 2604 could be used for passing water from the pump and generator. An electric cable would be connected to the generator to transmit stored energy to an electric load, and it should be appreciated that having the capability of energy storage adjacent to an offshore generation site may enable a reduction in the size of the undersea electrical cable running from the generation site to shore.

Figure 27:
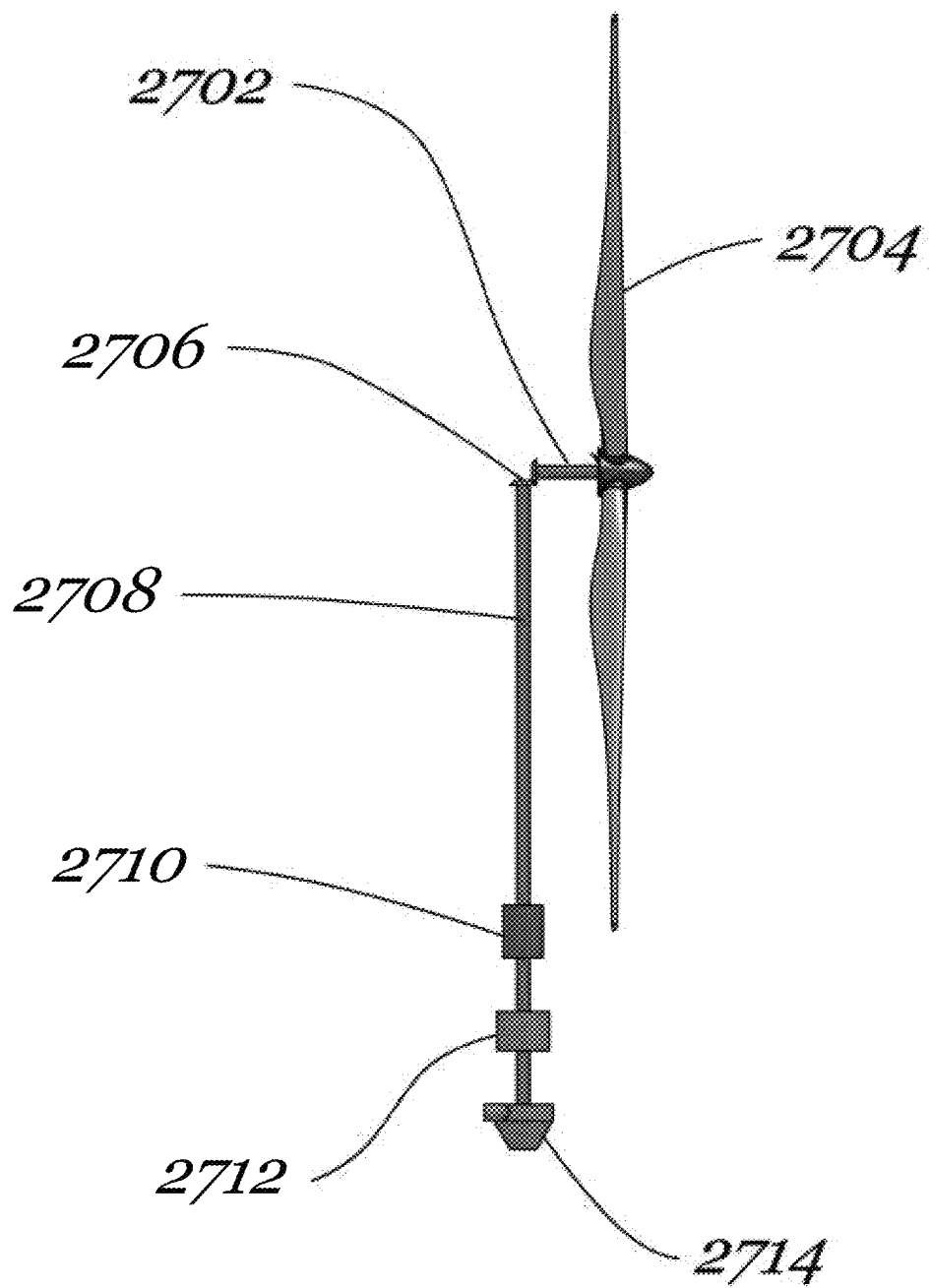
FIG. 27 illustrates the mechanical coupling of an energy storage device that utilizes a buoy and a hydraulic cylinder to a wind turbine.

FIG. 27 illustrates the mechanical coupling of an energy storage device that utilizes a buoy and a hydraulic cylinder to a wind turbine according to one embodiment of the invention. In this embodiment, an arrangement similar to that described in connection with FIG. 26 allows for the use of a single generator that serves both the wind turbine and the energy storage device. The main shaft 2702 of the wind turbine rotor 2704 is coupled through a bevel gear 2706 to a driveshaft 2708 that runs down the tower of the wind turbine. This driveshaft 2708 is connected to a generator 2710. This driveshaft 2708 of this generator 2710, however, passes completely through the generator 2710 and out the bottom end, where it couples through a transmission 2712 to the mechanical interface of the energy storage device (i.e., either the pump-turbine 2714 or the spool or winch drum through a greater gear reduction).

In operation, as the wind spins the wind turbine rotor 2704, that energy will be supplied to the generator 2710 and converted into electricity. A typical wind turbine generator is designed to run at constant speed so as to output constant frequency AC power. As the wind speed varies, the torque applied to the generator 2710 rises and falls, and this is typically reflected in greater or lesser current output from the generator 2710. With the addition of an energy storage device to the system, however, some or all of the torque from the main rotor 2704 may be shunted to the energy storage device (s). In addition, the torque from the wind may be supplemented with torque from the energy storage device by allowing the buoys to rise and backdrive the mechanical input. The transmission 2712 is present to ensure that the torque output of the energy storage device, which is always constant because the force on the buoys is always constant, is equal to the desired torque output, while maintaining the constant speed of the generator 2710. To apply more torque to or absorb more torque from the generator 2710, the buoys are allowed to rise or descend faster while the transmission ratio is adjusted to keep the speed of the generator constant.

Figure 28:
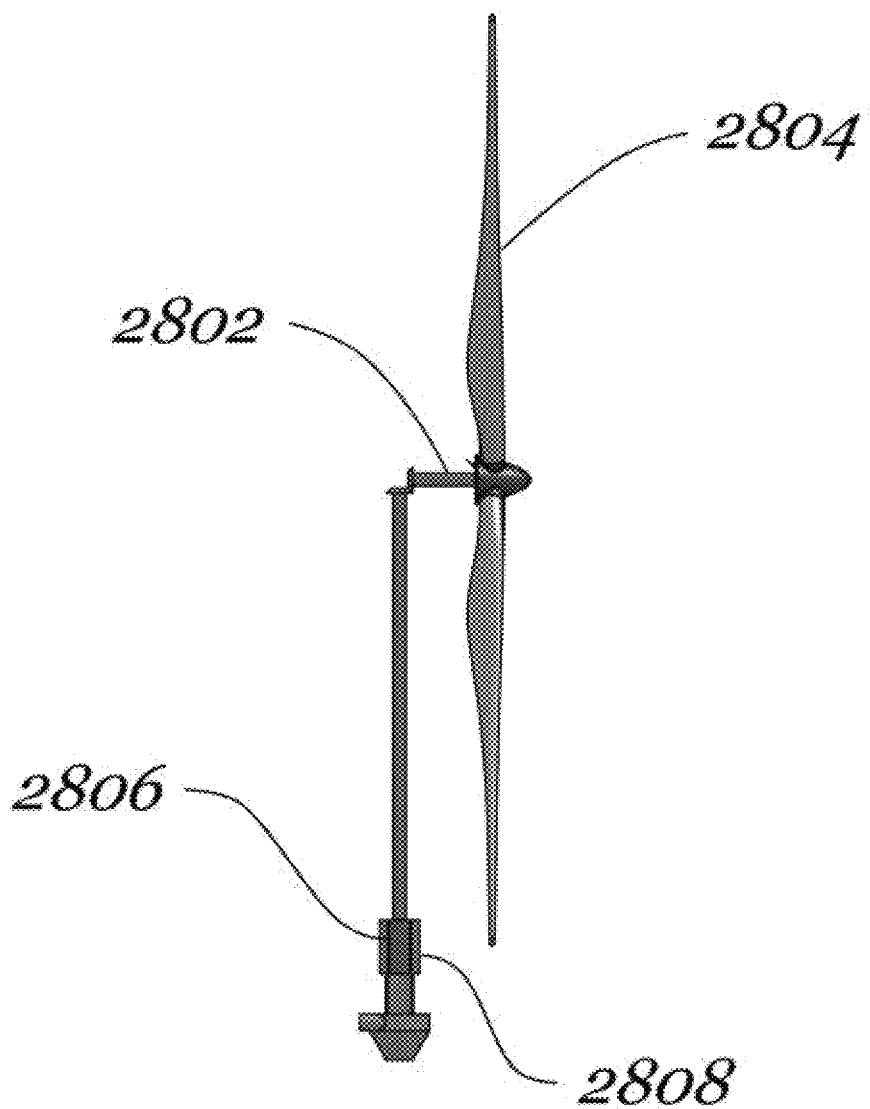
FIG. 28 illustrates the mechanical coupling of an energy storage device that utilizes a buoy and a hydraulic cylinder to a wind turbine according to another embodiment of the invention.

FIG. 28 illustrates the mechanical coupling of an energy storage device that utilizes a buoy and a hydraulic cylinder to a wind turbine according to another embodiment of the invention. In this embodiment, the main shaft 2802 of the wind turbine rotor 2804 is coupled to the rotor of an AC generator 2806. Instead of having the stator 2808 fixed to ground, however, it is allowed to ride on bearings so it is free to rotate about its axis. The stator housing is then mechanically coupled to the input shaft on the energy storage device (i.e., again either the pump-turbine or winch). The energy storage device will exert a constant torque on the stator 2808, which will necessarily be balanced by the rotor 2806. A generator subject to constant torque will run at constant speed at a given electrical load, so a constant frequency output can be maintained. The wind turbine can be set up to spin faster as the wind blows harder, rather than outputting more force. When this happens, the rotor 2806 will speed up and drag the stator 2808, because it is free to rotate, along with it, keeping the relative speed between rotor 2806 and stator 2808 constant. Since the stator 2808 is connected to the mechanical input of the energy storage device, this increased stator speed is transmitted to the buoys, causing them to be drawn down and storing the excess energy from the increased wind while the generator continues to output constant power. Should the wind drop, the wind turbine will slow down, the rotor 2806 will slow, and the stator 2808 automatically will as well to keep the relative speed constant. If the rotor speed slows enough, the stator 2808 will eventually have to begin turning the opposite direction to keep the relative speed between rotor 2806 and stator 2808 constant, which means the buoys will now be ascending and releasing their stored energy to the generator, making up for the shortfall in wind and allowing continued constant power output. As long as there is sufficient travel in the energy storage device, the generator will be able to output constant power. The stator 2808 can also be equipped with a mechanical brake so that, in the event that the energy storage device does run out of travel, the stator 2808 can be braked and the system can continue to operate as a conventional wind turbine.

It should be appreciated that any of the energy storage devices described herein, or multiple energy storage devices described herein may be integrated with other offshore energy generation methods and devices. For example, energy produced by kite-based wind generation can be coupled to any of the energy storage devices as described herein. In this case, the energy storage system can act as an anchor for the tether attached to the kite and its associated generator. An energy storage device as described herein may also be coupled to energy produced by wave or tidal generation, or any other kind of offshore energy generation. In these cases, an electrical cable connected to the energy storage device can be coupled to the output of any of the energy generation systems. The energy would then be stored in the energy storage device and when desired, the stored energy can be transmitted over a separate electrical cable to an end use or electrical load, such as a grid.

Various embodiments of the invention have been described above. However, it should be appreciated that alternative embodiments are possible and that the invention is not limited to the specific embodiments described above. For example, any suitable shape of mass, any size of mass, any number of masses, and any arrangement of masses about the spool may be used in either the embodiment where weights are moved up and down to store and release energy or the embodiment where floats are moved up and down to store and release energy. Further, the size and shape of the platform used to float an energy storage device that utilizes weights to store and release energy may altered. Similarly, the weighted base used to anchor an energy storage device to the bottom of a body of water that utilizes floats to store and release energy may be altered. Also, reference to placement of an energy storage device that utilizes floats to store and release energy on the bottom of a body of water does not necessarily mean the absolute lowest point of that body of water and may include any surface underwater, including sides of a body of water, such as rock out-croppings or ledges. In addition, remote sensing, via satellite, for ocean-based energy storage systems can be utilized to monitor operation. Further, any of the embodiments described herein can be used in combination. Accordingly, the description of these embodiments should be considered exemplary of various embodiments that fall within the scope of the present invention as defined by the claims.

What is claimed is:

1. An energy storage device, comprising:
    a first mass;
    a motor/generator having a rotatable shaft configured to rotate in a first direction when electricity is received by said motor/generator and to rotate in a second direction opposite the first direction to cause said motor/generator to produce electricity;
    a spool coupled to said rotatable shaft, whereby said spool and said rotatable shaft rotate in a same direction;
    a tether attached at a first end to said first mass and wound about said spool between said first end and a second end; and
    a second mass, attached to said tether at a second end opposite said first end,
    whereby rotation of said spool by said rotatable shaft in the first direction causes said tether to wind onto said spool thereby pulling said first end of said tether and said attached first mass toward said spool, and allowing said second end of said tether to un-wind from said spool, pulled by the movement of said second mass away from said spool, and whereby a movement of said first mass away from said spool causes said first end of said tether to un-wind from said spool thereby rotating said rotatable shaft in the second direction, and also causing said second end of said tether to wind onto said spool thereby pulling said second mass towards said spool.

2. The energy storage device of claim 1, wherein said mass comprises at least one weight.

3. The energy storage device of claim 2, wherein said at least one weight is sufficient to fully un-wind said tether from said spool when positioned beneath said spool in a body of water.

4. The energy storage device of claim 2, wherein said mass comprises a plurality of weights and further comprising:
    a plurality of tethers, each attached at a first end to said spool and at an opposite second end to a separate one of said weights,
    whereby rotation of said spool by said rotatable shaft in the first direction causes said plurality of tethers to wind around said spool thereby pulling said plurality of weights toward said spool and whereby a movement of said plurality of weights away from said spool causes said plurality of tethers to un-wind from said spool thereby rotating said rotatable shaft in the second direction.

5. The energy storage device of claim 1, wherein said first mass and said second mass each comprise at least one float.

6. The energy storage device of claim 5, wherein said first mass and said second mass comprise a plurality of first floats and second floats, and further comprising:
   a plurality of tethers, each attached at a first end to a separate one of said floats and wound about said spool between said first end and a second end, and attached at said second end to a separate one of said second floats, whereby rotation of said spool by said rotatable shaft in the first direction causes said first ends of said plurality of tethers to wind onto said spool thereby pulling said plurality of first floats toward said spool and allowing said second ends of said tethers to un-wind from said spool, pulled by the movement of said second floats away from said spool, and whereby a movement of said plurality of first floats away from said spool causes said first ends of said plurality of tethers to un-wind from said spool thereby rotating said rotatable shaft in the second direction, and causing said second ends of said tethers to wind onto said spool, thereby pulling said second floats toward said spool.

7. The energy storage device of claim 1, further comprising:
   a housing having a first enclosed end and defining an opening at a second end opposite said first enclosed end, wherein said housing covers said motor/generator and a gearbox and wherein said motor/generator is positioned within said housing adjacent to said first enclosed end and said spool is positioned adjacent to said opening at said second end.

8. The energy storage device of claim 7, further comprising:
   a hydrophobic liquid layer disposed within said housing beneath said motor/generator, wherein said housing is configured to seal about said rotatable shaft, thereby enclosing said motor/generator.

9. The energy storage device of claim 8, further comprising:
   a seal disposed within said housing between an end of said hydrophobic liquid layer and said spool.

10. The energy storage device of claim 1, further comprising:
    a platform, wherein said motor/generator, said rotatable shaft, and said spool are positioned on said platform and wherein said platform is configured to float on a body of water.

11. The energy storage device of claim 1, further comprising:
    a weighted base, wherein said motor/generator, said rotatable shaft, and said spool are attached to said weighted base and wherein said weighted base is configured to anchor said motor/generator, said rotatable shaft, and said spool to a bottom of a body of water.

12. The energy storage device of claim 6, wherein said plurality of tethers are arranged about said spool such that the lines of action of said tethers on said spool are radially symmetric about the axis of rotation of the spool,
    whereby the net force in the radial direction of said plurality of tethers on said spool when said tethers are tensioned symmetrically is nominally zero.

13. A system for energy storage, comprising:
    an energy storage device comprising a first mass; a motor/generator having a rotatable shaft configured to rotate in a first direction when electricity is received by said motor/generator and to rotate in a second direction opposite the first direction to cause said motor/generator to produce electricity; a spool coupled to said rotatable shaft, whereby said spool and said rotatable shaft rotate in a same direction; and a tether attached at a first end to said first mass and wound about said spool between said first end and a second end; and a second mass, attached to said tether at a second end opposite said first end, whereby rotation of said spool by said rotatable shaft in the first direction causes said tether to wind onto said spool thereby pulling said first end of said tether and said attached first mass toward said spool, and allowing said second end of said tether to un-wind from said spool, pulled by the movement of said second mass away from said spool, and whereby a movement of said first mass away from said spool causes said first end of said tether to un-wind from said spool thereby rotating said rotatable shaft in the second direction, and also causing said second end of said tether to wind onto said spool thereby pulling said second mass towards said spool; and
    an electric cable electrically connected at a first end to an electrical load and electrically connected to said motor/generator at a second end opposite said first end;
    wherein said energy storage device is disposed in a body of water.

14. The energy storage system of claim 13, wherein said mass comprises at least one weight, and further comprising:
    a platform, wherein said motor/generator, said rotatable shaft, and said spool are positioned on said platform and wherein said platform is configured to float on the body of water, and
    wherein said at least one weight is disposed in the body of water such that said tether extends from said spool on said platform downward toward a bottom of the body of water to said at least one weight.

15. The energy storage system of claim 14, wherein said mass comprises a plurality of weights and further comprising:
    a plurality of tethers, each attached at a first end to said spool and at an opposite second end to a separate one of said weights,
    whereby rotation of said spool by said rotatable shaft in the first direction causes said plurality of tethers to wind around said spool thereby pulling said plurality of weights toward said spool and whereby a movement of said plurality of weights away from said spool causes said plurality of tethers to un-wind from said spool thereby rotating said rotatable shaft in the second direction.

16. The energy storage system of claim 13, wherein said first mass and said second mass each comprise at least one float, and further comprising:
    a weighted base, wherein said motor/generator, said rotatable shaft, and said spool are attached to said weighted base and wherein said weighted base is configured to anchor said motor/generator, said rotatable shaft, and said spool to a bottom of the body of water and
    wherein said first mass and said second mass are disposed in the body of water such that said tether extends at said first end from said spool on said platform upward toward a surface of the body of water to said first mass, and said tether extends at said second end from said spool on said platform upward toward said surface of the body of water to said second mass.

17. The energy storage system of claim 16, wherein said first mass and said second mass comprise a plurality of first floats and second floats, and further comprising:
- a plurality of tethers, each attached at a first end to a separate one of said floats and wound about said spool between said first end and a second end, and attached at said second end to a separate one of said second floats,
- whereby rotation of said spool by said rotatable shaft in the first direction causes said first ends of said plurality of tethers to wind onto said spool thereby pulling said plurality of first floats toward said spool and allowing said second ends of said tethers to un-wind from said spool, pulled by the movement of said second floats away from said spool, and whereby a movement of said plurality of first floats away from said spool causes said first ends of said plurality of floats plurality of tethers to un-wind from said spool thereby rotating said rotatable shaft in the second direction, and causing said second ends of said tethers to wind onto said spool, thereby pulling said second floats toward said spool.

18. The energy storage device of claim 11, wherein the net weight of said weighted base when fully submerged in said body of water is approximately equal to the net buoyancy of said floats when fully submerged in said body of water, whereby said energy storage device is approximately neutrally buoyant in said body of water, and further, said energy storage device can be made to exhibit substantially non-neutral buoyancy by the addition or removal of an amount of buoyancy and/or weight that is small relative to total buoyancy or weight of said energy storage device.

19. The energy storage device of claim 11, wherein said weighted base comprises:
- a first part, adapted to attach to said motor/generator, said rotatable shaft, and said spool;
- a second part, adapted to rest on said bottom of said body of water; and
- a flexible attachment, adapted to couple said first part of said weighted base to said second part of said weighted base, and further adapted to allow said first part to rest at an angle relative to said second part,
- whereby said motor/generator, said rotatable shaft, and said spool can be maintained in a substantially upright position with respect to gravity while said second part of said weighted base rests in contact with a bottom of said body of water that is substantially not level with respect to gravity.

\* \* \* \* \*